US012026090B2

(12) United States Patent
Duggal et al.

(10) Patent No.: US 12,026,090 B2
(45) Date of Patent: Jul. 2, 2024

(54) SYSTEMS AND METHODS FOR AUTOMATING TESTING OF AN APPLICATION PRIOR TO MAKING THE APPLICATION AVAILABLE FOR PRODUCTION DEPLOYMENT

(71) Applicant: EnterpriseWeb LLC, Glen Falls, NY (US)

(72) Inventors: Dave Duggal, Glens Falls, NY (US); William Malyk, Guelph (CA)

(73) Assignee: ENTERPRISEWEB LLC, Glens Falls, NY (US)

( * ) Notice: Subject to any disclaimer, the term of this patent is extended or adjusted under 35 U.S.C. 154(b) by 105 days.

(21) Appl. No.: 17/939,750

(22) Filed: Sep. 7, 2022

(65) Prior Publication Data

US 2024/0078172 A1    Mar. 7, 2024

(51) Int. Cl.
*G06F 11/36* (2006.01)

(52) U.S. Cl.
CPC ...... *G06F 11/3696* (2013.01); *G06F 11/3684* (2013.01); *G06F 11/3688* (2013.01)

(58) Field of Classification Search
None
See application file for complete search history.

(56) References Cited

U.S. PATENT DOCUMENTS

| 2014/0173561 A1* | 6/2014 | Toub | G06F 8/73 717/123 |
| 2016/0048444 A1* | 2/2016 | Crova | G06F 11/3676 717/124 |
| 2017/0147481 A1* | 5/2017 | Doss | G06F 11/3684 |
| 2018/0032322 A1* | 2/2018 | Jagannath | G06F 8/60 |
| 2018/0205600 A1* | 7/2018 | Burton | H04L 67/1097 |
| 2021/0360083 A1* | 11/2021 | Duggal | H04L 67/34 |
| 2021/0409372 A1* | 12/2021 | Meier | H04L 63/0227 |
| 2022/0357936 A1* | 11/2022 | Duggal | G06F 8/60 |
| 2023/0009997 A1* | 1/2023 | Bregman | G06N 20/00 |
| 2023/0138602 A1* | 5/2023 | Bregman | G06F 8/71 717/170 |
| 2023/0393965 A1* | 12/2023 | Hiremath | G06F 11/3664 |

* cited by examiner

*Primary Examiner* — Philip Wang
(74) *Attorney, Agent, or Firm* — Sterne, Kessler, Goldstein & Fox P.L.L.C.

(57) ABSTRACT

Disclosed herein are system, method, and computer program product embodiments for performing Telecom Day 0 tasks as concrete examples of the general model-based, event-driven, policy-controlled platform that generates a customized DevOp automation plan from a generic template, which describes a single platform-based workflow for automating related DevOps tasks end-to-end (e.g., across stages and teams) and top-to-bottom (e.g., across all layers—application, infrastructure and network) for an efficient, seamless, transparent and scalable process. The single, platform-based process commences with a submission that is the onboarding of a new or updated code-package or a composition of objects as a service (higher-level object). The single, platform-based process ends with the registration of the application in a catalog or returns the submission to the submitter for re-working. These capabilities automate continuous delivery, enabling agile development with a consistent developer experience.

20 Claims, 76 Drawing Sheets

| DAY 0 | Use-Case (applies to all 4) | | | |
|---|---|---|---|---|
| Workflow | Establish DMZ Stage Tasks | Deployment Stage Tasks | Configuration Stage Tasks | Verification Stage Tasks |
| Application Layer | Calculate Network Topology to support selected Applications | Deploy Pods/VMs for xNFs | Configure xNFs | Evaluate Test Results and publish to Catalog or return errors |
| Infrastructure Layer (Compute / Storage) Not limited to Cloud or Containers | Install Certs & Auths | Connect Storage to Application Pods/VMs | Configure Simulation Tools / Metrics Aggregation Tools to Operate Over Established Service | Remove Pods, Containers, VMs (after tests complete) |
| Network Layer | Create VPCs, Subnets | Connect Subnets to Application Pods/VMs | Configure Service-Chaining | Remove VPCs, Subnets (after tests complete) |

FIG. 1C

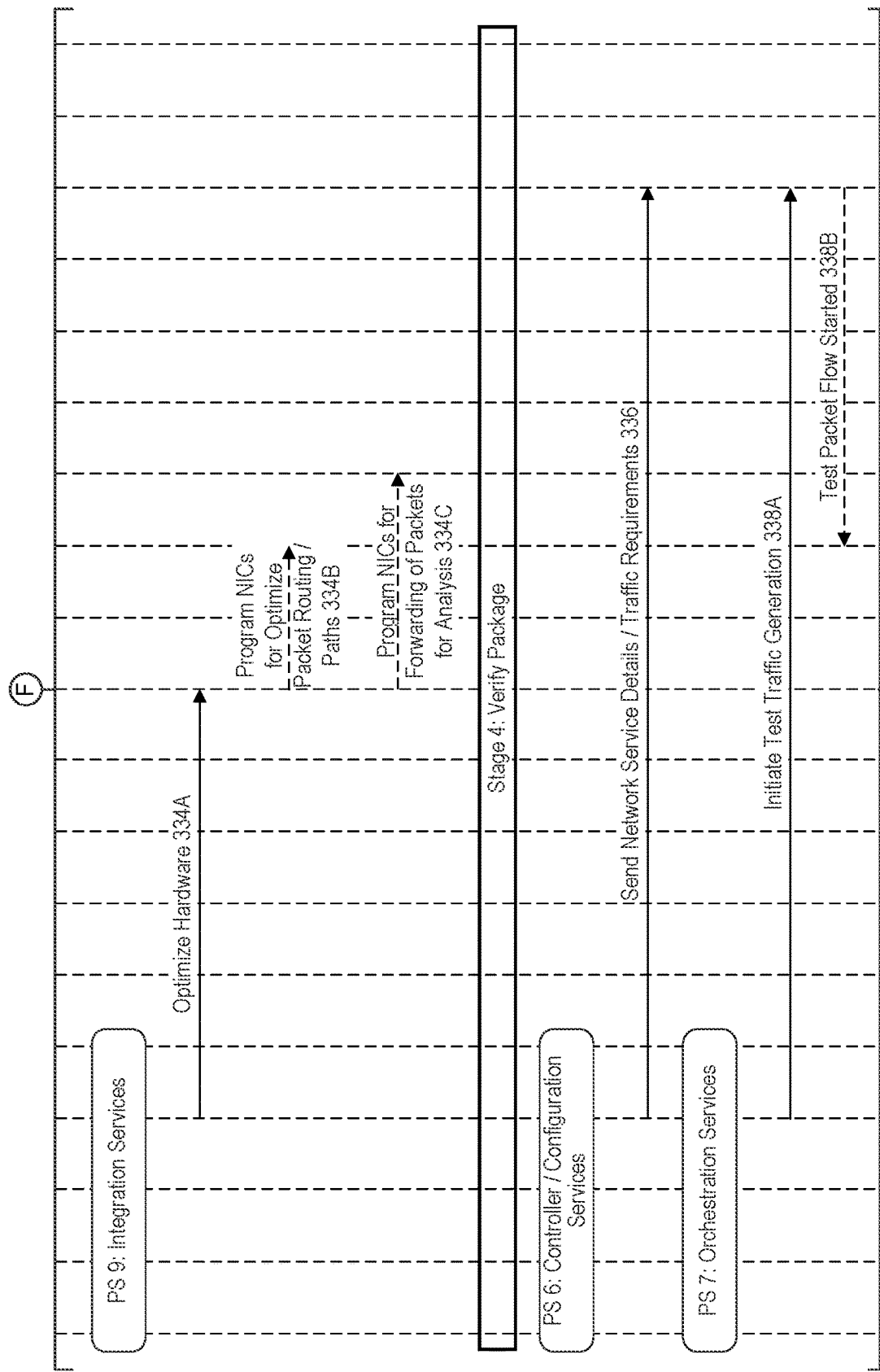

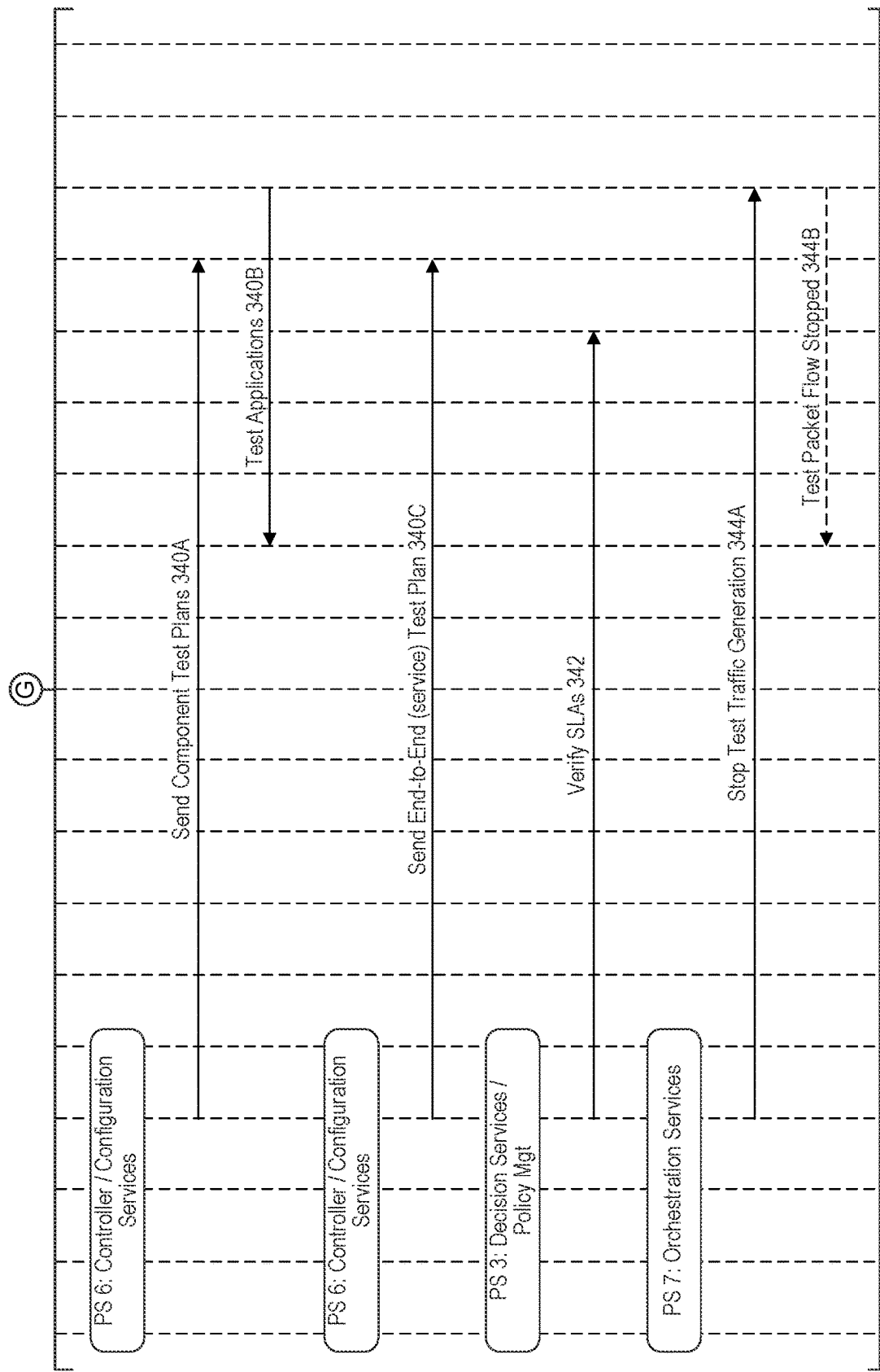

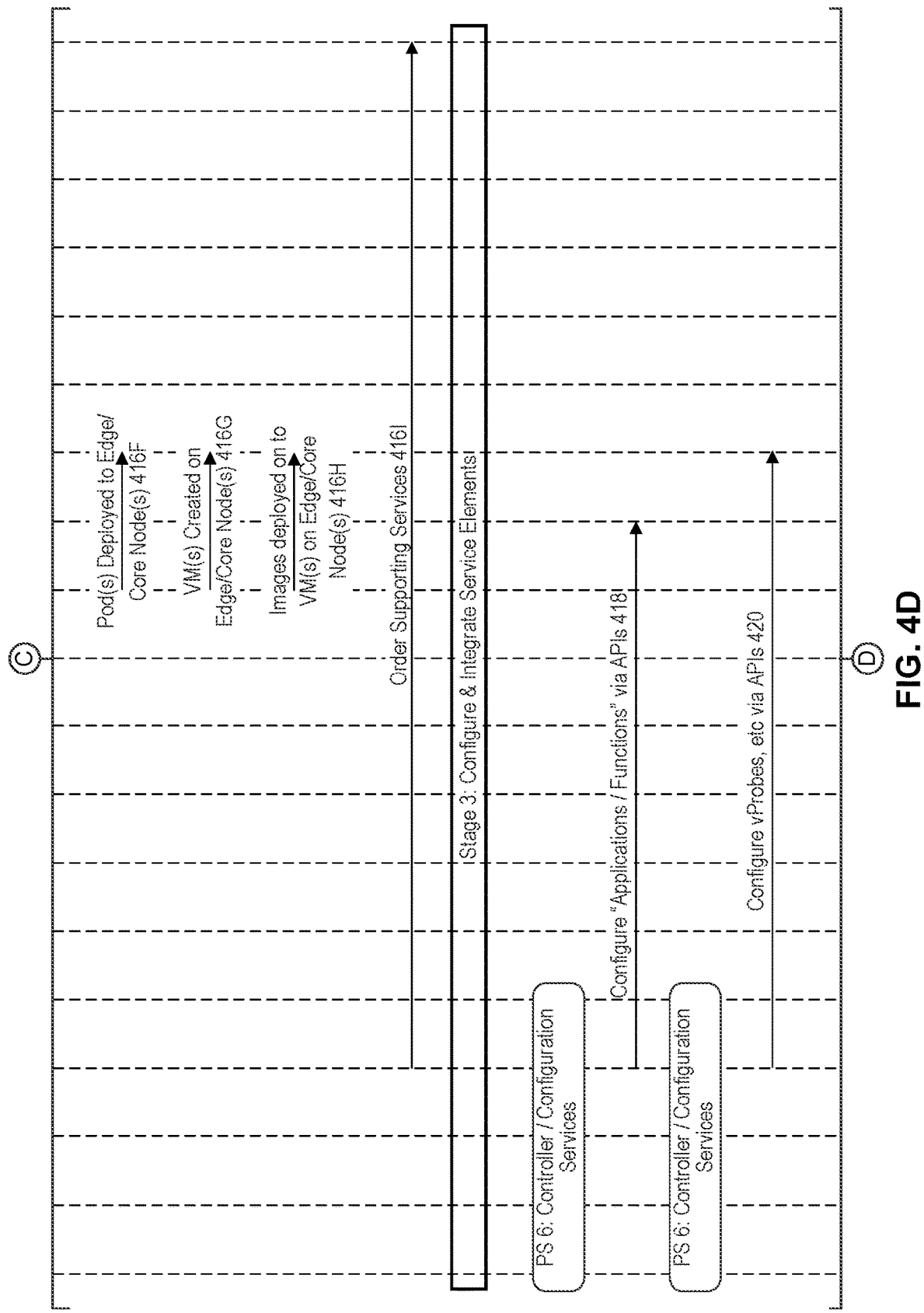

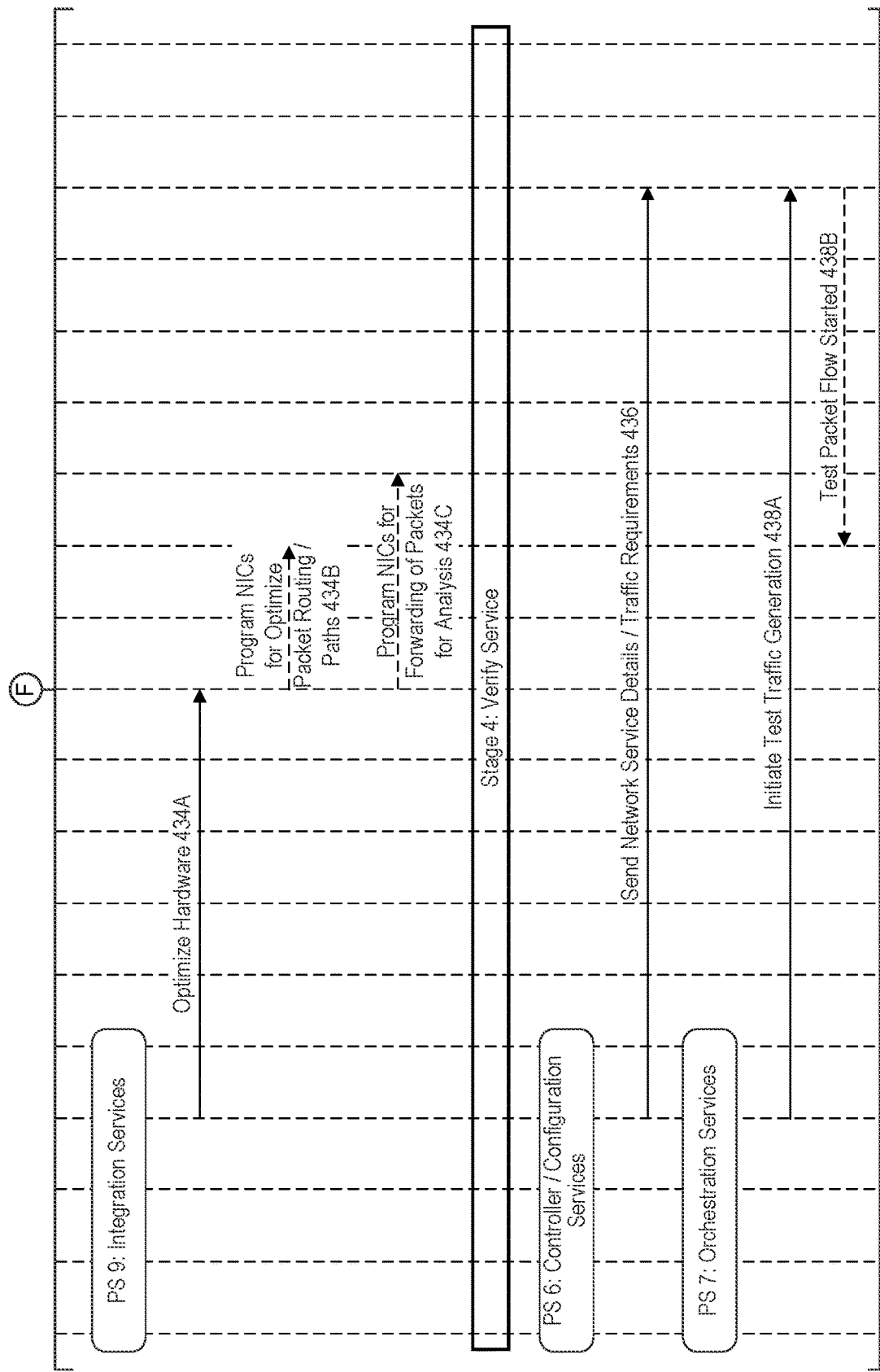

| DAY 0 | Use-Case 1 | | | | |
|---|---|---|---|---|---|
| Workflow | Establish DMZ Stage Tasks | Deployment Stage Tasks | Configuration Stage Tasks | Verification Stage Tasks | |
| Application Layer | Calculate IMS Network Topology | Deploy Pods for IMS | Configure IMS via REST API | Corelate vMonitor telemetry with vProbe alerts to isolate faults | Depth |
| Infrastructure Layer (Compute / Storage) Not limited to Cloud or Containers | Provision Network Storage | Deploy vMonitor pods to supplement Host | Configure CMS/BSS policies via REST API | Remove vMonitors pods (after tests complete) | |
| Network Layer | Create VPC Tunnels | Connect CMS/BSS to VPC | Configure vProbe monitoring ports | Remove VPC Tunnels (after tests complete) | |

Breadth

FIG. 7B

| DAY 0 | Use-Case 2 | | | |
|---|---|---|---|---|
| Workflow | Establish DMZ Stage Tasks | Deployment Stage Tasks | Configuration Stage Tasks | Verification Stage Tasks |
| Application Layer | Assign placement of xNFs in correct Domain Hosts | Deploy Pods for EPC | Configure EPC to Slice Mapping | Evaluate Telemetry from Cloud Analytics against SLAs |
| Infrastructure Layer (Compute / Storage) Not limited to Cloud or Containers | Upload Docker Container Images to Repo | Deploy EWeb App Controller to all Nodes | Configure Cloud Analytics | Remove EWeb App Controller from all Nodes (after tests complete) |
| Network Layer | Configure Service Mesh | Configure Service Mesh, register Apps | Configure Service-Chaining | Configure Service Mesh, removing registrations (after tests complete) |

FIG. 11B

DAY 0 — Use-Case 3

| Workflow | Establish DMZ Stage Tasks | Deployment Stage Tasks | Configuration Stage Tasks | Verification Stage Tasks |
|---|---|---|---|---|
| Application Layer | Determine 5G Slice Target | Deploy Pod for 5G Core to Edge | Configure vFirewall Rules via REST API | Evaluate Test Results and publish to Catalog or return errors |
| Infrastructure Layer (Compute / Storage) Not limited to Cloud or Containers | Upload Certs & Create Service Accounts | Connect Remote DB to 5G Core | Configure Resource Monitoring policies via REST API | Remove Remote DB (after tests complete) |
| Network Layer | Configure Firewall Ingress Rules | Connect 5G Core Pods to Subnets | Configure vFirewall to Business App chaining | Remove Firewall Ingress Rules (after tests complete) |

FIG. 15B

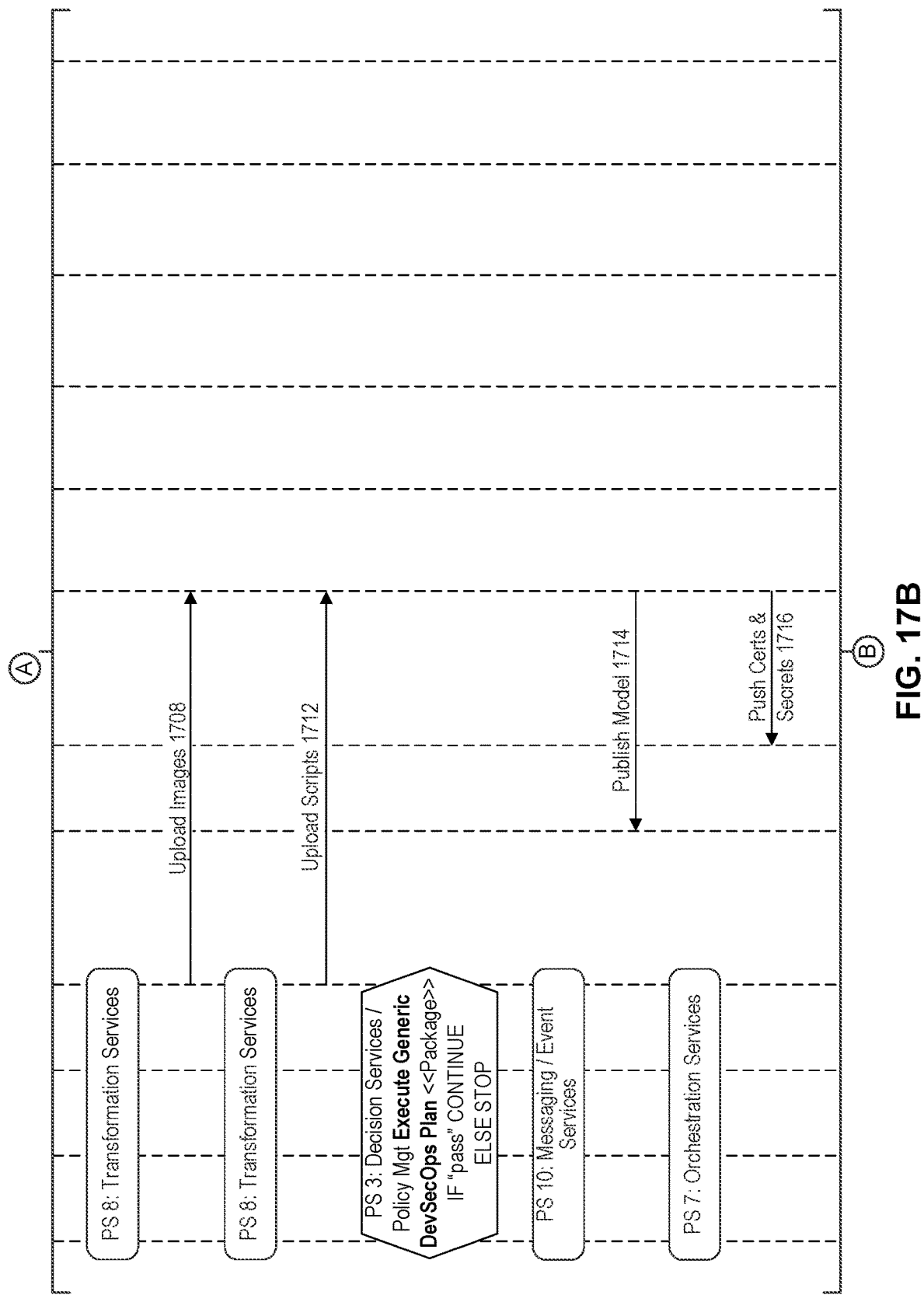

DAY 0 — Use-Case 4

| Workflow | Establish DMZ Stage Tasks | Deployment Stage Tasks | Configuration Stage Tasks | Verification Stage Tasks |
|---|---|---|---|---|
| Application Layer | Assign placement of xNF components to Core or Edge | Deploy VM over Pods for Firewall at Edge | Calculate Firewall White & Block Lists | Initiate Simulated Traffic |
| Infrastructure Layer (Compute / Storage) Not limited to Cloud or Containers | Transfer Firewall VM Image to Repo | Connect Storage to Application Firewall VM | Apply Hardware Optimizations | Remove Hardware Optimizations (after tests complete) |
| Network Layer | Create Subnets | Configure Ingress and Egress Rules for Network to Support Firewall | Configure Service-Chain from Firewall to Ingress | Remove Subnets (after tests complete) |

FIG. 19B

SYSTEMS AND METHODS FOR AUTOMATING TESTING OF AN APPLICATION PRIOR TO MAKING THE APPLICATION AVAILABLE FOR PRODUCTION DEPLOYMENT

BACKGROUND

The output of a software development effort may represent anything from a discrete and narrowly-defined feature (e.g., meeting scheduling function, payment processing application, exchange rate calculator, recommendation algorithm) to a rich and highly-integrated software solution (e.g., accounting program, custom enterprise software, workflow engine, network function, device controller). Absent strongly enforced organizational design guidelines, code may be developed in any software language and its interfaces may specify varying protocols and formats. Despite the diverse purposes of code and the varying design practices, software development customarily follows a roughly standard development lifecycle. Once software code development is complete, whether internally developed, third-party licensed, or open-source code, it is an information technology ("IT") best practice to have the software code bundled as a package so it can be handed off to others for testing prior to being put in production or being made available for production deployments by internal teams or for ordering by customers. Typically different teams (e.g., quality assurance, security, operations) inside organizations are responsible for different testing stages. If all testing stages are successfully completed, a code package may be deployed directly into production or may be published in a catalog so it is available for production deployments. This testing process also generally applies to compositions of code-packages that are deployed together as an integrated service.

Each team commonly has its own practices, systems, and metadata for their stage of testing. This arrangement reinforces functional silos that complicate and slow down the end-to-end software development process. However, a recent trend has seen software application development and IT operations coming together in a practice called "DevOps." Conceptually, DevOps involves standardizing practices, sharing common metadata, and automating processes to streamline the software development lifecycle from development and testing to production deployment in a continuous delivery loop, which allows for routine updates as part of ongoing change management. The scope of DevOps practices may extend to "DevSecOps," which also integrates security testing into the practice. DevOps practices are also emulated by Network Operations teams that likewise seek to streamline their processes and enable continuous improvement. "NetDevOps" applies the same general practices to network services, but tailored to unique requirements of network automation, provisioning and configuration management. For simplicity, all of these variants (DevOps, NetDevOps, DevSecOps, NetDevSecOps) will be referred to below as DevOps. In all cases, these approaches are intended to remove tedious manual tasks and inefficient hand-offs between teams to improve developer productivity, accelerate delivery, and enable a more agile business. Conceptually, generalizing the common aspects of DevOps practices (e.g., standardize practices, metadata and automation tooling) allows for a unified approach that applies common systems and methods to all types of code packages for all teams while dynamically configuring for their specific types, metadata, and relationships. Generalization also allows for possibility of an integrated process that could support a hybrid use-case and enable application, infrastructure and network elements to be optimized collectively.

Continuous Delivery provides an interface between development and operations teams. Continuous Delivery occurs when complete software code packages (e.g., applications, functions, algorithms), whether internally developed, third-party licensed or open-source code are submitted for testing prior to availability for production deployments. Typically submission is made to a code repository directly or through a platform that provides added-value DevOps automation support (e.g., onboarding portal, design environment for service composition, DevOps process management). Submission of complete code packages triggers automated builds, deployments, and testing in a pre-production environment. This pre-production environment may be referred to as a demilitarized zone ("DMZ") in that it is generally a safe environment for testing code packages without impacting software already deployed in production. If all testing stages are successfully completed, a code package may be deployed into production or may be published in a catalog so it is available for production deployments. The consistent process provides transparency, promotes rapid iterations, and supports lifecycle management for software package updates.

Code packages registered in a catalog may then be integrated in a design environment into higher-level services that combine several functions into a composite service. The composite service may be submitted for automated builds, deployments, and testing. This creates a Continuous Integration process (or control loop) connected to a Continuous Delivery process (or control loop) for end-to-end testing and lifecycle management. DevOps plans may use dedicated Continuous Integration and Continuous Deployment ("CI/CD") pipelines. Continuous Deployment focuses on automation to deploy across environments.

In the telecommunications industry, the pre-production deployment steps are often referred to as "Day 0" operations. Day 0 operations may include submitting a code package, onboarding and submitting a third-party function or application, or composing and submitting a service, and then testing the submission. If tests are successful, Day 0 operations may include registering the submission in a catalog, where it can be discovered and ordered for production deployments. The term of art Day 0 is distinct from "Day 1", which involves automating production deployment in response to an order, and "Day 2", which focuses on the ongoing management of the resulting service to scale, heal, and optimize the instantiated service (i.e., lifecycle management) and enforce service level agreements (i.e., SLAs). More details on Day 1 and Day 2 operations are provided in U.S. patent application Ser. No. 17/736,760 titled "Systems and Methods for Declarative Design and Execution of Intent-Based Services," which is herein incorporated by reference in its entirety.

To date, the Day 0 process typically requires a mix of manual steps and scripts that might be used by different testing teams. There may be no central portal for submitting internal code packages or onboarding and submitting external code packages or composing and submitting services. This leads to manual hand-offs between teams and inconsistent metadata collection. Even if there is a high-level workflow across teams, it still generally requires extensive human involvement to handle the specific details of each task given the wide variety of code packages submitted, their unique properties, behaviors, dependencies and constraints. Often the elements of a code package must be opened individually and manually reviewed individually to understand how the package is to be deployed, integrated, configured, and managed. Beyond the hand-offs between teams, testing requires a properly provisioned and configured IT environment (e.g., compute, storage and network), whether they are internal (e.g., data center) or external resources (e.g., cloud, managed hosting) for the specific code packages (or composition) to be deployed. Different testing teams may have different testing facilities or services, which leads to redundant deployment and configuration effort at all levels (e.g., application, infrastructure, and network) and potentially inconsistent findings due to environment variables. In addition to a code package's requirements, each testing team may include additional software components and services to the environment in support of their testing, monitoring and observation, and analysis. Generally some testing scripts or plans are executed to evaluate the code package. However, given the heterogeneous nature of code packages and the diverse nature of environments, any re-use of these plans is limited. Getting the scripts and plans to run may involve significant manual integration and configuration for each code package tested.

While there may be automated aspects of Day 0, it is generally far from an efficient, seamless, transparent and scalable process from end-to-end (e.g., across testing stages and teams) or top-to-bottom (e.g., provisioning of resources; configuration of the network; and deployment, integration and configuration of code packages), which opens the door to new, more holistic and optimized, systems and methods for improved Day 0 operations.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIG. 1C is a table indicating Day 0 tasks performed in a generic use-case, according to some embodiments.

FIGS. 3A-3I present a sequence diagram illustrating a method of performing a DevOps plan to assure new code packages before they are added to the system catalog(s) in a generic use case.

FIGS. 4A-4I are a sequence diagram illustrating a method of performing a DevOps plan to assure new services before they are added to the system catalog(s) in a generic use case.

FIG. 7B is a table indicating Day 0 tasks performed in a use case involving a secure, multi-cloud network for voice, according to some embodiments.

FIG. 11B is a table indicating Day 0 tasks performed in a use case involving a secure, 5G RAN for voice, according to some embodiments.

FIG. 15B is a table indicating Day 0 tasks performed in a user case involving a secure, multi-cloud 5G network, according to some embodiments.

FIGS. 17A-17F are a sequence diagram illustrating a method of performing Day 0 onboarding in the use case for testing a secure, multi-cloud 5G network.

FIG. 19B is a table indicating Day 0 tasks performed in a use case involving an optimized, secure 5G RAN, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1A:
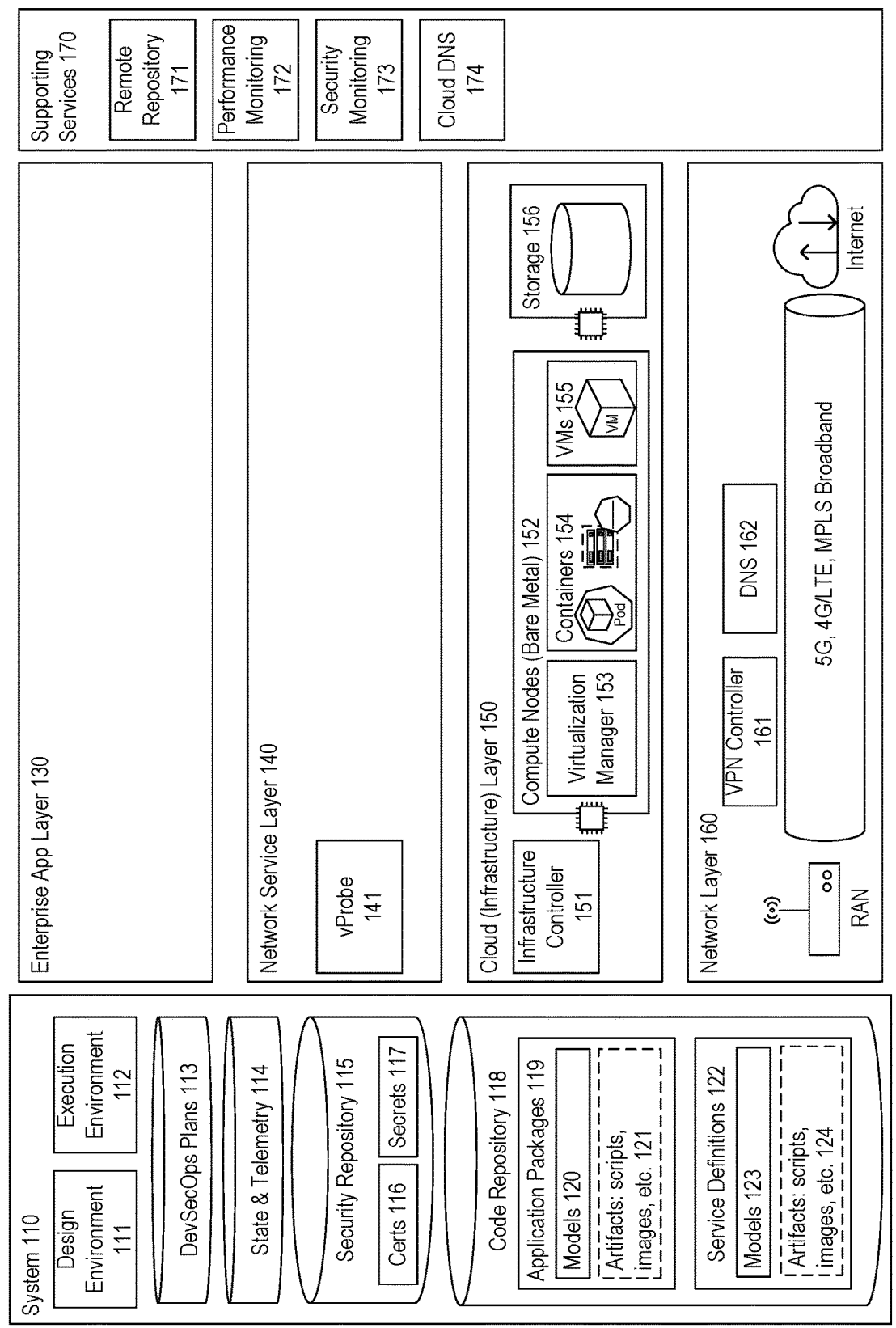
FIG. 1A is a block diagram of an architecture representing a generic use-case.

Provided herein are system, apparatus, device, method, and/or computer program product embodiments, and/or combinations and sub-combinations thereof, for performing Telecom Day 0 tasks as concrete examples of the general model-based, event-driven, policy-controlled platform that supports a single platform-based workflow for automating related DevOps tasks end-to-end (e.g., across stages and teams) and top-to-bottom (e.g., across all layers—application, infrastructure and network) for an efficient, seamless, transparent and scalable process.

While the motivation for DevOps is clear and the generalized workflows are logical, in practice it has been difficult for organizations to realize fully integrated and automated end-to-end processes. There are many challenges including: heterogeneous code packages, varying dependencies, arbitrary service compositions, diverse deployment environments (or hosts), discrete metrics and key performance indicators ("KPIs"), and a rapid rate of change. To cope with this real-world complexity, systems have to accommodate variance and change by providing a common object model that can provide standard structures with common methods (e.g. lifecycle management) and a common domain model that provides shared metadata and relationships for at least partially normalized and executable representations (i.e., minimum viable software objects) so the handling of code packages can be highly-automated.

From a systems perspective, DevOps processes may include multiple workflow engines for CI/CD stages. Each DevOps task may involve one or more tools. The task might be conditional on other tasks. A common implementation of DevOps processes in legacy systems are custom scripts that describe a workflow over a manually integrated stack of components and tools with the business logic hard-coded. Such tools are time-consuming to deploy, hard to maintain, and expensive to change. In other words, the static nature of current DevOps methods, while enabling some level of automation, work against business agility objectives.

For DevOps initiatives to realize their objectives, the approaches require higher-level declarative abstractions to de-couple business logic from implementations and an intent-based platform that can execute declarative workflows with complex policies and types as a single connected end-to-end process.

The disclosed platform provides an intent-based platform for integration and automation. The platform features a graph-connected domain model and type system. These provide common metadata and relationships for end-to-end and top-to-bottom testing. The metadata may include relationships to concepts, types, and policies of the domain model. The type system understands the syntax of each participating element including their protocols and formats. The type system fetches object information in a catalog and inventory regarding discrete dependencies, constraints, affinities, connection details (certificates/authorizations), etc. More details are provided in U.S. patent application Ser. No. 17/352,975 titled "Unified Operating System For Distributed Computing," which is herein incorporated by reference in its entirety.

The disclosed platform's design environment enables rapid onboarding of new solution elements, service endpoints, and component adaptors and their declarative composition into services. The platform's design environment maps properties, behaviors, dependencies, constraints, and connection details and performance metrics and KPIs to the graph-connected domain model. It uses this abstraction to generate a DevOps automation plan, a single platform-based workflow, which includes, but is not limited to: 1) automating all necessary tasks for provisioning and configuring environment; 2) deploying, integrating, and configuring code packages; 3) connecting, integrating, configuring and coordinating (i.e., orchestrating) all services; 4) coordinating all testing; 5) advancing or rejecting a submitted code package or composed service; and 6) updating user interfaces ("UIs"), sending notifications/alerts, and persisting results. The DevOps plan specifies the set of DevOps policies, the set of tests, and the set of DevOps tasks applicable to automating the end-to-end and top-to-bottom testing of a code package.

The disclosed platform's execution environment enables end-to-end automation of DevOps using a unified workbench of middleware tools. If specified, the execution environment delegates tasks to federated third-party tools and components as part of a customer deployment to flexibly support customer preferences and legacy environments.

Using the disclosed platform, DevOps may be automated, end-to-end, across teams, and top-to-bottom, handling tasks at all layers, by a single platform-based workflow. The process may run from onboarding a new or updated code-package modeled as a software object or submitting a declarative composition of objects as a service (higher-level object) to registering the application in a catalog.

If successful, an onboarding process may result in a submission that triggers generation of a DevOps plan from a generic template. If unsuccessful, the submission may be returned for re-work. The submission may be a code package, i.e., a set of artifacts generally including images (files or link to external repository), deployment instructions (e.g., Helm file), configuration files (e.g., YAML file) and Method of Procedures ("MOP") or an industry standard template such as a virtual network function descriptor ("VNFD") necessary for proper deployment, operation, and management of software applications, functions, or algorithms. Onboarding of a new or updated application package may be automated and model-driven. Onboarding may map properties, behaviors, constraints and dependencies to a common model and may auto-fill properties and generate interfaces based on inputs. Onboarding may result in typed, immutable software objects with a lifecycle. Onboarding may model the interface for communications and configuration.

Declarative composition of a service may also result in a submission that triggers generation of a DevOps plan. In declaratively composing a new or updated service, a designer may select registered objects from a catalog and set relationships between objects to model a service topology. A user may configure preferences and declare service chain, support level agreement ("SLA"), and lifecycle management ("LCM") policies. The platform may generate a customized DevOps plan based on a generic deployment template, contextualized by service topology, specified configurations, and declared policies, which models the end-to-end and top-to-bottom testing automation process.

Upon completing onboarding of a new or updated code package or composition of a new or updated composed service, a customized DevOps plan is generated from a template and is parameterized and configured by the properties of the package. The DevOps plan is a model of an event-driven dataflow process, where each process task is loosely-coupled and modeled as an event, which are dynamically chained based on the actual run-time conditions of the process instance. As opposed to a static flowchart, the specific tasks, the sequence of tasks and the configuration of tasks are optimized for the context of the process instance. Metadata may be input to policies to automate decisions, triggering customization of the process and specifying the details of each task. The process is asynchronous, concurrent, and event-driven. The completion/outcome of a current task provides post-conditions, which updates process state for the process instance so the latest metadata is available as inputs to DevOps policies that translate conditions into current context in order to determine the next task in a dynamic, non-linear process instance.

The platform executes (using platform services) or delegates (using third-party components, tools, or services) all necessary operations to fulfill each task. The platform attaches testing packages, gathers and presents results, and advances the process while returning submission for re-work based on process results (if needed). The process may be repeated until successful completion, at which point application packages or service compositions can be deployed in production directly or are registered as objects in a catalog of applications available for use, ordering, and production deployment. In this way, each instance of a process has its own dynamically constructed workflow based on its unfolding conditions so it is responsive and optimized.

In the disclosed platform, every task is modeled as a system event that can be interpreted by the platform based on post-conditions of the last task, which updates process state of a process instance. These process state may include local and global context of the process instance (e.g., code package metadata, user metadata, test environment metadata). This post-conditions may include test results or the results of a function or algorithm with the platform using metadata and policies. This approach customizes the workflow for the individual process instance in a model-based, event-driven, and policy-controlled manner. Further, in executing tasks the platform likewise dynamically matches, dispatches, configures and coordinates platform services (i.e., middleware capabilities) based on metadata and policies to contextually fulfill task operations in a model-based, event-driven, and policy-controlled manner. Where specified, certain operations may be delegated to a third-party component, tool, or engine in a federated manner with the platform responsible for overall orchestration to fulfill the task.

The disclosed approach offers a technical benefit over legacy systems because of the breadth and depth of the disclosed DevOps capabilities. The disclosed platform supports a wide number of use-cases and can cope with change given its flexible, extensible and adaptable nature.

Generic DevOps Use Case

FIGS. 1-6 describe a generic DevOps use case.

FIG. 1A is a block diagram of a 4-layer architecture 100A representing DevOps use-cases in general. Architecture 100A may represent the typical components used to implement generic telecommunication use-cases. Architecture 100A may include system 110, design environment 111, execution environment 112, DevOps plans 113, state and telemetry 114, security repository 115, certificates 116, secrets 117, code repository 118, application packages 119, application package models 120, artifacts related to the application packages 121, service definitions 122, service definition models 123, artifacts related to the service definitions 124, enterprise application layer 130, network service layer 140, virtual probe ("VProbe") 141, cloud layer 150, infrastructure controllers 151, compute nodes 152, virtualization manager 153, containers 154, virtual machines 155, storage 156, network layer 160, virtual private cloud ("VPC") controller 161, domain name system ("DNS") 162, supporting services 170, remote repository 171, performance monitoring service 172, security monitoring service 173, and cloud DNS 174.

Design environment 111 may support: 1) onboarding applications packages (deployable software components) by modeling their properties and behaviors and uploading connected artifacts such as scripts and images; and 2) creating service definitions by modeling their network service graphs and uploading connected artifacts such as scripts and images. Collectively, these are referred to as Day 0 Operations. Day 0 operations may include a design phase that includes requirements gathering and architecture design. Day 0 operation may include functions related to configuring and deploying testing environments. Conventional design environments are typical integrated development environments ("IDEs") providing code editors and basic graphic modeling of business process model and notation ("BPMN") processes. Generally speaking, an "application package" may be a set of software components bundled into a deployable artifact. A "service definition" defines a composite service utilizing one or more "application packages."

Execution environment 112 may support the instantiation of the service definitions (Day 1 Operations) and their ongoing management (Day 2 Operations). Conventional execution environments are tool chains—large collections of capabilities including multiple runtime engines, workflow/process execution tools, and supporting middleware, typically tightly coupled/integrated to a particular deployment architecture.

DevOps plans 113 may be plans (workflows) for executing use-case related operations. DevOps plans 113 may use dedicated CI/CD pipelines and DevOps execution engines.

State and telemetry 114 may be gathered by system 110. State and telemetry 114 may be a set of tightly integrated analytics/monitoring components.

Security repository 115 may store required security credentials including certificates 116 and secrets 117.

Code repository 118 may store application packages 119 having models 120 and artifacts related to the application packages 121 and service definitions 122 having models 123 and artifacts related to the service definitions 124. Service definitions 122 are created in design environment 111 and instantiated/managed in execution environment 112.

The four layers in the middle of FIG. 1A may be levels of implementation found in most telecommunication solutions.

Enterprise application layer 130 may include any end-user applications running over-the-top of the constructed network service such as consumer apps, internet-of-things ("IoT") applications, and other suitable applications.

Network service layer 140 may include network-related solution elements involved in the realizing a use-case. Network service layer 140 may include Firewalls, RAN controllers, and other suitable network-related elements.

VProbe 141 may monitor traffic in a virtualization platform. This traffic may include external traffic on physical interfaces and virtual-machine communications.

Cloud layer 150 may include compute, storage, and infrastructure management components such as infrastructure controllers 151, compute nodes 152, virtualization manager 153, containers 154, virtual machines ("VMs") 155, and storage 156.

Network layer 160 may include the base connectivity used to connect sites, solution elements, etc., including VPC controller 161 and DNS 162.

Supporting services 170 may represent the set of additional solution elements supporting the use-case. Supporting services 170 may include non-functional components such as testing/monitoring and cloud-based services which may be included in the final service such as remote databases, external DNS, etc.

Remote repository 171 may provide storage capabilities accessible via the Internet or other suitable network. Performance monitoring service 172 may monitor the performance of services. Security monitoring service 173 may monitor the security of services. Cloud DNS 174 may provide cloud-based DNS services. For example, cloud DNS 174 may manage DNS domains, allow DNS queries, etc.

Figure 1B:
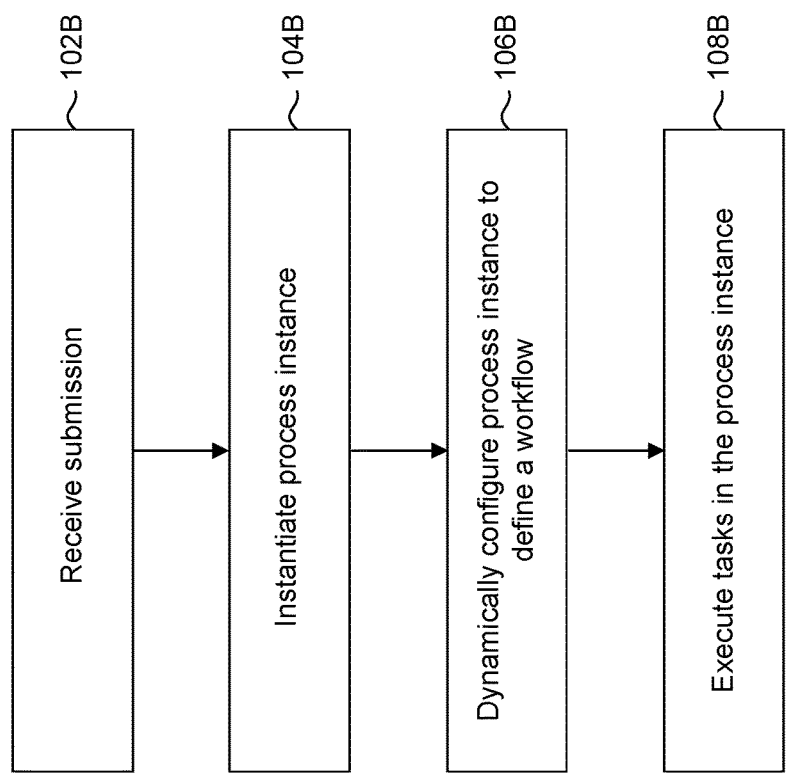
FIG. 1B is a flowchart illustrating a method of automating testing of an application prior to making the application available for production deployment, according to some embodiments.

FIG. 1B is a flowchart illustrating a method 100B of automating testing of an application prior to making the application available for production deployment, according to some embodiments. Method 100B can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 1B, as will be understood by a person of ordinary skill in the art(s).

In 102A, system 110 may receive a submission of the application. This submission may include metadata about the application. The metadata may include relationships to concepts, types, and policies of a domain model and may be used to determine context to interpret events, automate decisions, and optimize actions. System 110 may receive a submission made to a code repository, through an onboarding portal, or via a design environment. Examples of submissions are discussed in the generic use cases below—e.g., steps 312A-C in FIG. 3, and steps 412A-C in FIG. 4. An example of receiving a submission through an onboarding portal in a generic use case is exemplified by steps 508 and 510A-B of FIG. 5. An example of receiving a submission via a design environment is exemplified by step 604 in FIG. 6.

In 102B, system 110 may instantiate a process instance. The process instance may be instantiated to contain all required information to execute at runtime. The process instance may define a plurality of tasks. Each task in the plurality of tasks may define an event. Moreover, each event may be interpreted by system 110 based on post-conditions of a previous task in the plurality of tasks.

In 106B, system 110 may dynamically configure the process instance to define a workflow specifying a set of system and human tasks needed to satisfy the at least one DevOps policy for the application. For example, these policies may be LCM policies and SLA policies configured by a user. System 110 may dynamically configure the process instance based in the received submission and at least one DevOps policy. The varying nature of these workflows is reflected in the four different use cases described below, i.e., across FIGS. 9-10, 13-14, 17-18, and 21-22. For example, steps 912-944 in FIG. 9 may be dynamically configured when onboarding in the use case for testing a secure, multi-cloud network for voice.

In 108B, system 110 may execute the plurality of tasks in the process instance. The tasks executed may perform a variety of functions. The plurality of tasks may coordinate elements needed to process and test the code package. System 110 may coordinate a variety of platform services to perform supporting operations (e.g., connection; integration; configuration; instantiation; deployment automation) necessary to fulfill the tasks. System 110 may dynamically dispatch and configure a set of platform services based on context. For example, a particular task executed among the plurality of tasks may execute a test on the application. A post-condition in the sequence of tasks in the process instance may include results of the test. A test may ensure that the submission received in 104B passes all functional and non-functional requirements. For example, system 110 may perform tests as described below with reference to the generic use case in step 338-344 of FIG. 3 and steps 438-444 of FIG. 4. A particular task executed among the plurality of tasks may specify use of third party components that are orchestrated by system through platform services as part of fulfilling the task.

FIG. 1C is a table 100C indicating Day 0 tasks performed across stages and layers in a generic use-case, according to some embodiments.

Columns 102C illustrate possible stages of a DevOps process. For example, columns 102C may include stages for establishing a DMZ, deployment, configuration, and verification. Each stage in columns 102C may involve performing Day 0 tasks relevant to the generic use-case and to that stage.

Rows 104C illustrate several layers in an architecture where relevant Day 0 tasks are performed. For example, rows 104C may include an application layer, an infrastructure layer, and an network layer.

Cells 106C illustrate indicative Day 0 tasks that are performed at each layer and stage (reflected by columns 102C and rows 104C) that are applicable to the generic use case. Each task typically requires one or more operations, which are performed by one or more platform services (described below as platform services 241-253). The table below reflects particular platform services among platform services 241-253 that may be engaged by system 110 to perform the tasks in cells 106C:

| Task | Platform Services |
| --- | --- |
| Calculate Network Topology to support selected Applications | PS 13 Transaction Services, PS 12 Security & Identity, PS 2 Domain Services, PS 3 Decision Services (Network), PS 3 Decision Services (Application), PS 9 Integration (Network), PS 9 Integration (Service) |
| Install Certs & Auths | PS 13 Transaction Services, PS 12 Security & Identity, PS 2 Domain Services, PS 3 Decision Services (Data), PS 9 Integration (Infrastructure) |
| Create VPCs, Subnets | PS 13 Transaction Services, PS 12 Security & Identity, PS 2 Domain Services, PS 3 Decision Services (Network), PS 9 Integration (Network), PS 6 Configuration (Network), PS 6 Configuration (Activation) |
| Deploy Pods/VMs for network functions ("xNFs") | PS 13 Transaction Services, PS 12 Security & Identity, PS 2 Domain Services, PS 3 Decision Services (Application), PS 6 Configuration (Infrastructure), PS 9 Integration (Activation) |
| Connect Storage to Application Pods/VMs | PS 13 Transaction Services, PS 12 Security & Identity, PS 2 Domain Services, PS 3 Decision Services (Network), PS 9 Integration (Data), PS 9 Integration (Infrastructure), PS 6 Configuration (Infrastructure) |
| Connect Subnets to Application Pods/VMs | PS 13 Transaction Services, PS 12 Security & Identity, PS 2 Domain Services, PS 3 Decision Services (Network), PS 9 Integration (Network), PS 9 Integration (Application) |
| Configure xNFs | PS 13 Transaction Services, PS 12 Security & Identity, PS 2 Domain Services, PS 3 Decision Services (Application), PS 12 Connection (Application), PS 6 Configuration (Application) |

-continued

| Task | Platform Services |
|---|---|
| Configure Simulation Tools/Metrics Aggregation Tools to Operate Over Established Service | PS 13 Transaction Services, PS 12 Security & Identity, PS 2 Domain Services, PS 3 Decision Services (Application), PS 3 Decision Services (Network), PS 3 Decision Services (Infrastructure), PS 12 Connection (Application), PS 6 Configuration (Infrastructure), PS 7 Orchestration (Infrastructure) |
| Configure Service-Chaining | PS 13 Transaction Services, PS 12 Security & Identity, PS 2 Domain Services, PS 3 Decision Services (Network), PS 9 Integration (Network), PS 9 Integration (Service) |
| Evaluate Test Results and publish to Catalog or return errors | PS 13 Transaction Services, PS 12 Security & Identity, PS 2 Domain Services, PS 3 Decision Services (Application), PS 3 Decision Services (Infrastructure), PS 3 Decision Services (Network), PS 3 Decision Services (Service), PS 7 Orchestration (Service) |
| Remove Pods, Containers, VMs (after tests complete) | PS 13 Transaction Services, PS 12 Security & Identity, PS 2 Domain Services, PS 3 Decision Services (Application), PS 3 Decision Services (Infrastructure), PS 6 Configuration (Activation) |
| Remove VPCs, Subnets (after tests complete) | PS 13 Transaction Services, PS 12 Security & Identity, PS 2 Domain Services, PS 3 Decision Services (Network), PS 9 Integration (Network), PS 6 Configuration (Network), PS 6 Configuration (Activation) |

System 110 dynamically matches, dispatches, configures, and coordinates these platform services to perform these tasks. Table 100C demonstrates the breadth, i.e., the end-to-end scope of the disclosed single-platform based process and the depth, i.e., tasks being performed at all layers, as overseen by one process. These tasks are further detailed in the sequence diagrams included below.

Figure 2:
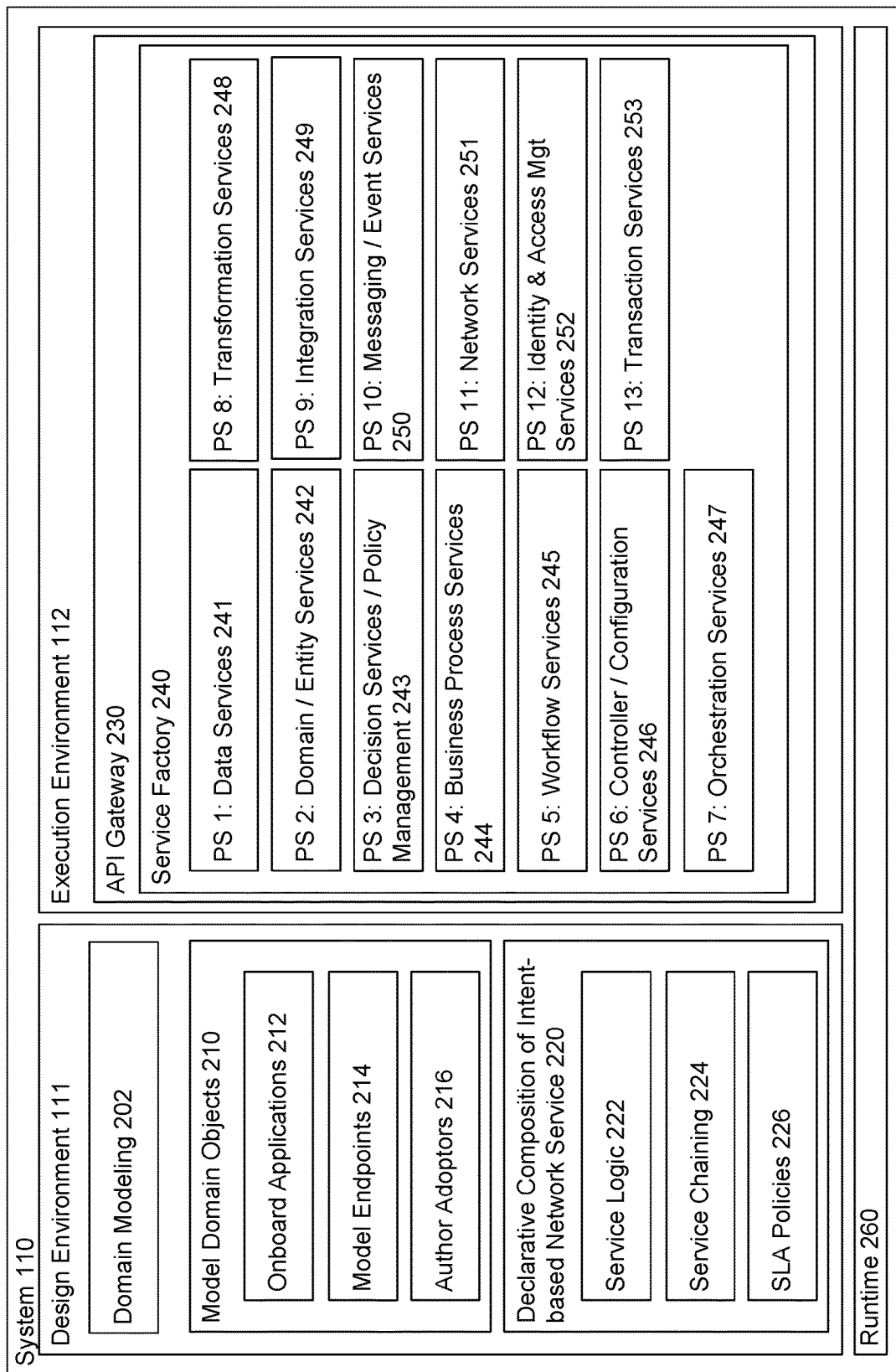
FIG. 2 is a block diagram of system architecture for a no-code integration and automation platform.
Figure 3A:
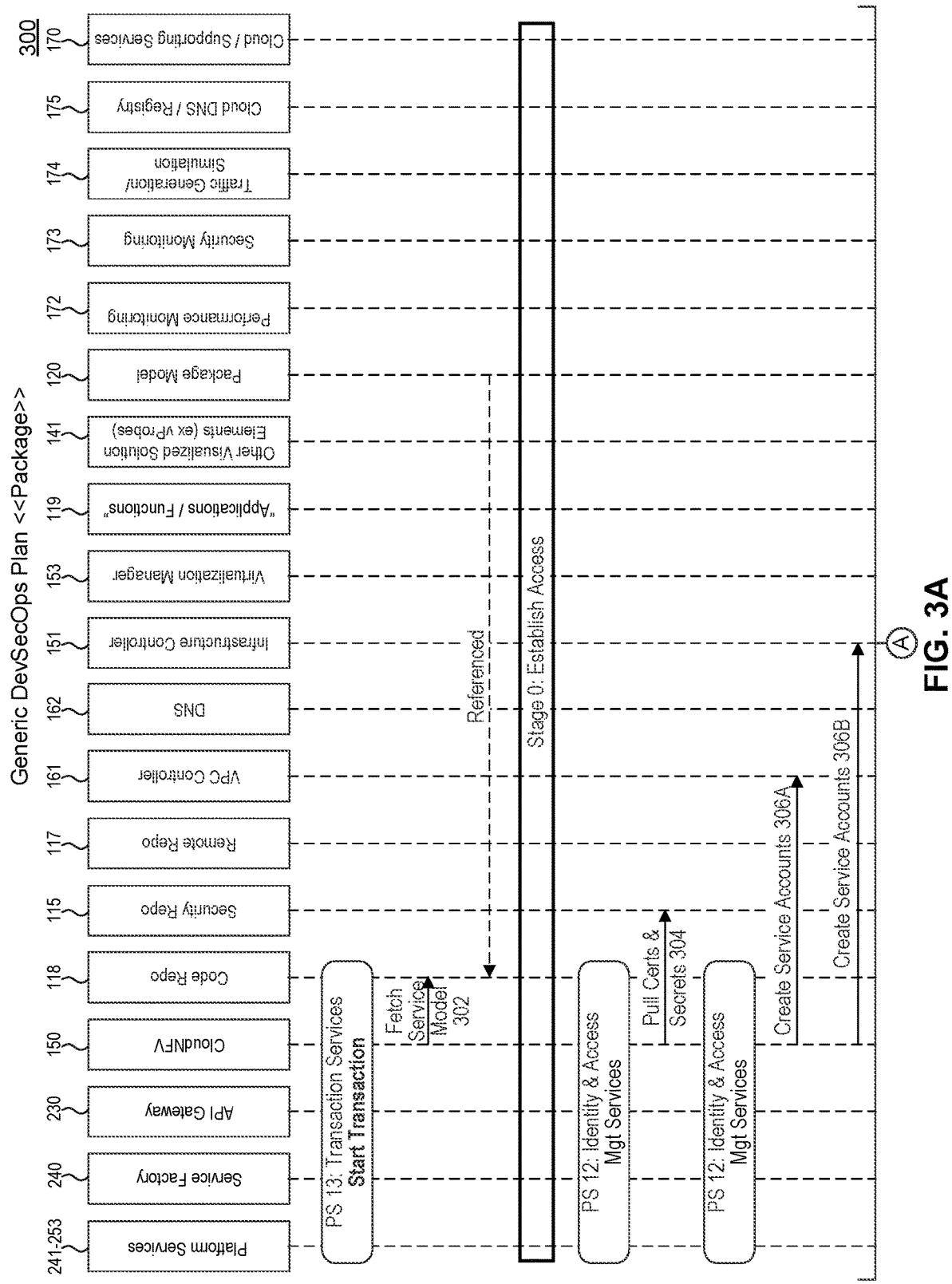
Figure 3B:
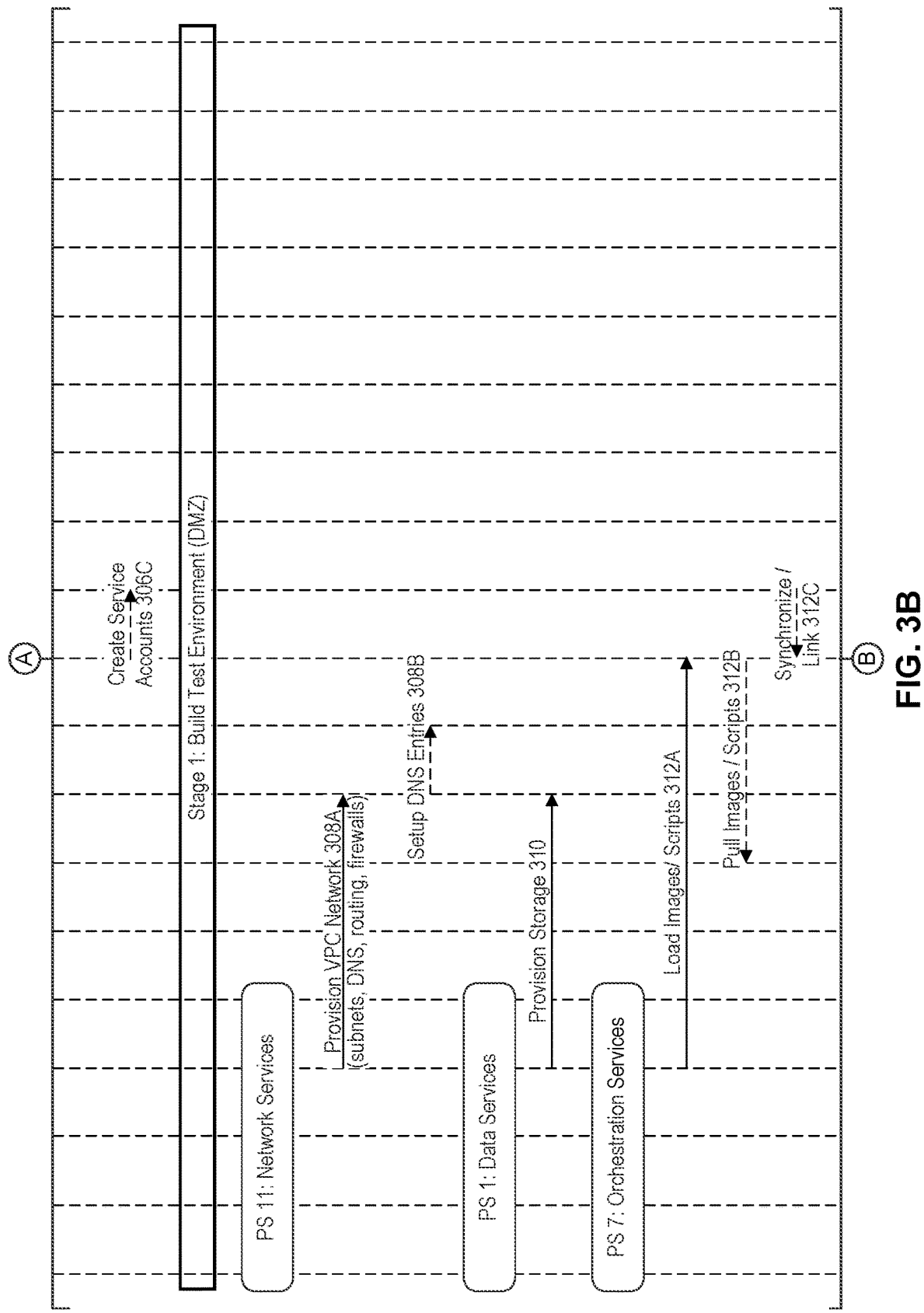
Figure 3C:
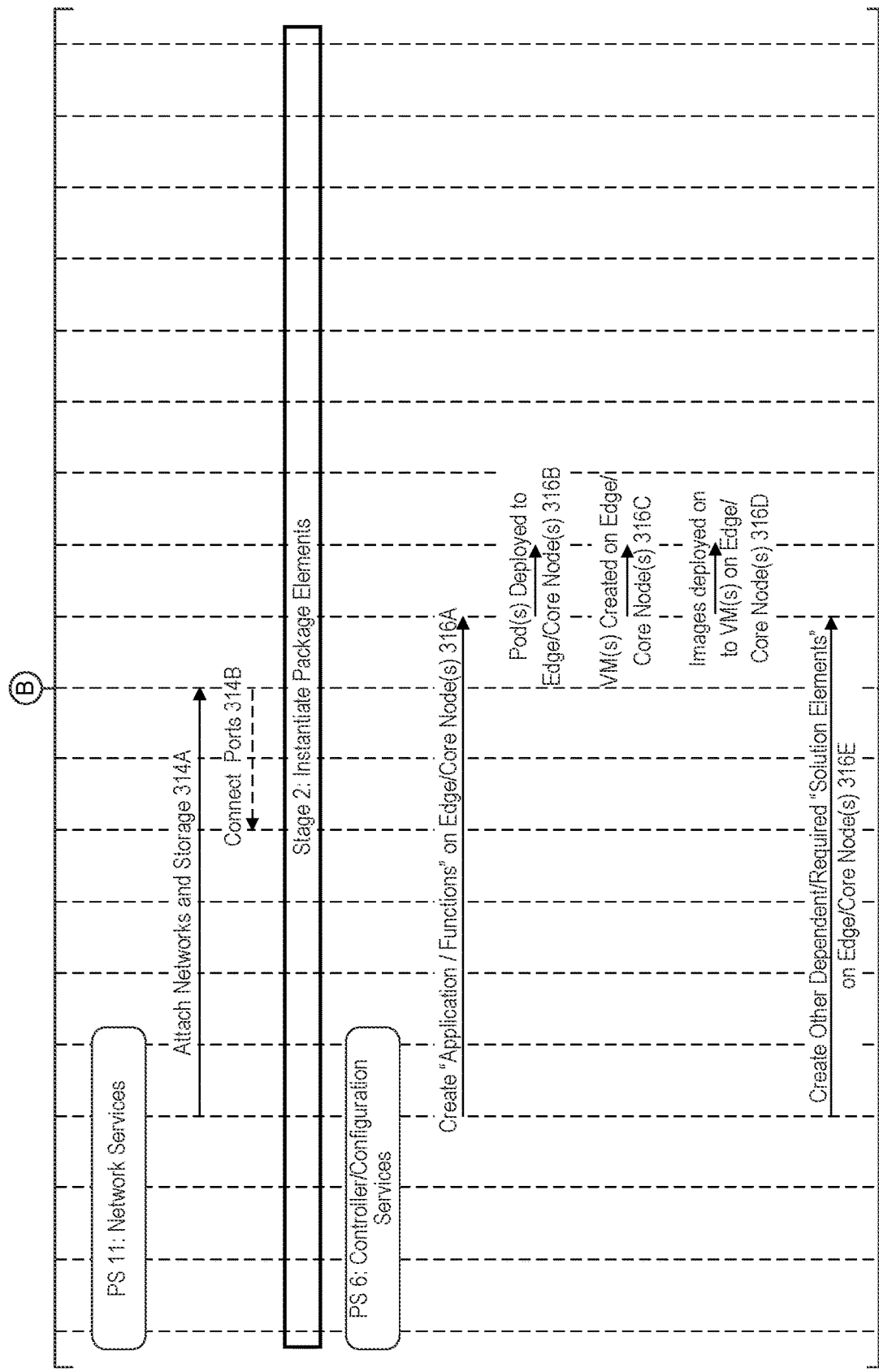
Figure 3D:
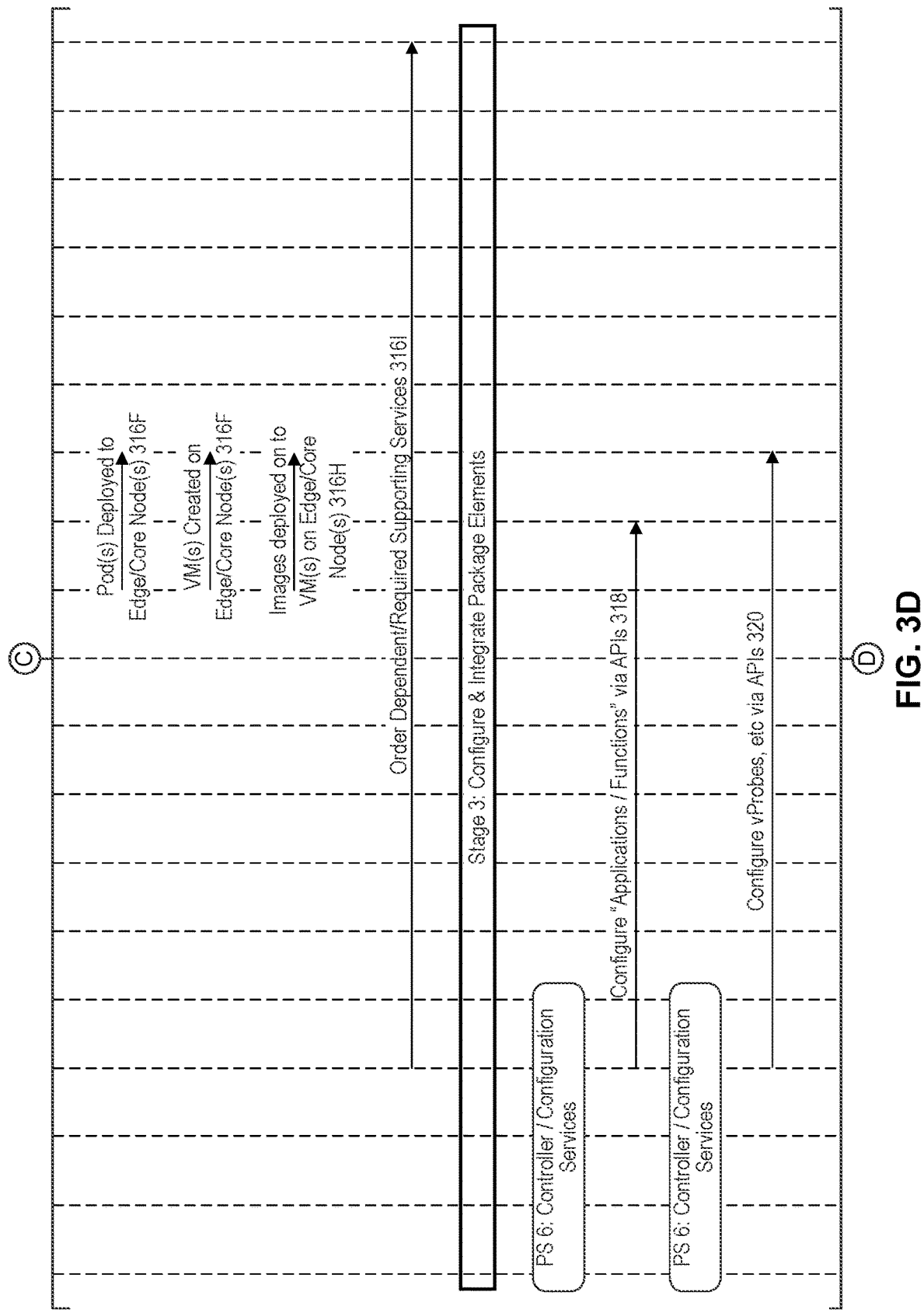
Figure 3E:
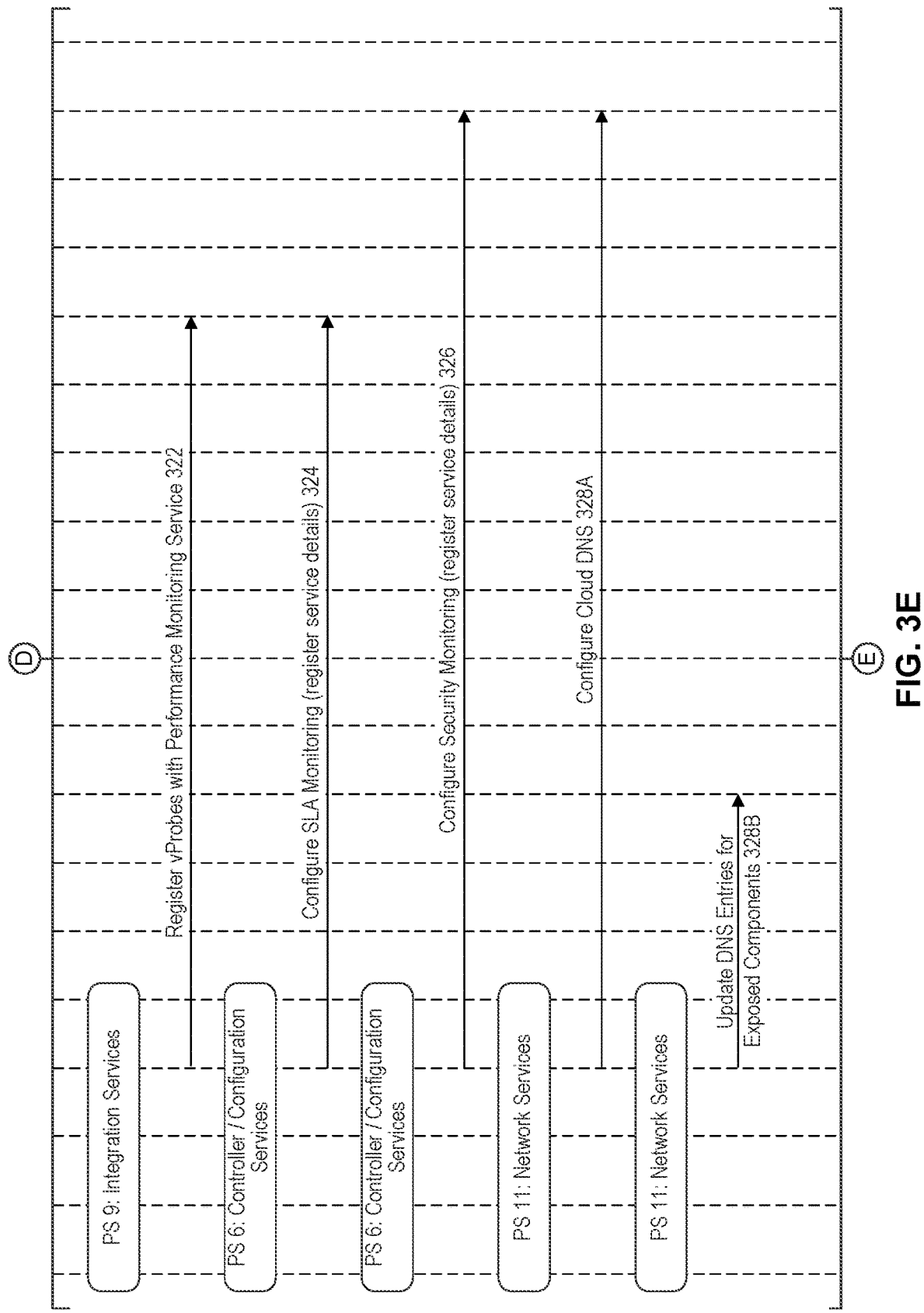
Figure 3F:
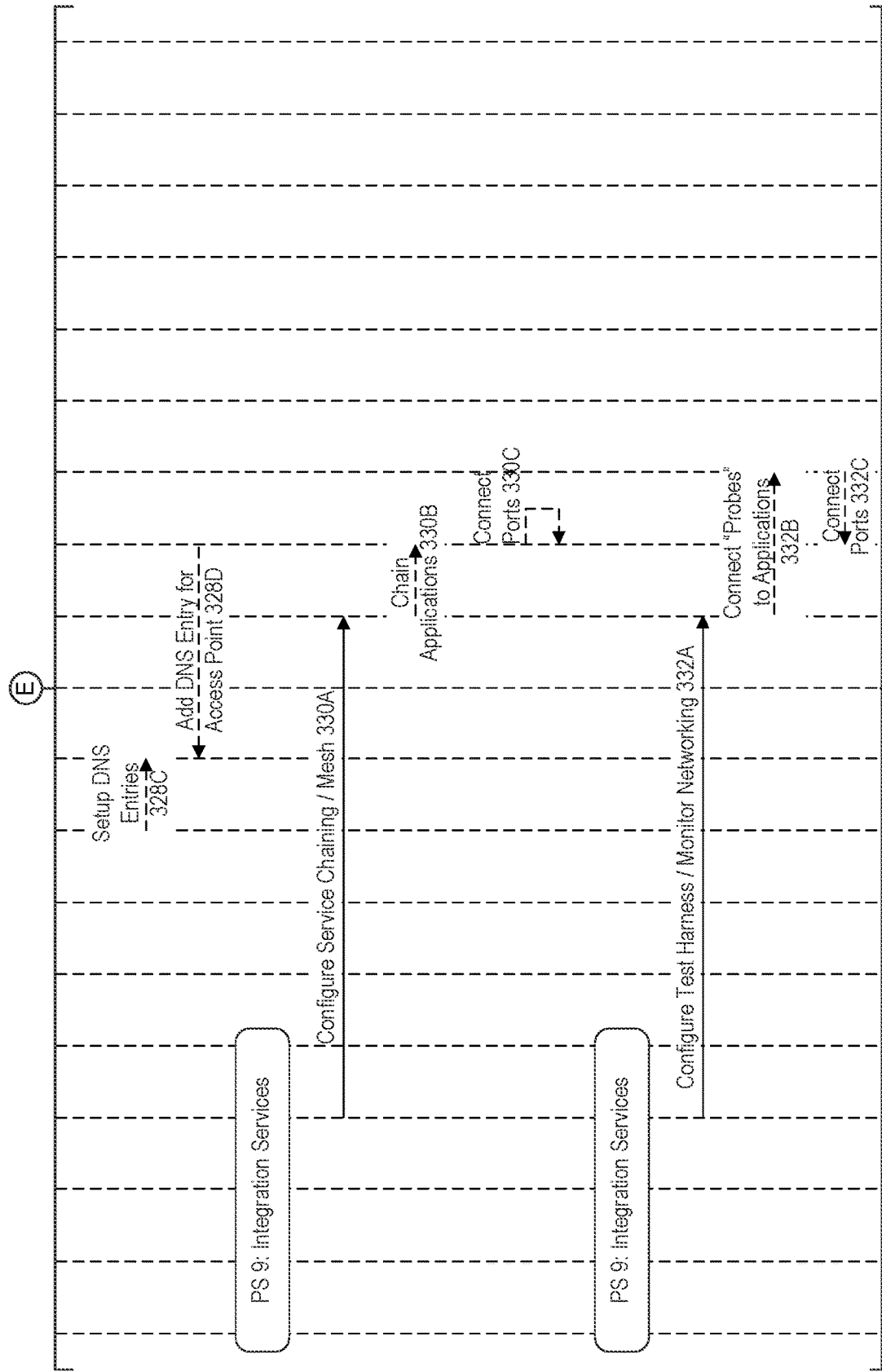
Figure 3I:
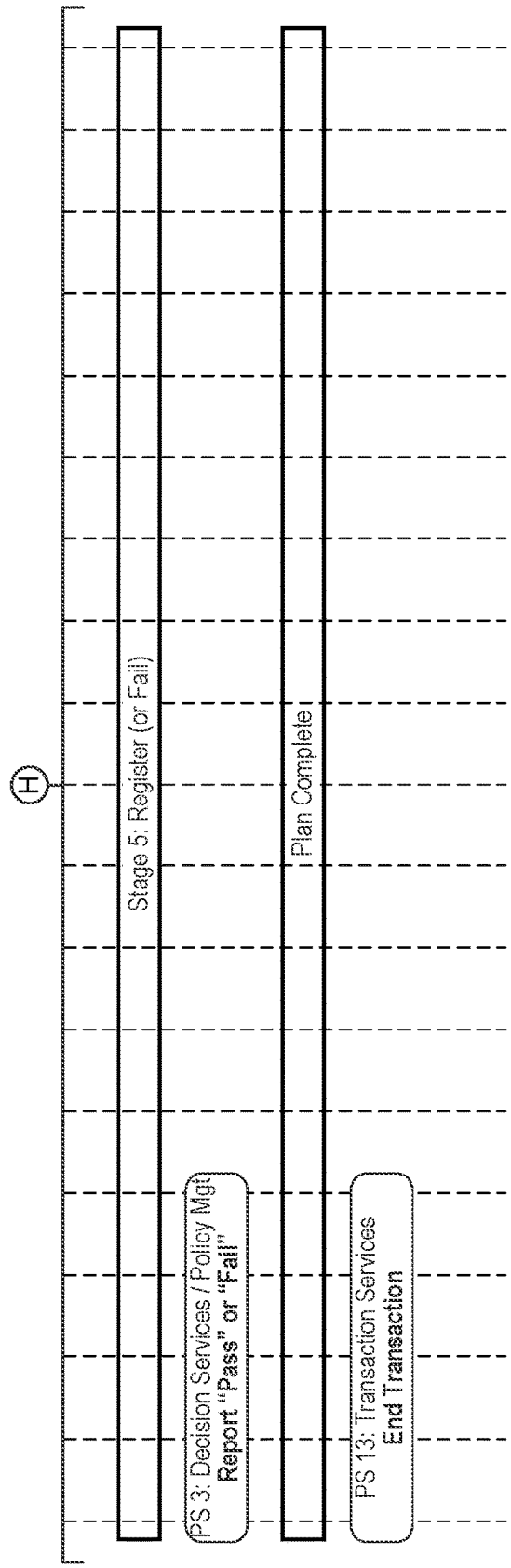
Figure 4A:
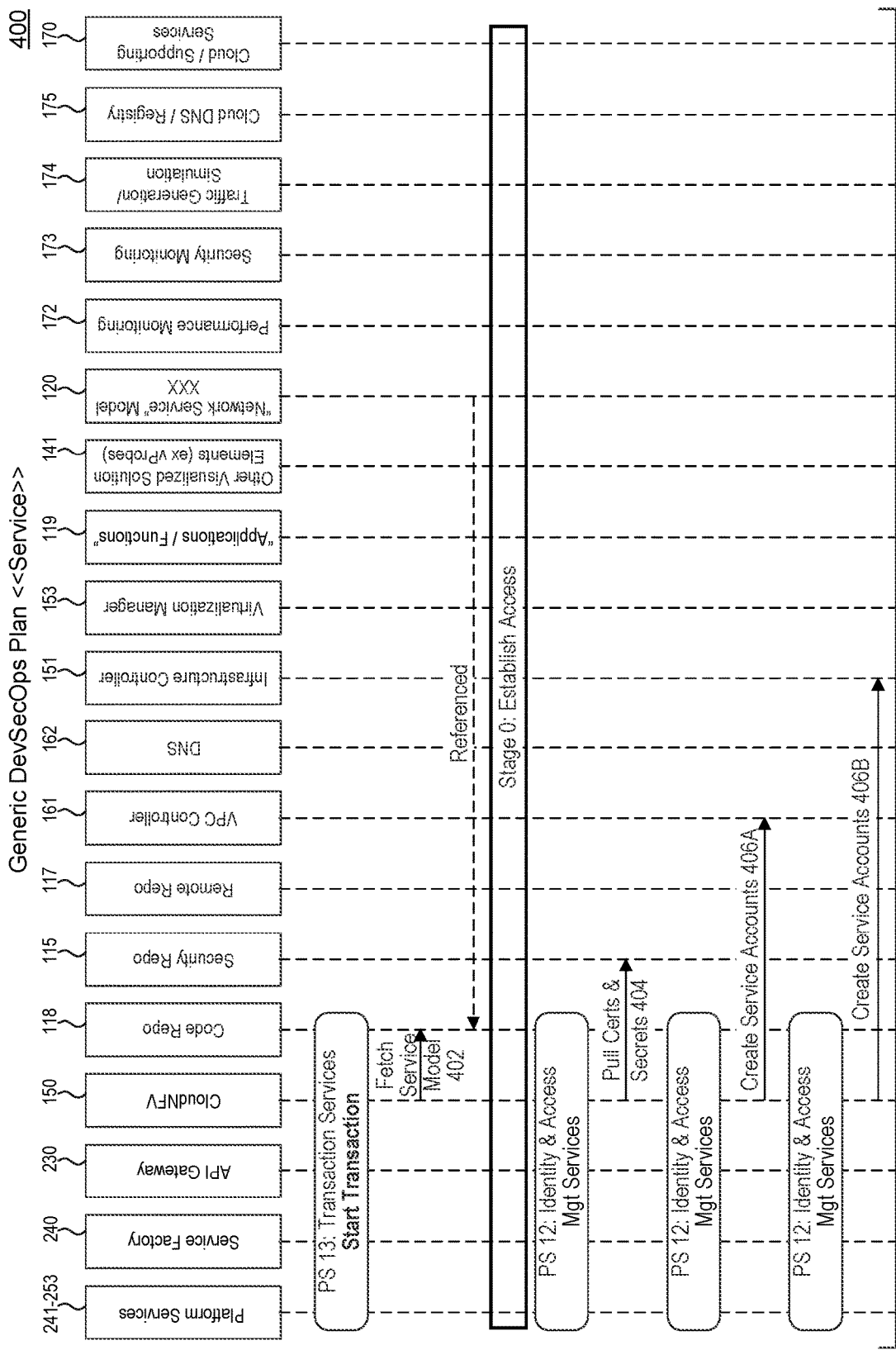
Figure 4B:
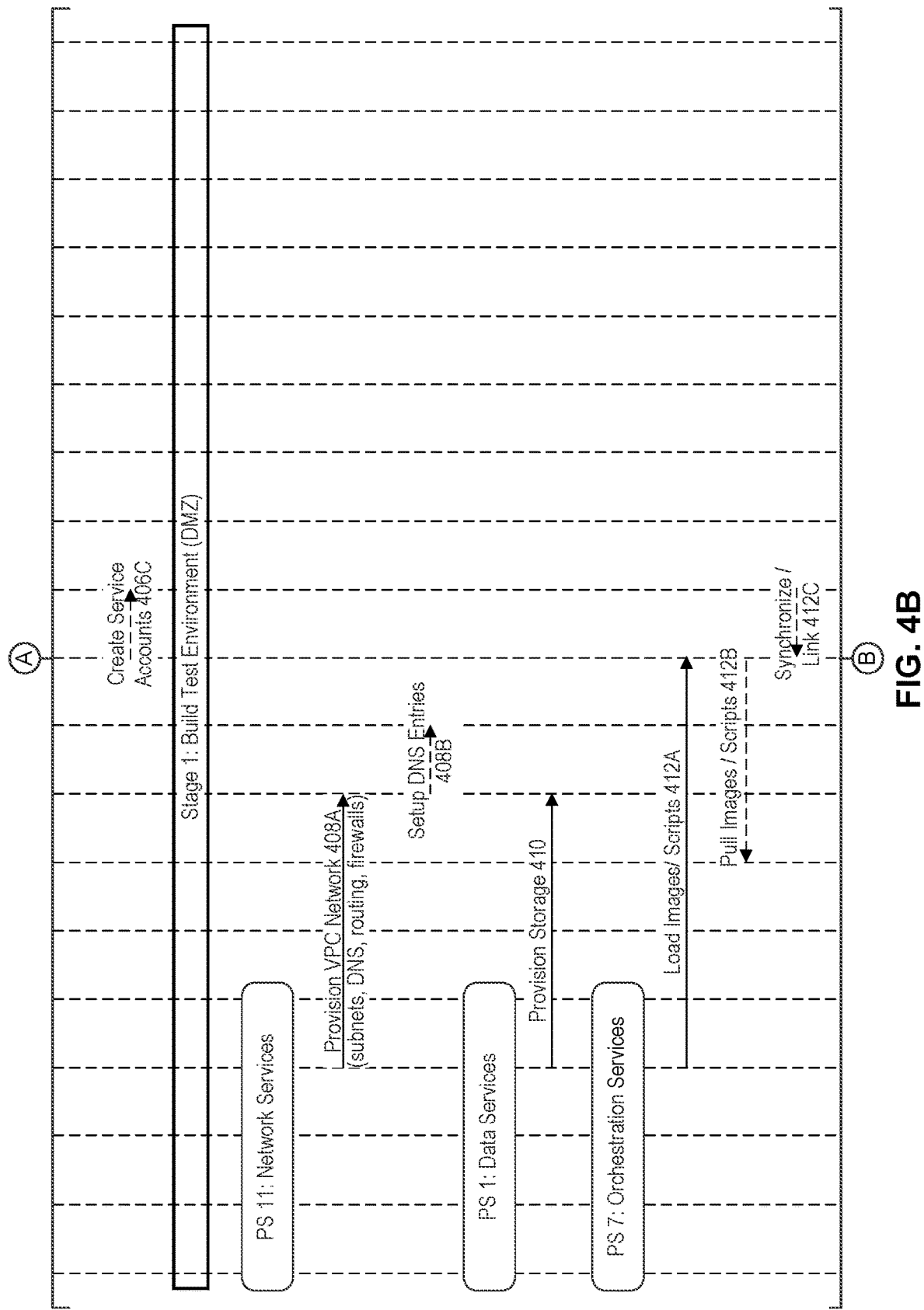
Figure 4C:
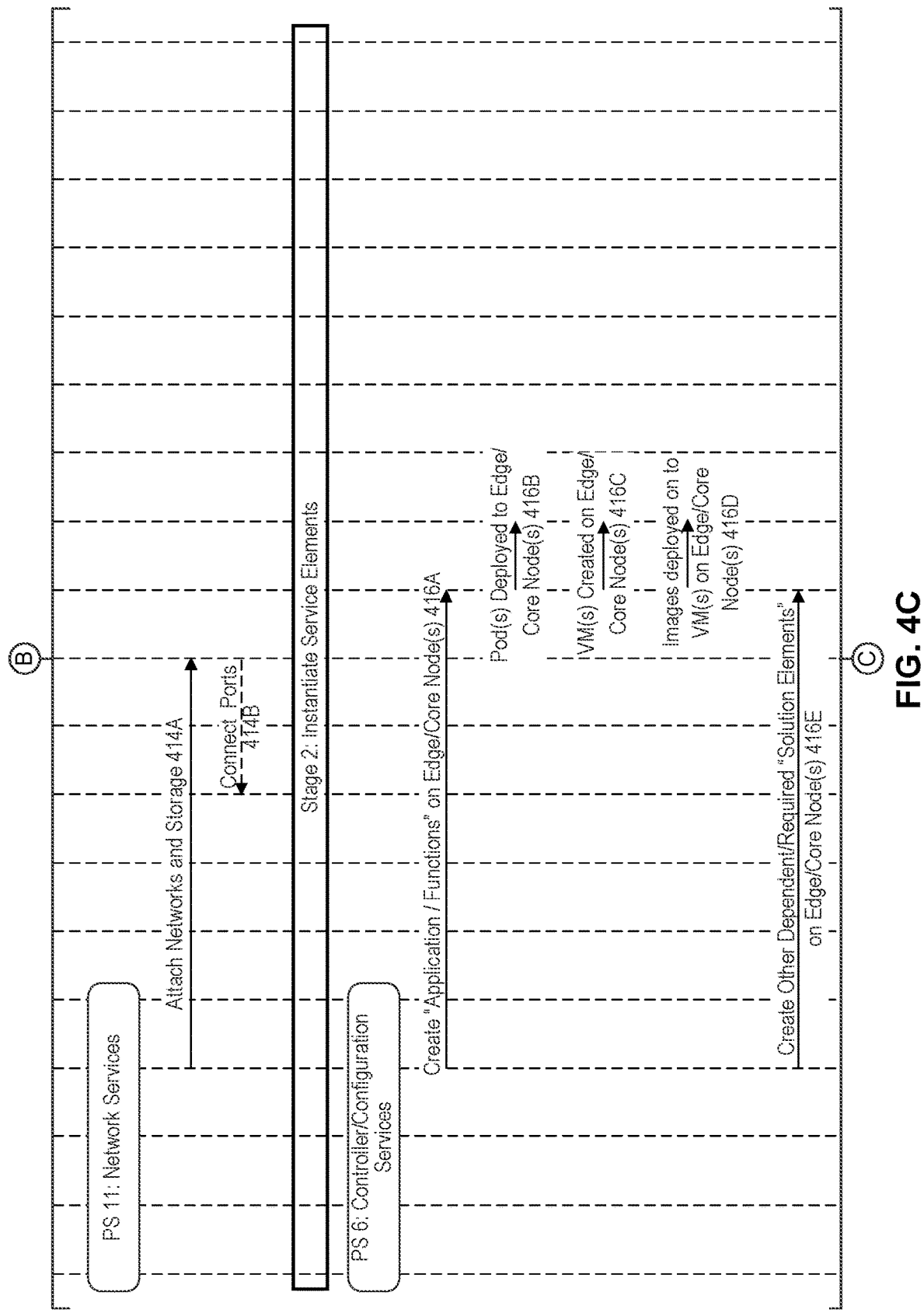
Figure 4E:
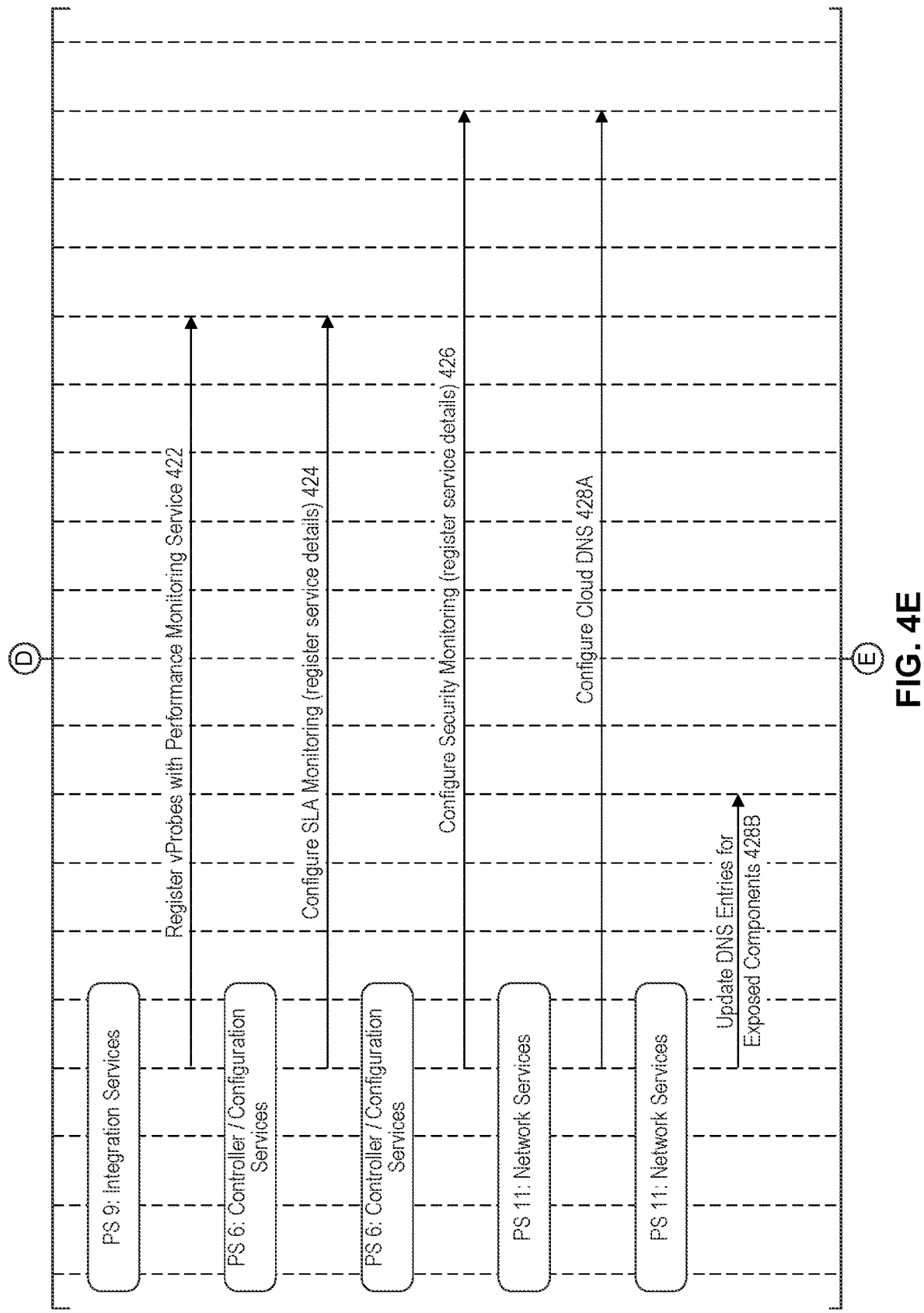
Figure 4F:
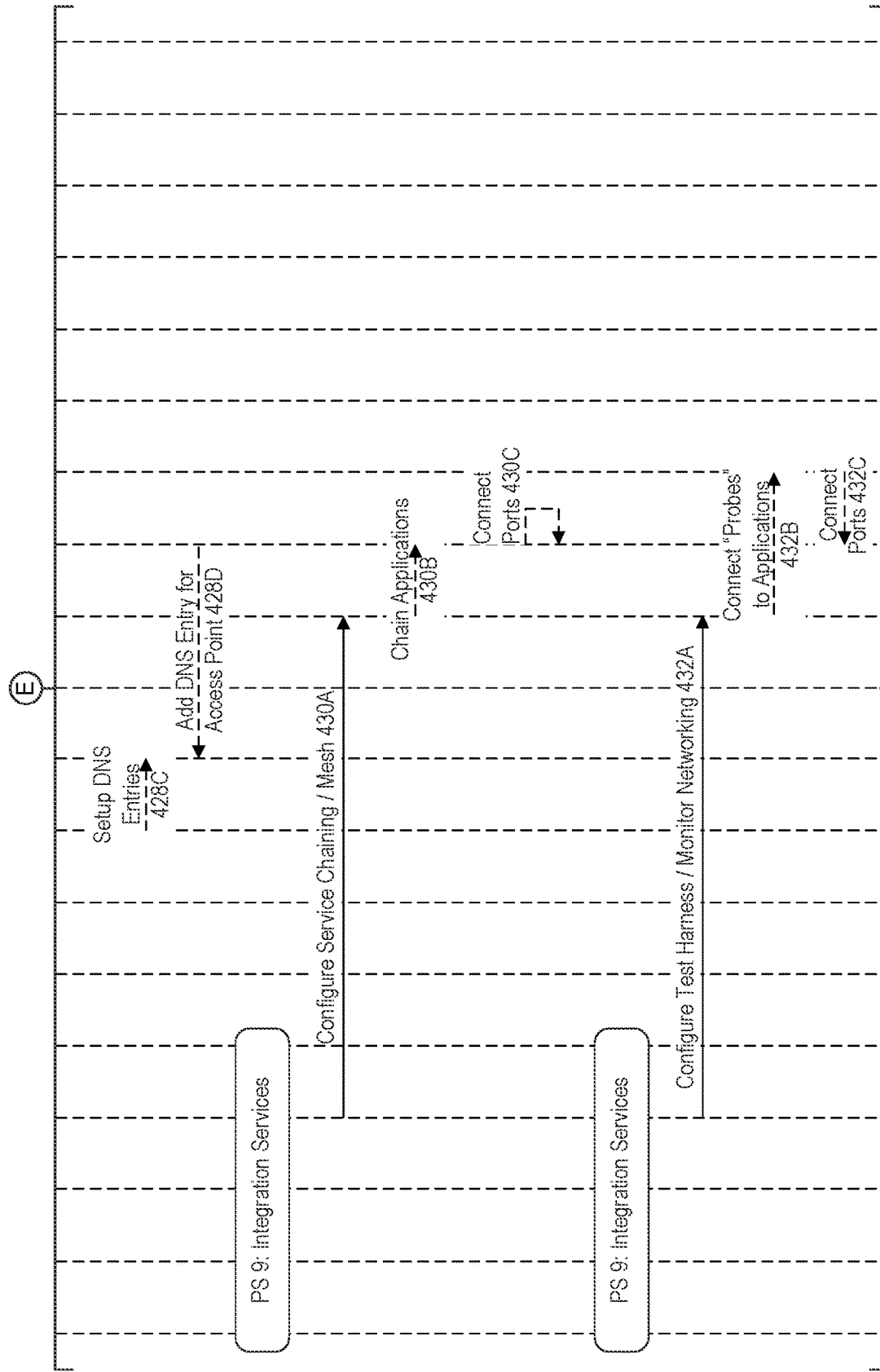
Figure 4H:
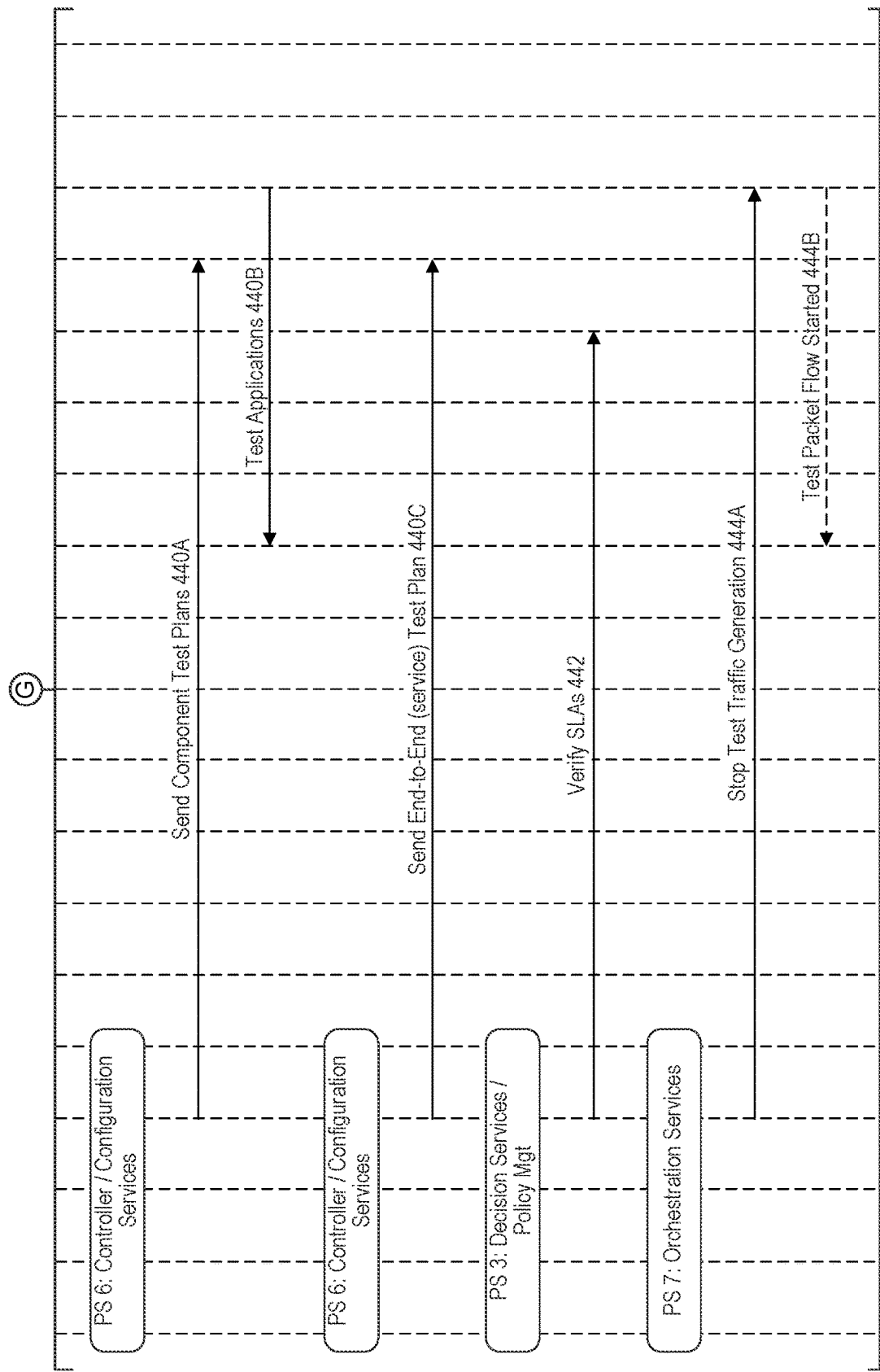
Figure 4I:
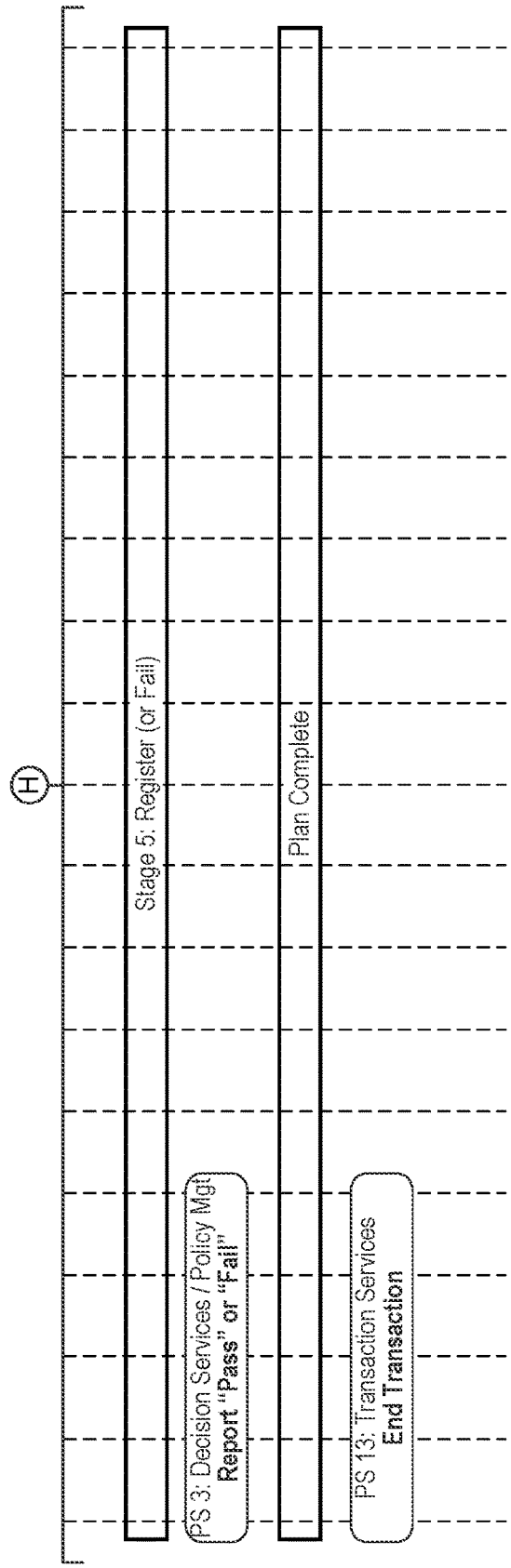

FIG. 2 is a block diagram 200 further detailing a no-code integration and automation platform, such as system 110 described in FIG. 1A. System 110 may include design environment 111, execution environment 112, and runtime 260.

In an embodiment, design environment 111 and execution environment 112 may be conceptual "modes of operation" and not discrete technologies or components. Both design environment 111 and execution environment 112 may use runtime 260 (in design mode, systems/methods may encode objects and in execution mode the same systems/methods may de-code those objects).

Design environment 111 may include domain modeling 202, model domain objects 210, onboard applications 212, model endpoints 214, author adaptors 216, declarative composition 220, service logic 222, service chaining 224, and SLA policies 226. Design environment 111 may be a declarative no-code design environment used for modeling objects, compositions, and processes. Users may be supported during design by a type system which dynamically prompts them for inputs based on the context of the tasks they are engaged in. The type system may support all required tasks for implementing telecommunication use-cases ranging from high level-domain modeling to composing service definitions. Design environment 111 may enable developers to rapidly and declaratively onboard elements, compose services, and chain processes without having to modify the underlying language.

Execution environment 112 may include application programming interface ("API") gateway 230, service factory 240, and platform services 241-253. Execution environment 112 may provide middleware capabilities implemented as stateless, event-driven serverless functions that are dynamically matched, dispatched, configured and coordinated based on interaction context. Each platform service in platform services 241-253 relates to category of message-oriented middleware and other supporting services. In one implementation, each platform service in platform services 241-253 represents a set of middleware capabilities (e.g. integration, orchestration, configuration, workflow automation) or other supporting capabilities (connection, communication, security/identity) that correspond to the name of the platform service. Each platform service may be exposed by an API and implemented as a stateless event-driven ephemeral function that is dynamically instantiated by the type system and configured based on interaction context. Message-oriented middleware ("MOM") is software or hardware infrastructure supporting sending and receiving messages between distributed systems. MOM allows application modules to be distributed over heterogeneous platforms and reduces the complexity of developing applications that span multiple operating systems and network protocols. The middleware creates a distributed communications layer that insulates the application developer from the details of the various operating systems and network interfaces. APIs that extend across diverse platforms and networks are typically provided by MOM. Each platform service in platform services 241-253 shares a common design. Each platform service in platform services 241-253 may be composed of a set of algebraic operators that render the contextualized functionality.

Each sequence diagram (e.g., FIGS. 3-6) is organized the same. System 110's components for platform services 241-253, service factory 240, API gateway 230, and virtualization manager 153, which together are responsible for execution are shown to the left. Each system interaction includes a note indicating which platform service in platform services 241-253 is rendered (i.e., matched, dispatched, configured) to deliver the task. The right side shows the resulting interaction with the system's actors.

Generic Use Case—DevOps for an Application Package Model

FIGS. 3A-3I are a sequence diagram illustrating a method 300 of performing a DevOps plan to assure new applications before they are added to the system catalog(s) in a generic use case, according to some embodiments. Method 300 may be executed at any point when a new application package model is onboarded during Day 0 design activities. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 3A-3I, as will be understood by a person of ordinary skill in the art(s).

A DevOps plan for an application package model takes an application package model as input and proceeds through the following stages:

Stage 0: Establish Access
Stage 1: Build Test Environment (DMZ)
Stage 2: Instantiate Package Elements
Stage 3: Configure & Integrate Package Elements
Stage 4: Verify Package
Stage 5: Register (or Fail)

The purpose of the plan is to test/assure the application represented by the application package model. The plan tests that the application package model passes all functional and non-functional requirements. For an application package, functional testing may focus on details related to how the application executes in isolation including checking ports, APIs and other interfaces, simulating application-specific traffic patterns, and comparing the behavior to related QoS metrics. The plan certifies that the application package model is ready for deployment by the system. If during the testing process the plan fails, all resources are rolled back/destroyed and a list of errors/problems is returned to the Day 0 activity which triggered the DevOps plan. If the plan passes, all resources are rolled back/destroyed and a signal is sent to the Day 0 activity so that it can proceed with registering the package in the catalog.

DevOps for an Application Package Model—Stage 0: Establish Access

Method 300 starts with system 110 opening up a transaction, so that all tasks can be rolled back and the infrastructure can be restored if there is a failure, or once the process completes. All interactions happen within this transaction. For this, system 110 renders (i.e., matches, dispatches, and configures) platform service 253 (PS 13: Transaction Services, providing orchestration-related middleware capabilities), then upon opening the transaction, in 302, system 110 fetches the initial context required to carry out the sequence by fetching the application package model from code repository 118. System 110 also creates a process token (or links to one if it already exists) to implement the transaction and allow the tasks in the use-case depicted to execute asynchronously.

In 304, system 110 may requires a security context to interact with the underlying systems where testing will occur, so renders (i.e., matches, dispatches, and configures) platform service 252 (PS 12: Identity & Access Mgt. Services, providing connection-related middleware capabilities at the infrastructure layer) which pulls security credentials from security repository 115.

In 306A-C, system 110 may require service accounts to work with the infrastructure, so renders (i.e., matches, dispatches, and configures) platform service 252 (PS 12: Identity & Access Mgt. Services, providing connection-related middleware capabilities at the infrastructure layer) to create them for use with VPC controller 161, infrastructure controller 151, and virtualization manager 153.

Once access is established method 300 proceeds to Stage 1: Build Test Environment (DMZ).

DevOps for an Application Package Model—Stage 1: Build Test Environment (DMZ)

In 308A-B, system 110 may setup the base network for the service context where the application will be tested, so renders (i.e., matches, dispatches, and configures) platform service 251 (PS 11: Network Services, providing configuration-related middleware capabilities at the network layer) which computes the network topology, protocols, constraints and other properties required, and uses VPC controller 161 to create subnets, DNS, routing and firewalls to support the service.

In 310, system 110 may setup storage for the application, so renders (i.e., matches, dispatches, and configures) platform service 241 (PS 1: Data Services, providing configuration-related middleware capabilities at the infrastructure layer) which computes the storage types, volumes and other properties required, and uses VPC controller 161 to provision storage to support the application.

In 312A-C, system 110 may ensure that the artifacts connected to the application package (scripts, images, etc.) are available for virtualization manager 153 which will provision the application nodes, so renders (i.e., matches, dispatches, and configures) platform service 247 (PS 7: Orchestration Services, providing orchestration-related middleware capabilities at the infrastructure layer) which coordinates the transfer of images from remote repository 171 to a local image repository found in the infrastructure.

In 314A-B, system 110 needs to attach provisioned resources to compute nodes where the application will be instantiated, so renders (i.e., matches, dispatches, and configures) platform service 251 (PS 11: Network Services, providing configuration-related middleware capabilities at the network layer) which attaches the networks and storage to the nodes via VPC controller 161.

Once the test environment is created, method 300 proceeds to Stage 2: Instantiate Package Elements.

DevOps for an Application Package Model—Stage 2: Instantiate Package Elements

In 316A-I, instantiating package elements means deploying the application, so system 110 renders (i.e., matches, dispatches, and configures) platform service 246 (PS 6: Controller/Configuration Services, providing deployment-related middleware capabilities at the infrastructure layer) for this purpose. They determine the specific compute requirements of each component in the application and either create Pod/Containers or VMs for them via infrastructure controller 151, resulting in one or more components for the application.

Once instantiated, method 300 proceeds to Stage 3: Configure & Integrate Package Elements.

DevOps for an Application Package Model—Stage 3: Configure & Integrate Package Elements In 318, system 110 may configure the core application, so renders (i.e., matches, dispatches, and configures) platform service 246 (PS 6: Controller/Configuration Services, providing deployment-related middleware capabilities at the infrastructure layer) for this purpose. System 110 may determine the specific configuration requirements for the application so that it can perform both individually and collectively (as part of the service) and resolves details needed such as types, formats and protocols required to carry out the configurations, then proceeds to configure the components via their available interfaces, e.g., representational state transfer ("REST"), command-line interface ("CLI"), or other suitable interface.

In 320, system 110 may configure supporting applications, so renders (i.e., matches, dispatches, and configures) platform service 246 (PS 6: Controller/Configuration Services, providing integration-related middleware capabilities at the application layer) for monitoring and to determine the specific configuration requirements of the virtual probe which is used by performance monitoring service 172, and resolve details needed such as types, formats and protocols required to carry out the configurations. System 110 may then proceed to configure the via the available interface.

In 322, system 110 may register the probe with performance monitoring service 172, so renders (i.e., matches, dispatches, and configures) platform service 249 (PS 9: Integration Services, providing integration-related middleware capabilities at the application layer) for this purpose.

In 324, system 110 may configure related SLAs within performance monitoring service 172, so renders (i.e., matches, dispatches, and configures) platform service 246 (PS 6: Controller/Configuration Services, providing integration-related middleware capabilities at the application layer) for this purpose.

In 326, system 110 may configure security monitoring service 173, so renders (i.e., matches, dispatches, and configures) platform service 246 (PS 6: Controller/Configuration Services, providing integration-related middleware capabilities at the application layer) for this purpose.

In 328A-D, for testing, system 110 may expose the deployed components to the system at large, so renders (i.e., matches, dispatches, and configures) platform service 251 (PS 11: Network Services, providing configuration-related middleware capabilities at the network layer) which resolves hostname, port and other requirements for the application/service context and configures the local DNS via VPC Controller 161 and/or Cloud DNS/Registry 175.

In 330A-C, system 110 may chain (link) deployed components together so they function as a composite application, so renders (i.e., matches, dispatches, and configures) platform service 249 (PS 9: Integration Services, providing integration-related middleware capabilities at the network layer) which resolves the protocols, ports and other networking requirements needed to establish required packet throughput, and sends a command to virtualization manager 153 to connect ports and perform other required tasks on the Pods/Containers and VMs involved.

In 332A-C, system 110 may chain (link) the deployed components together with any monitoring components so they can be observed, so renders (i.e., matches, dispatches, and configures) platform service 249 (PS 9: Integration Services, providing integration-related middleware capabilities at the network layer) which resolves the protocols, ports and other networking requirements needed, and sends a command to virtualization manager 153 to connect ports and perform other required tasks on the Pods/Containers and VMs involved.

In 334A-C, if the application package model includes possible hardware optimizations, which are applicable for the given infrastructure, system 110 may render platform service 249 (PS 9: Integration Services, providing integration-related middleware capabilities at the infrastructure layer) which calculates the optimal configuration of packet routing for the specified service, converts this configuration into a set of commands to execute on the hardware, e.g., a network interface controller ("NIC") and uses the commands to program the NIC via infrastructure controller 151.

Once the application is ready in the DMZ/Test environment, method 300 proceeds to Stage 4: Verify Package.

DevOps for an Application Package Model—Stage 4: Verify Package

In 336, for testing/verification, system 110 may start a flow of simulated test traffic, so renders (i.e., matches, dispatches, and configures) platform service 246 (PS 6: Controller/Configuration Services, providing integration-related middleware capabilities at the application layer) which determines the formats and protocols required for the test traffic, any other specific characteristics of the traffic, and details such as target IPs/Ports, and configures the traffic generation/simulation component for these purposes via REST.

In 338A-B, once simulated traffic is configured, system 110 may start the simulated traffic, so renders (i.e., matches, dispatches, and configures) platform service 247 (PS 7: Orchestration Services, providing orchestration-related middleware capabilities at the infrastructure layer) for this purpose.

In 340A-C, for testing, system 110 may verify the success of unit (per application/component) and end-to-end security test plans, so renders (i.e. matches, dispatches, and configures) platform service 246 (PS 6: Controller/Configuration Services, providing integration-related middleware capabilities at the application layer) to compile these plans based on the characteristics of components and the application, and executes them via security monitoring service 173.

In 342, system 110 may verify that SLAs are met by the application under-load, so renders (i.e., matches, dispatches, and configures) platform service 243 (PS 3: Decision Services/Policy Mgt., providing workflow automation-related middleware capabilities at the application layer) to carry out this evaluation via performance monitoring service 172.

In 344A-B, after testing is completed, simulated traffic may be stopped, so system 110 renders (i.e., matches, dispatches, and configures) platform service 247 (PS 7: Orchestration Services, providing orchestration-related middleware capabilities at the application layer) for this purpose.

Once verification is complete, method 300 proceeds to Stage 5: Register (or Fail).

DevOps for an Application Package Model—Stage 5: Register (or Fail)

The success/failure of the test plan may be evaluated and a signal (pass or fail with a list of errors) sent to the Day 0 activity which initiated the DevOps plan, platform service 243 (PS 3: Decision Services/Policy Mgt., providing workflow automation-related middleware capabilities at the application layer) is rendered (i.e., matched, dispatched, configured) by system 110 for this purpose. Finally, execution of the DevOps plan ends with system 110 closing the transaction via rendered (i.e. matched, dispatched and configured) platform service 253 (PS 13: Transaction Services, providing orchestration-related middleware capabilities). System 110 may at this point roll back any infrastructure changes, remove the DMZ/Test environment, and return any resources back to the pool for future use.

Generic Use Case—DevOps for a Service Model

FIGS. 4A-4I are a sequence diagram illustrating a method 400 of performing a DevOps plan executed to assure new services before they are added to the system catalog(s), according to some embodiments. Method 400 may be executed at any point when a service model is composed during Day 0 design activities. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 4A-4B, as will be understood by a person of ordinary skill in the art(s).

A DevOps plan for a service takes a service model as input, and proceeds through the following stages:
Stage 0: Establish Access
Stage 1: Build Test Environment (DMZ)
Stage 2: Instantiate Service Elements Stage 3: Configure & Integrate Service Elements
Stage 4: Verify Service
Stage 5: Register (or Fail)

The purpose of the plan is to test/assure the Service represented by the model, that is passes all functional and non-functional requirements, certifying it is ready for deployment by the system. For a service model, the functional testing will focus on details related to how the composed service elements execute collectively including checking service chains, simulating service-specific traffic patterns, and comparing the results to related QoS metrics. If during the testing process the plan fails, all resources are rolled back/destroyed and a list of errors/problems is returned to the Day 0 activity which triggered the DevOps plan. If the plan passes, all resources are rolled back/destroyed and a signal is sent to the Day 0 activity so that it can proceed with registering the service in the catalog.

In 402, method 400 starts with system 110 opening up a transaction, so that all tasks can be rolled back/the infrastructure can be restored if there is a failure, or once the process completes. All interactions of the system happen within a transaction. For this, system 110 may render platform service 253 (PS 13: Transaction Services, providing orchestration-related middleware capabilities), then upon opening the transaction fetches the initial context required to carry out the sequence, fetch the service model from code repository 118. System 110 also creates a process token (or links to one if it already exists), to implement the transaction and allow the tasks in the use-case depicted to execute asynchronously.

DevOps for a Service—Stage 0: Establish Access

In 404, in Stage 0: Establish Access, system 110 may require a security context to interact with the underlying systems where testing will occur, so renders (i.e., matches, dispatches, and configures) platform service 12 (PS 12: Identity & Access Mgt. Services, providing connection-related middleware capabilities at the infrastructure layer) to pull security credentials from security repository 171.

In 406A-C, system 110 requires Service Accounts to work with the infrastructure, so renders (i.e., matches, dispatches, and configures) platform service 252 (PS 12: Identity & Access Mgt. Services, providing connection-related middleware capabilities at the infrastructure layer) to create them for use with VPC controller 161 and infrastructure controller 151.

Once access is established method 400 proceeds to Stage 1: Build Test Environment (DMZ).

DevOps for a Service—Stage 1: Build Test Environment (DMZ)

In 408A-B, system 110 may need to setup the base network for the service, so renders (i.e., matches, dispatches, and configures) platform service 251 (PS 11: Network Services, providing configuration-related middleware capabilities at the network layer) which computes the network topology, protocols, constraints and other properties required, and uses VPC controller 161 to create subnets, DNS, routing and firewalls to support the service.

In 410, system 110 may setup storage for the various applications involved in the service, so renders (i.e., matches, dispatches, and configures) platform service 241 (PS 1: Data Services, providing configuration-related middleware capabilities at the infrastructure layer) which computes the storage types, volumes and other properties required, and uses VPC controller 161 to provision storage to support the service.

In 412A-C, system 110 may ensure that artifacts connected to all application packages (scripts, images, etc.) are available for virtualization manager 153 which will provision the application nodes, so renders (i.e., matches, dispatches, and configures) platform service 247 (PS 7: Orchestration Services, providing orchestration-related middleware capabilities at the infrastructure layer) which coordinates the transfer of images from remote repository 171 to the local image repo found in the infrastructure.

In 414A-B, system 110 may attach provisioned resources to compute nodes where the applications will be instantiated, so renders (i.e., matches, dispatches, and configures) platform service 251 (PS 11: Network Services, providing configuration-related middleware capabilities at the network layer) which attaches the networks and storage to the nodes via VPC controller 161.

Once the test environment is created, method 400 proceeds to Stage 2: Instantiate Service Elements.

DevOps for a Service—Stage 2: Instantiate Service Elements

Instantiating service elements means deploying network applications they represent, so in 416A-I, system 110 renders (i.e., matches, dispatches, and configures) platform service 246 (PS 6: Controller/Configuration Services, providing deployment-related middleware capabilities at the application layer) for this purpose. System 110 may determine the specific compute requirements of each application and either create Pod/Containers or VMs for them via the infrastructure controller 161, resulting in one or more components per application.

Once instantiated, method 400 proceeds to Stage 3: Configure & Integrate Service Elements.

DevOps for a Service—Stage 3: Configure & Integrate Service Elements

In 418, system 110 may configure the service specific applications, so renders (i.e., matches, dispatches, and configures) platform service 246 (PS 6: Controller/Configuration Services, providing configuration-related middleware capabilities at the application layer) for this purpose. System 110 may determine the specific configuration requirements of each application so that they perform both individually and collectively (as part of the service) and resolves details needed such as types, formats and protocols required to carry out the configurations, then proceeds to configure the components of each via their available interfaces (REST, CLI, etc.).

In 420, system 110 may configure supporting applications, so renders (i.e., matches, dispatches, and configures) platform service 246 (PS 6: Controller/Configuration Services, providing deployment-related middleware capabilities at the application layer) for monitoring, to determine the specific configuration requirements of the virtual Probe which is used by the monitoring service 172, and resolves details needed such as types, formats and protocols required to carry out the configurations, then proceeds to configure the via the available interface (REST).

In 422, system 110 may register the probe with monitoring service 172, so renders (i.e., matches, dispatches, and configures) platform service 249 (PS 9: Integration Services, providing integration-related middleware capabilities at the application layer) for this purpose.

In 424, system 110 may configure related SLAs within monitoring service 172, so renders (i.e., matches, dispatches, and configures) platform service 246 (PS 6: Controller/Configuration Services, providing integration-related middleware capabilities at the application layer) for this purpose.

In 426, system 110 may configure security monitoring service 173, so renders (i.e., matches, dispatches, and configures) platform service 246 (PS 6: Controller/Configuration Services, providing integration-related middleware capabilities at the application layer) for this purpose.

In 428A-D, for testing, system 110 may expose the all deployed components (from all applications) to the system at large, so renders (i.e., matches, dispatches, and configures) platform service 251 (PS 11: Network Services, providing configuration-related middleware capabilities at the network layer) which resolves hostname, port and other requirements for the services and configures the local DNS via VPC controller 161.

In 430A-C, system 110 may chain (link) deployed components together so they function as a composite service, so renders (i.e., matches, dispatches, and configures) platform service 249 (PS 9: Integration Services, providing integration-related middleware capabilities at the network layer) which resolves the protocols, ports and other networking requirements needed to establish required packet throughput, and sends a command to virtualization manager 153 to connect ports and perform other required tasks on the Pods/Containers and VMs involved.

In 432A-C, system 110 may chain (link) the deployed components together with any monitoring components so they can be observed, so renders (i.e., matches, dispatches, and configures) platform service 249 (PS 9: Integration Services, providing integration-related middleware capabilities at the network layer) which resolves the protocols, ports and other networking requirements needed, and sends a command to virtualization manager 153 to connect ports and perform other required tasks on the Pods/Containers and VMs involved.

In 434A-C, if the service model includes possible hardware optimizations, which are applicable for the given infrastructure, system 110 renders (i.e., matches, dispatches, and configures) platform service 249 (PS 9: Integration Services, providing integration-related middleware capabilities at the infrastructure layer) which calculates the optimal configuration of packet routing for the specified service, converts this configuration into a set of commands to execute on the hardware (NIC) and uses the commands to program the NIC via infrastructure controller 151.

Once the service is ready in the DMZ/Test environment, method 400 proceeds to Stage 4: Verify Service.

DevOps for a Service—Stage 4: Verify Service

In 436, for testing/verification, system 110 may start a flow of simulated test traffic, so renders (i.e., matches, dispatches, and configures) platform service 246 (PS 6: Controller/Configuration Services, providing integration-related middleware capabilities at the application layer) which determines the formats and protocols required for the test traffic, any other specific characteristics of the traffic, and details such as target IPs/Ports, and configures the traffic generation/simulation component for these purposes via REST.

In 438A-B, once simulated traffic is configured, system 110 may start the simulated traffic, so renders (i.e., matches, dispatches, and configures) platform service 247 (PS 7: Orchestration Services, providing orchestration-related middleware capabilities at the application layer) for this purpose.

In 440A-C, for testing, system 110 may verify the success of unit (per application/component) and end-to-end security test plans, so renders (i.e., matches, dispatches, and configures) platform service (PS 6: Controller/Configuration Services, providing orchestration-related middleware capabilities at the application layer) to compile these plans based on the characteristics of components and the service, and executes them via the security monitoring service 173.

In 442, system 110 may verify that SLAs are met by the service under-load so renders (i.e., matches, dispatches, and configures) platform service 243 (PS 3: Decision Services/Policy Mgt., providing workflow automation-related middleware capabilities at the application layer) to carry out this evaluation via performance monitoring service 172.

In 444A-B, after testing is completed, simulated traffic needs to be stopped, so system 110 renders (i.e., matches, dispatches, and configures) platform service 247 (PS 7: Orchestration Services, providing orchestration-related middleware capabilities at the application layer) for this purpose.

Once verification is complete, method 400 proceeds to Stage 5: Register (or Fail).

DevOps Service—Stage 5: Register (or Fail)

The success/failure of the test plan needs to be evaluated and a signal (pass or fail with a list of errors) needs to be sent to the Day 0 activity which initiated the DevOps plan, platform service 243 (PS 3: Decision Services/Policy Mgt., providing workflow Automation-related middleware capabilities at the application layer) is rendered (i.e., matched, dispatched, configured) by system 110 for this purpose.

Finally, execution of the DevOps plan ends with system 110 closing the transaction via rendered (i.e., matched, dispatched and configured) platform service 253 (PS 13: Transaction Services, providing orchestration-related middleware capabilities), and at this point rolling back any infrastructure changes, removing the DMZ/Test environment returning any resources back to the pool for future use.

Generic Use Case—Day 0 Onboarding

Day 0 onboarding involves a developer modeling application packages for each solution element to be deployed, integrated, and configured in the implementation of the overall network service model. This is not development of the application(s), rather the creation of models for utilizing developed code compiled into a container/VM image, binary, scripts or some other set of artifacts which carry out the execution, which were developed outside the context of the system.

Figure 5A:
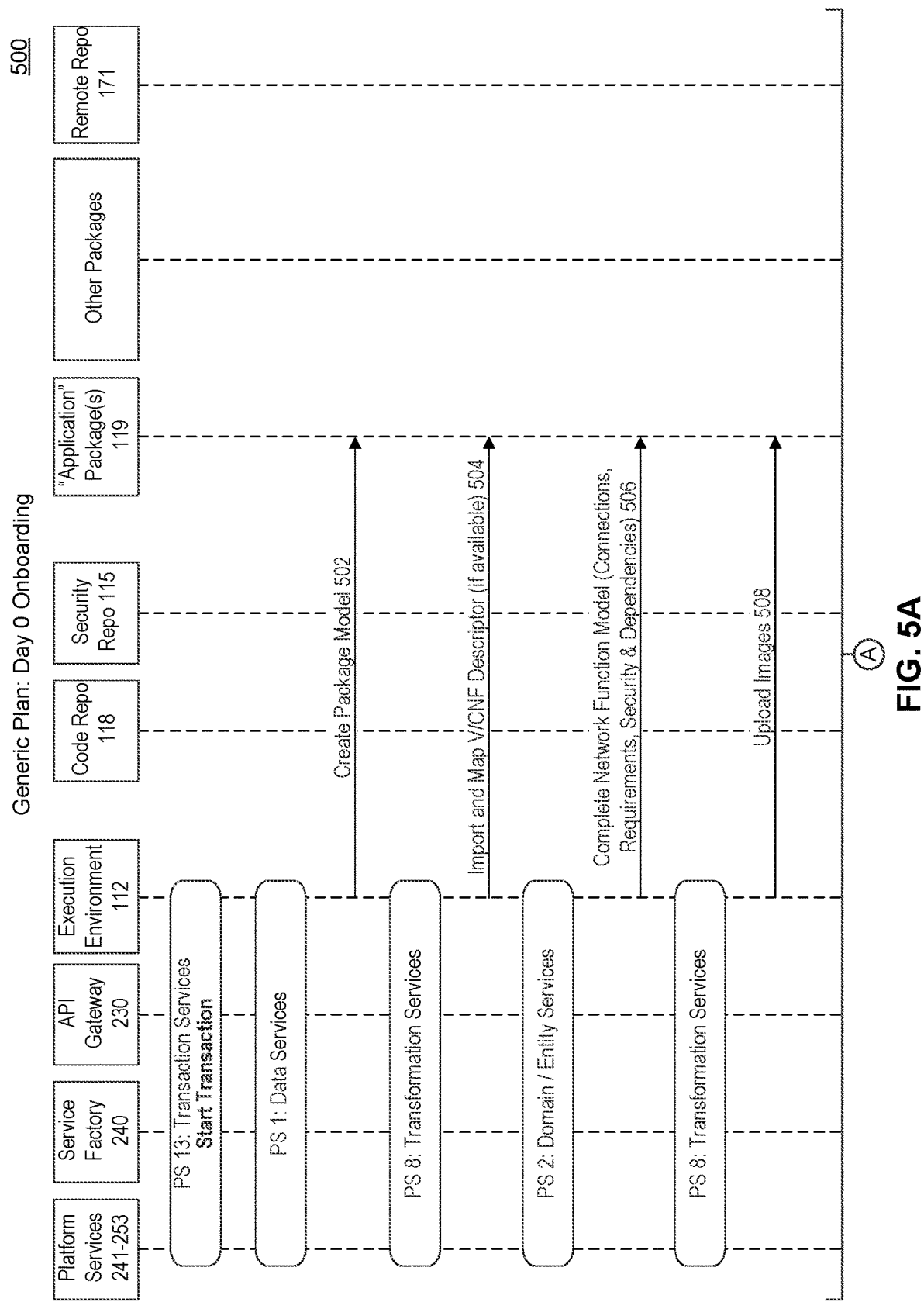
FIGS. 5A-5B are a sequence diagram illustrating a method of performing Day 0 onboarding in a generic use.
Figure 5B:
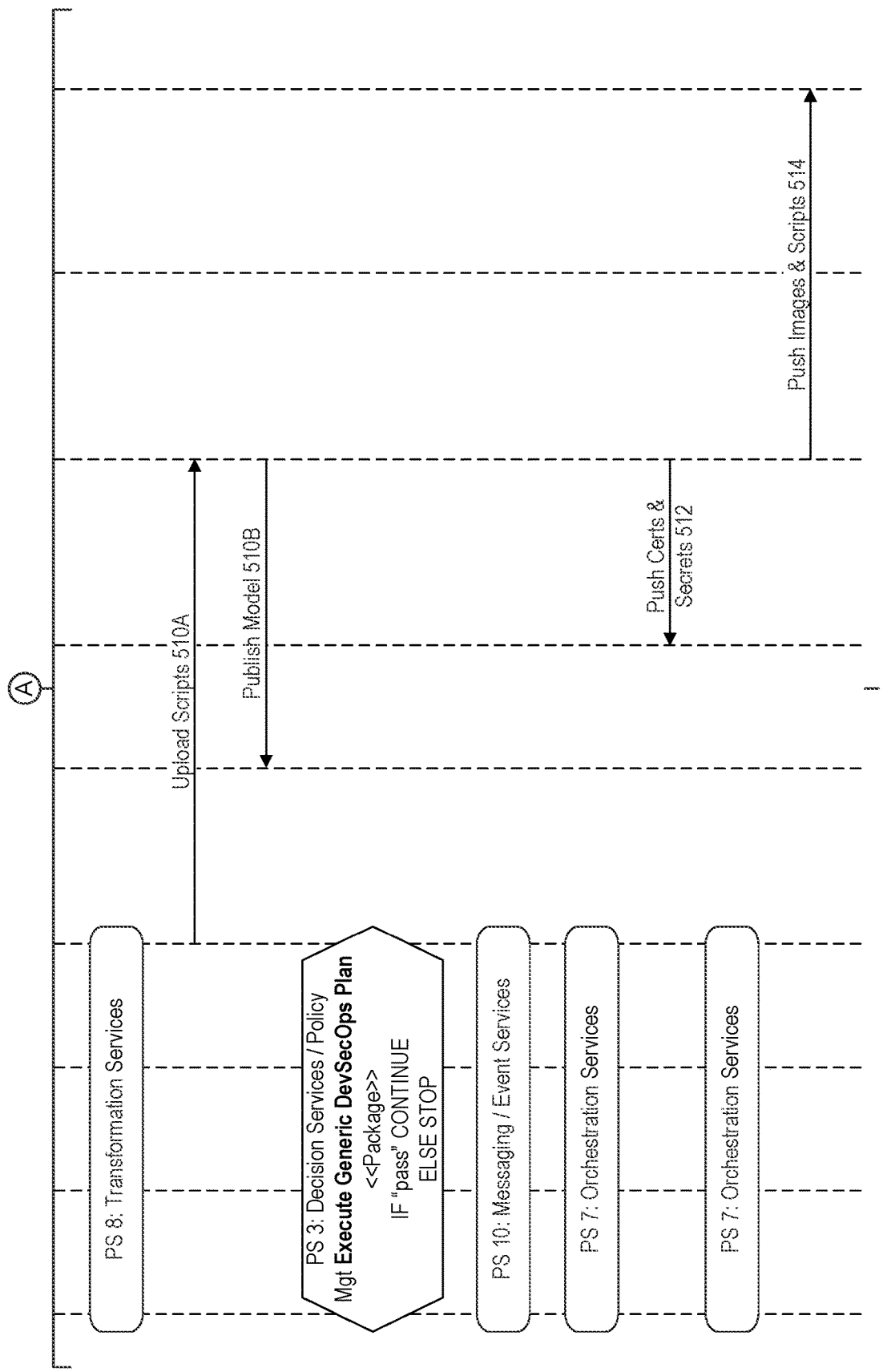

FIGS. 5A-5B are a sequence diagram illustrating a method 500 of performing Day 0 onboarding in a generic use case, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 5A-5B, as will be understood by a person of ordinary skill in the art(s).

Method 500 starts with system 110 opening up a transaction, so that all tasks can be rolled back/the infrastructure can be restored if there is a failure. All interactions of the system happen within a transaction. For this, system 110 renders (i.e., matches, dispatches, and configures) platform service 253 (PS 13: Transaction Services, providing orchestration-related middleware capabilities), then upon opening the transaction creates an initial context required to carry out the sequence and creates a process token (or links to one if it already exists), to implement the transaction and allow the tasks in the use-case depicted to execute asynchronously.

In 502, for onboarding, the developer needs to create a new empty application package model so system 110 renders (i.e., matches, dispatches, and configures) platform service 241 (PS 1: Data Services, providing configuration-related middleware capabilities at the application layer) which creates this template.

In 504, to populate the application package model, system 110 presents the developer with the capability to import and map any existing descriptors—including third-party artifacts such as container network function descriptors ("CNFDs") and configuration files—to accelerate the onboarding process, and so renders (i.e., matches, dispatches, and configures) platform service 248 (PS 8: Transformation Services, providing configuration-related middleware capabilities at the application layer) for this purpose.

In 506, the remainder of the package model (other connections, requirements, security and dependencies) must be specified explicitly by the developer so system 110 renders (i.e., matches, dispatches, and configures) platform service 242 (PS 2: Domain/Entity Services, providing configuration-related middleware capabilities at the application layer) for this purpose, providing a UI to guide them through completion of the model.

In 508, once the package model is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system).

In 510A-B, system 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the application package model is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail." If the DevOps plan passes, system 110 may publish the package model to the system catalog, so renders (i.e., matches, dispatches, and configures) platform service 250 (PS 10: Messaging/Event Services) for this purpose.

In 512, system 110 may generate and push related security artifacts (certs, secrets, etc.) to any security monitoring service 173, so renders (i.e., matches, dispatches, and configures) platform service 247 (PS 7: Orchestration Services, providing orchestration-related middleware capabilities at the infrastructure layer) for this purpose.

In 514, system 110 may push uploaded artifacts (images, scripts, etc.) to remote repository 171 (from which they will be deployed), so renders (i.e., matches, dispatches, and configures) platform service 247 (PS 7: Orchestration Services, providing orchestration-related middleware capabilities at the infrastructure layer) for this purpose. Otherwise, if the application package model does not pass, the activity is stopped and can either be revised and the sequence repeated to adjust the application package model until it "passes" DevOps verification or abandoned.

The process of 502-514 is repeated for each additional application package required by a particular DevOps use case.

Generic Use Case—Day 0 Composition

Figure 6A:
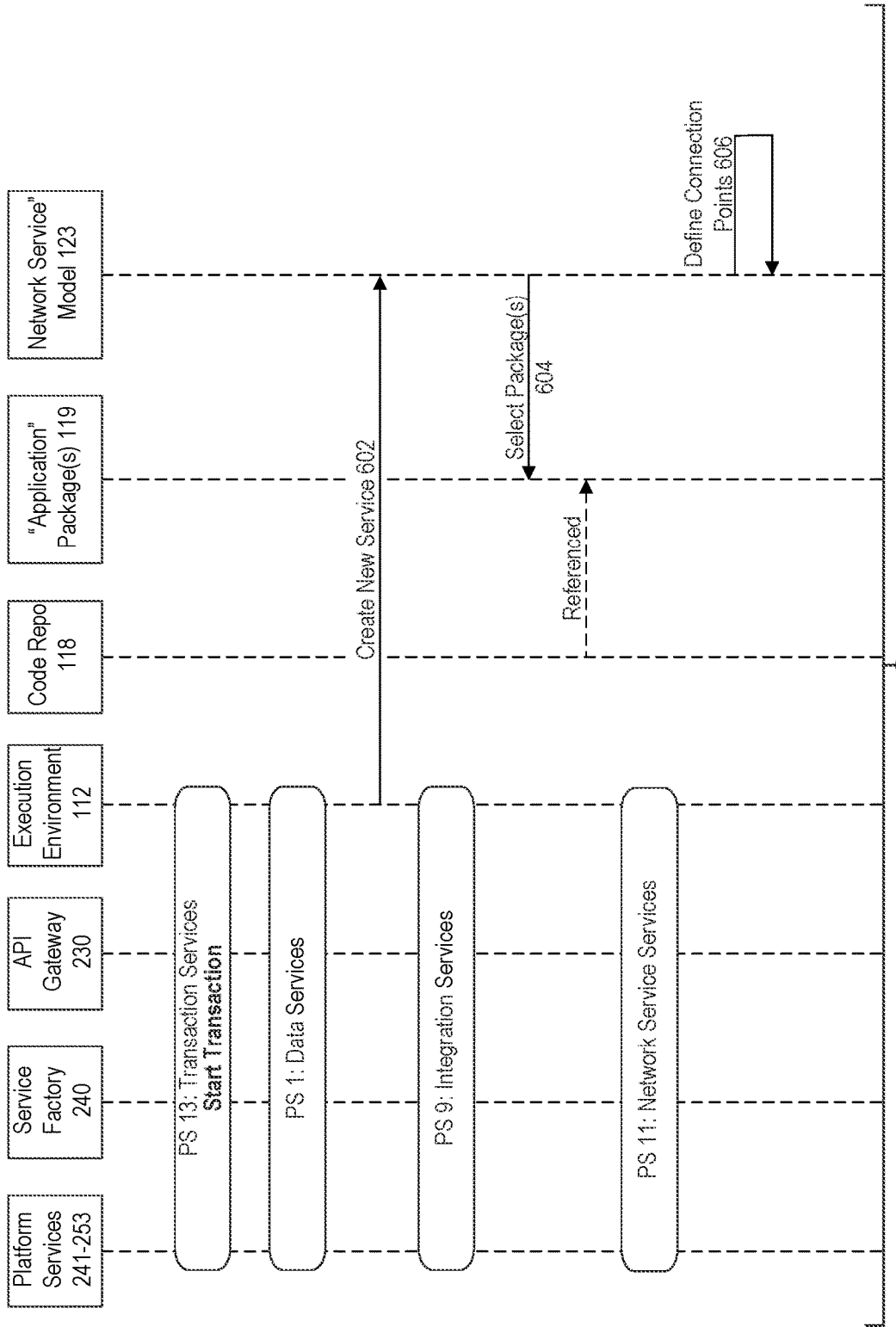
FIGS. 6A-6B are a sequence diagram illustrating a method of performing Day 0 composition in a generic use case.
Figure 6B:
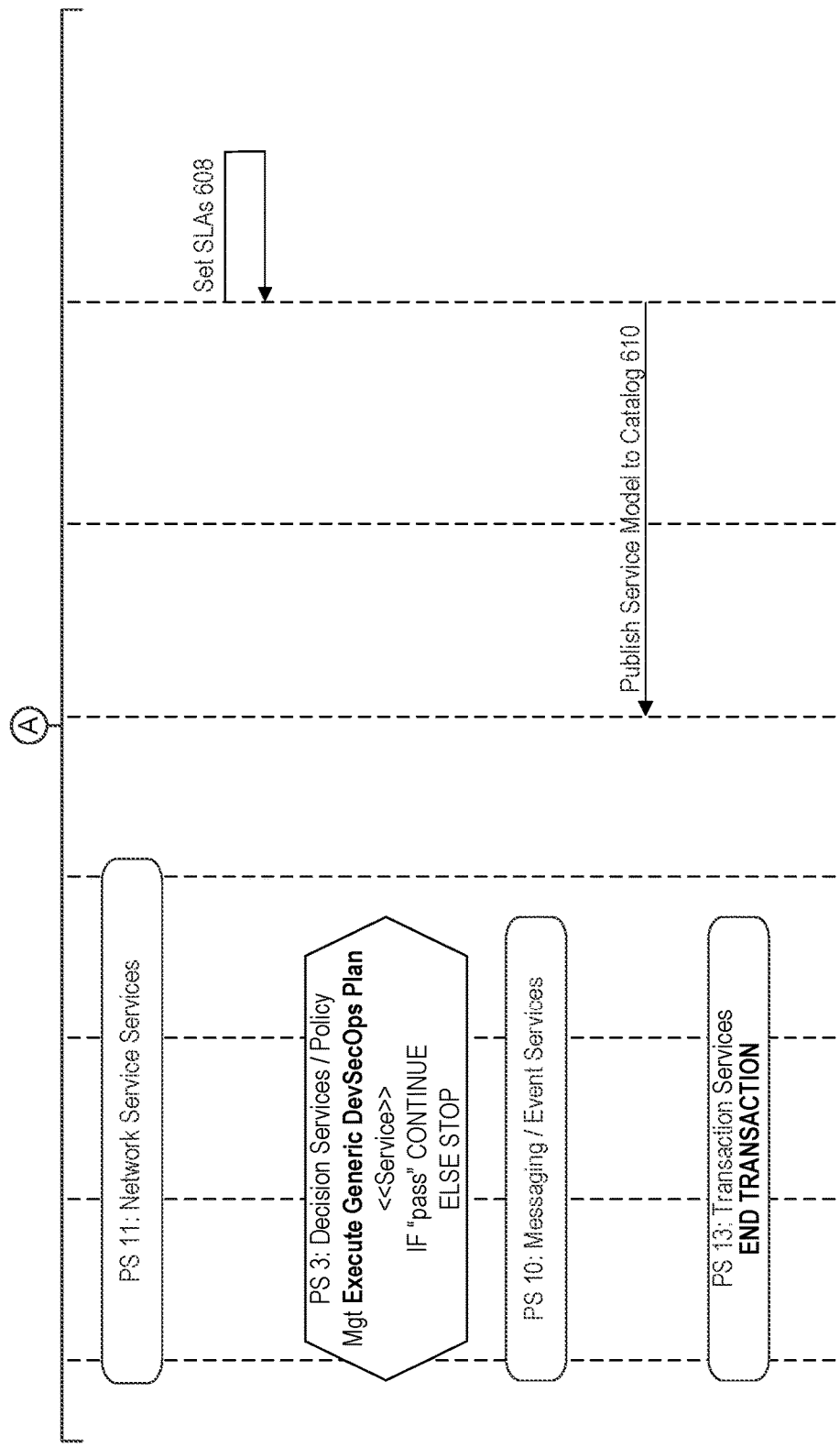

FIGS. 6A-6B are a sequence diagram illustrating a method 600 of performing Day 0 composition in a generic use case, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 6A-6B, as will be understood by a person of ordinary skill in the art(s).

Composition starts with system 110 opening up a transaction, so that all tasks can be rolled back/the infrastructure can be restored if there is a failure. All interactions of the system happen within a transaction. For this, system 110 renders (i.e., matches, dispatches, and configures) platform service 253 (PS 13: Transaction Services, providing orchestration-related middleware capabilities), then upon opening the transaction creates an initial context required to carry out the sequence and creates a process token (or links to one if it already exists), to implement the transaction and allow the tasks in the use-case depicted to execute asynchronously.

In 602, for composition, the service designer needs to create a new empty service model, so system 110 renders (i.e., matches, dispatches, and configures) platform service 241 (PS 1: Data Services, providing configuration-related middleware capabilities at the application layer) which creates this template.

In 604, the service model requires solution elements to be specified by the Service designer, so system 110 renders (i.e., matches, dispatches, and configures) platform service 249 (PS 9: Integration Services, providing Integration-related middleware capabilities at the Application layer) which presents them with a catalog of valid application packages to select from. Since the Service model is empty, the catalog initially presents a list of all needed packages.

In 606, when all application packages are bound to the service model, the service designer needs to define connection points (constraints between the application packages, and between the application packages and any supporting services), for this system 110 renders (i.e., matches, dispatches, and configures) platform service 251 (PS 11: Network Services, providing configuration-related middleware capabilities at the network layer) which presents the service designer with: A) a UI which exposes application-to-application configurations (examples: service chaining, port/traffic routing, etc.); and B) a catalog of valid support services which can be connected and configured for the service.

In 608, when all application packages are bound to the service model and connection points are defined, the service designer may set SLAs (Service Level Agreements, policies and constraints to be enforced during the execution of the service), for this system 110 renders (i.e. matches, dispatches, and configures) platform service 243 (PS 3: Decision Services/Policy Mgt., providing configuration-related middleware capabilities at the application layer) which presents the service designer with a UI which for adding and configuring SLAs based on the metrics/telemetry available for the bound package models and any supplementary policies/metrics exposed by supporting services such as Quality-of-Service ("QoS") metrics captured by a third-party monitoring tool.

When the service model is complete, system 110 may verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Service>>", which creates an instance of the network service in a DMZ/Test environment, creates a test hardness, runs all tests verifying basic connectivity, execution, security and all SLAs specified by the model, and finally returns a response of "pass or fail." In 610, if the DevOps plan passes, system 110 may publish the service model to the system catalog, so renders (i.e., matches, dispatches, and configures) platform service 251 (PS 10: Messaging/Event Services, providing workflow automation-related middleware capabilities at the application layer) for this purpose. Otherwise, if the service model does not pass, the activity is stopped and can either be revised and the sequence repeated to adjust the service model until it "passes" DevOps verification or abandoned.

Composition ends with system 110 closing the transaction using via rendered (i.e., matched, dispatched and configured) platform service 253 (PS 13: Transaction Services, providing orchestration-related middleware capabilities), and at this point "committing" any/all objects.

After successful completion, the network service is in the catalog and ready to be instantiated, for example by performing Day 1 Deployment, Integration, and Configuration.

Use Case 1: Secure, Multi-Cloud Network for Voice

Use case 1 ("UC1") is the testing of a secure, multi-cloud network for voice. The end-to-end network is testing as part of the use-case, and assured in terms of performance (SLAs). The core service for the use-case is Secure Multi-Cloud IP Multimedia Subsystem ("IMS"). FIGS. 7-10 describe UC1. UC1 allows a communication service provider to offer a voice-over-IP ("VoIP") service to customers (individuals or organizations) with QoS guarantees and the ability to secure/limit access to a specific set of IP addresses.

Figure 7A:
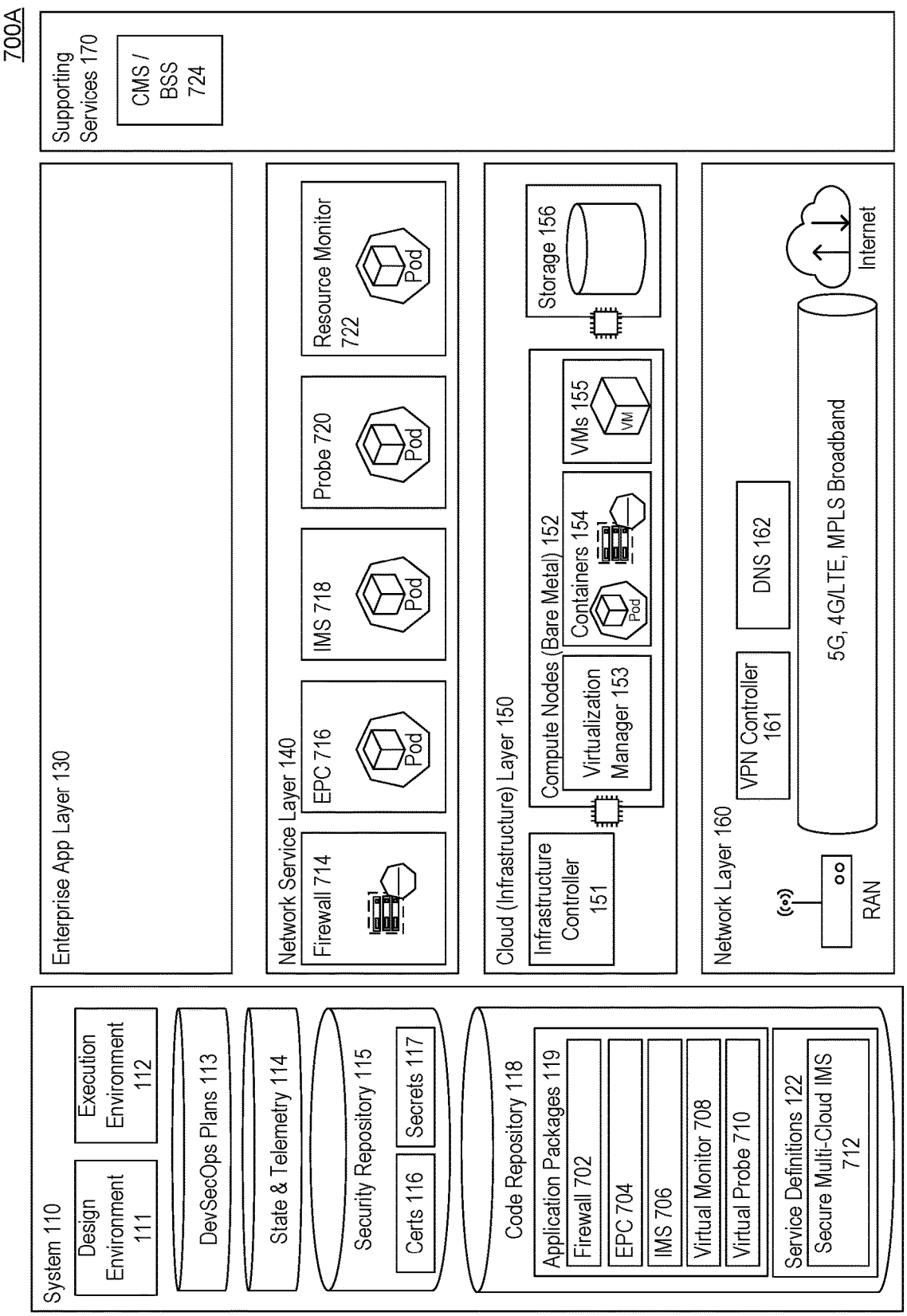
FIG. 7A is a block diagram of an architecture for testing a secure, multi-cloud network for voice.

FIG. 7A is a block diagram of architecture 700A for testing a secure, multi-cloud network for voice. Architecture 700A may include the components described above with reference to FIG. 1A. Additionally, architecture 700A may include firewall package 702, evolved packet core ("EPC") package 704, IMS package 706, virtual monitor package 708, virtual probe package 710, secure multi-cloud IMS 712, firewall 714, EPC 716, IMS 718, probe 720, resource monitor 722, and customer management system/business support system ("CMS/BSS") 724.

Service definitions 122 and application packages 119 are found in code repository 118 in system 110.

In network layer 160, a VPC is implemented via VPC controller 161 with a linked DNS 162.

In cloud layer 150, infrastructure controller 151 provides an interface to compute nodes 152 for each site involved in UC1 and to storage 156. Compute nodes 152 have virtualization manager 153 present to support the execution of container-based applications (containers 154) and virtual machine based applications that run on virtual machines 155.

In network service layer 140, the core-network service consists of firewall 714, EPC 716, and IMS 718, which together provide the end-to-end voice service. Virtual probe 720 and resource monitor 722 are also deployed for monitoring. Firewall 714 may run as a VM over containers on a "Secure Traffic Domain" Compute Node. EPC 716 may run as containers on a dedicated "EPC Domain" Compute Node, and IMS 718 may run as a container on a dedicated "IMS Domain" Compute Node. Probe 720 may be deployed to the Secure Traffic and IMS domains to measure throughput in the end-to-end service, and resource monitors 722 are placed in all domains. Application packages 119 for each component are found in code repository 118.

No applications are deployed in enterprise application layer 130 for UC1.

Supporting service 170 for UC1 includes centralized CMS/BSS 724.

FIG. 7B is a table 700B indicating Day 0 tasks performed across stages and layers in UC1 involving a secure, multi-cloud network for voice, according to some embodiments.

Columns 702B illustrate possible stages of a DevOps process for UC1 involving a secure, multi-cloud network for voice. For example, columns 702B may include stages for establishing a DMZ, deployment, configuration, and verification. Each stage in columns 702B may involve performing Day 0 tasks relevant to the secure, multi-cloud network for voice and to that stage.

Rows 704B illustrate several layers in an architecture where relevant Day 0 tasks are performed. For example, rows 704B may include an application layer, an infrastructure layer, and an network layer.

Cells 706C illustrate indicative Day 0 tasks that are performed at each layer and stage (reflected by columns 702C and rows 704C) that are applicable to the secure, multi-cloud network for voice. Each task typically requires one or more operations, which are performed by platform services 241-253. The table below reflects particular platform services among platform services 241-253 that may be engaged by system 110 to perform the tasks in cells 706C:

| Task | Platform Services Engaged |
|---|---|
| Calculate IMS Network Topology | PS 13 Transaction Services, PS 12 Security & Identity, PS 2 Domain Services, PS 3 Decision Services (Network), PS 3 Decision Services (Application), PS 9 Integration (Network), PS 9 Integration (Application) |
| Provision Network Storage | PS 13 Transaction Services, PS 12 Security & Identity, PS 2 Domain Services, PS 9 Integration (Data), PS 3 Decision Services (Network), PS 6 Configuration (Activation), PS 9 Integration (Infrastructure) |
| Create VPC Tunnels | PS 13 Transaction Services, PS 12 Security & Identity, PS 2 Domain Services, PS 3 Integration (Network), PS 9 Integration (Network), PS 6 Configuration (Activation) |
| Deploy Pods for IMS | PS 13 Transaction Services, PS 12 Security & Identity, PS 2 Domain Services, PS 3 Decision Services (Application), PS 6 Configuration (Infrastructure), PS 9 Integration (Activation) |

-continued

| Task | Platform Services Engaged |
|---|---|
| Deploy vMonitor pods to supplement Host | PS 13 Transaction Services, PS 12 Security & Identity, PS 2 Domain Services, PS 3 Decision Services (Application), PS 3 Decision Services (Infrastructure), PS 6 Configuration (Infrastructure), PS 9 Integration (Activation) |
| Connect CMS/BSS to VPC | PS 13 Transaction Services, PS 12 Security & Identity, PS 2 Domain Services, PS 3 Integration (Network), PS 6 Configuration (Network), PS 9 Integration (Application) |
| Configure IMS via REST API | PS 13 Transaction Services, PS 12 Security & Identity, PS 2 Domain Services, PS 3 Decision Services (Application), PS 12 Connection (Application), PS 6 Configuration (Application) |
| Configure CMS/BSS policies via REST API | PS 13 Transaction Services, PS 12 Security & Identity, PS 2 Domain Services, PS 3 Decision Services (Application), PS 3 Decision Services (Network), PS 3 Decision Services (Infrastructure), PS 12 Connection (Application), PS 6 Configuration (Infrastructure), PS 7 Orchestration (Infrastructure) |
| Configure vProbe monitoring ports | PS 13 Transaction Services, PS 12 Security & Identity, PS 2 Domain Services, PS 3 Decision Services (Application), PS 3 Decision Services (Network), PS 12 Connection (Application), PS 6 Configuration (Infrastructure) |
| Correlate vMonitor telemetry with vProbe alerts to isolate faults | PS 13 Transaction Services, PS 12 Security & Identity, PS 2 Domain Services, PS 3 Decision Services (Application), PS 3 Decision Services (Infrastructure), PS 3 Decision Services (Network), PS 3 Decision Services (Service), PS 3 Decision Services (Data) |
| Remove vMonitors pods (after tests complete) | PS 13 Transaction Services, PS 12 Security & Identity, PS 2 Domain Services, PS 3 Decision Services (Application), PS 3 Decision Services (Infrastructure), PS 9 Integration (Activation) |
| Remove VPC Tunnels (after tests complete) | PS 13 Transaction Services, PS 12 Security & Identity, PS 2 Domain Services, PS 3 Integration (Network), PS 9 Integration (Network), PS 6 Configuration (Activation) |

System 110 dynamically matches, dispatches, configures, and coordinates these platform services to perform these tasks. These tasks are further detailed in the sequence diagrams included below.

Figure 8:
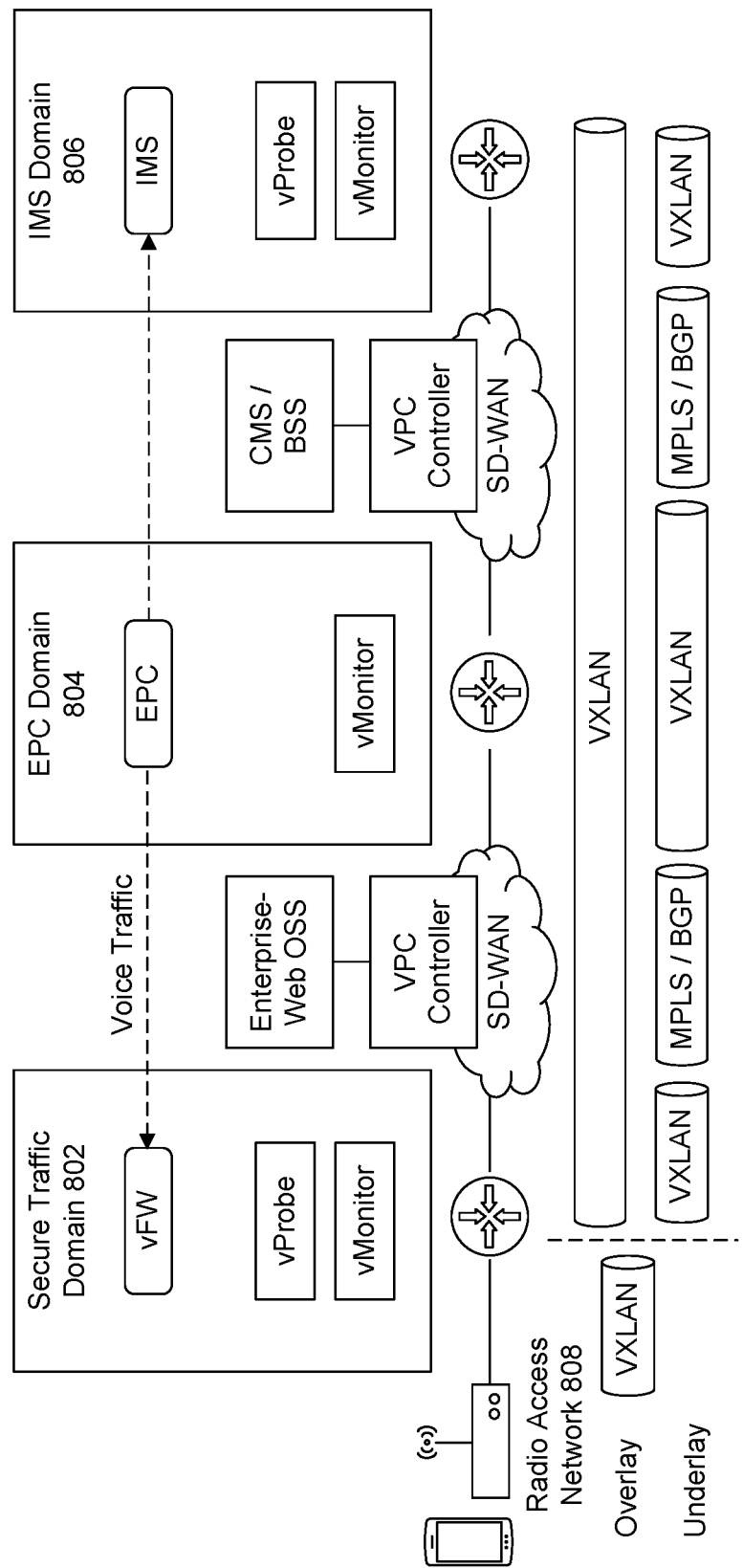
FIG. 8 is a network service diagram for a use case for testing a secure, multi-cloud network for voice.
Figure 9A:
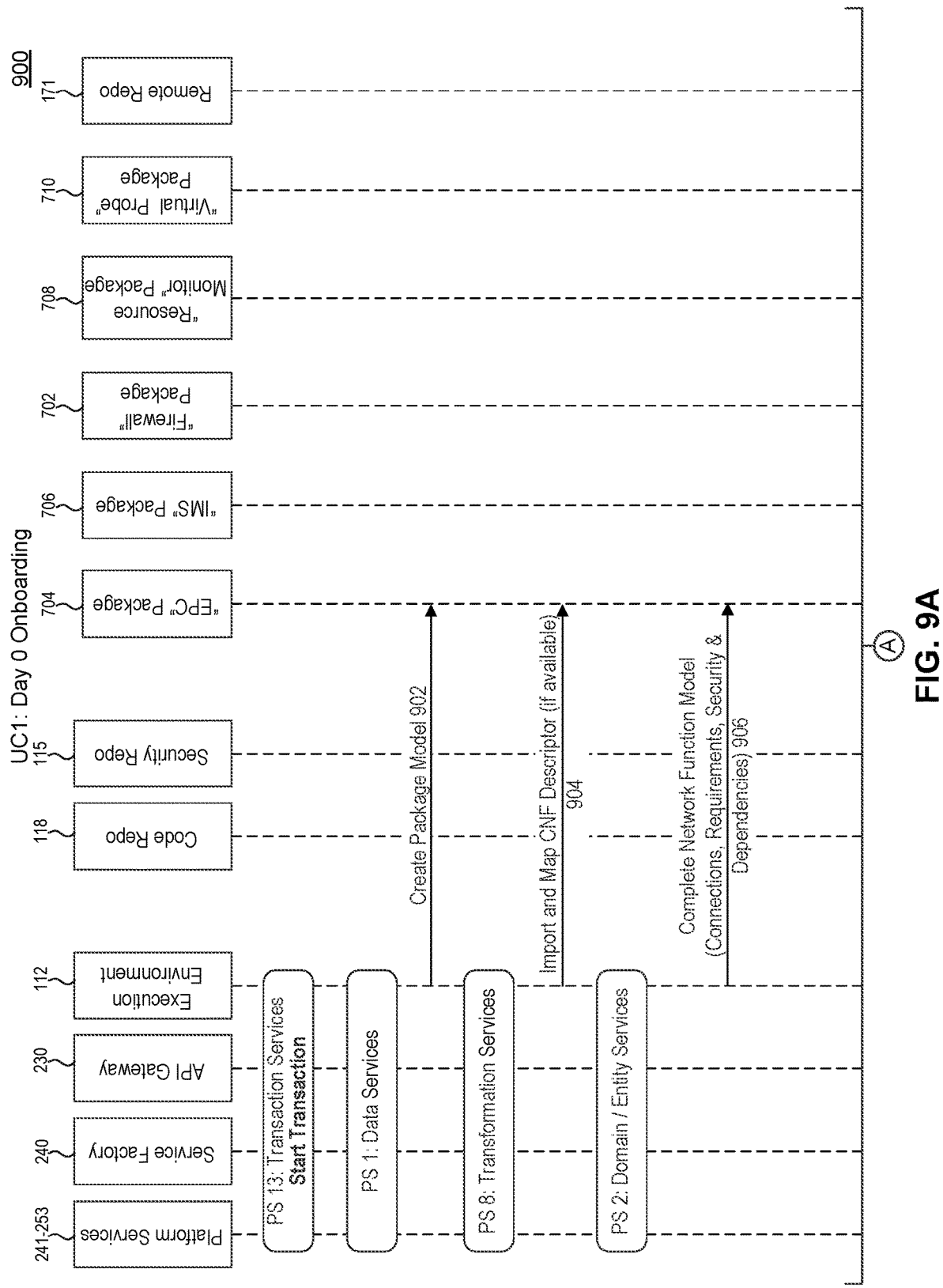
FIGS. 9A-9G are a sequence diagram illustrating a method of performing Day 0 onboarding in the use case for testing a secure, multi-cloud network for voice, according to some embodiments.
Figure 9B:
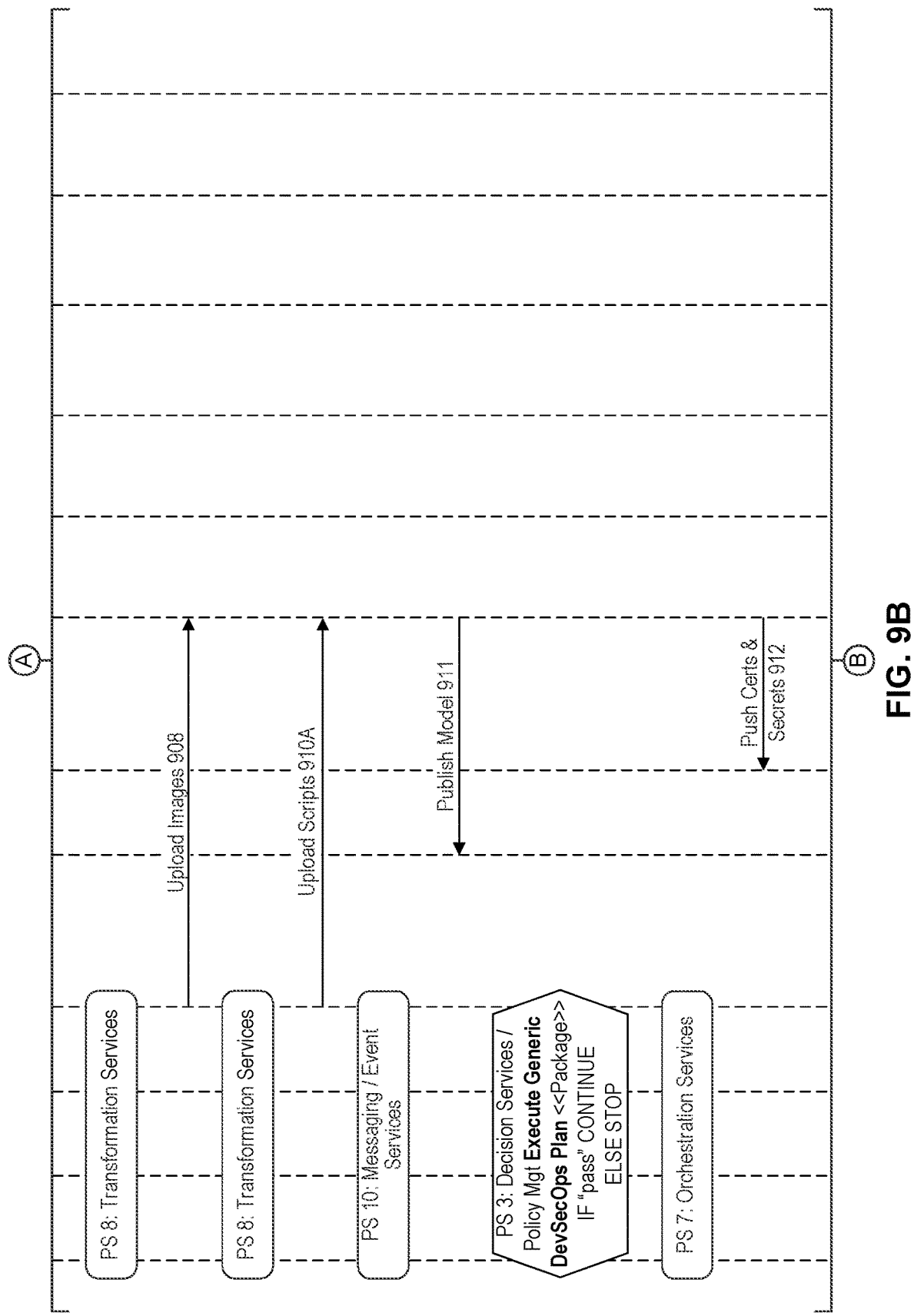
Figure 9C:
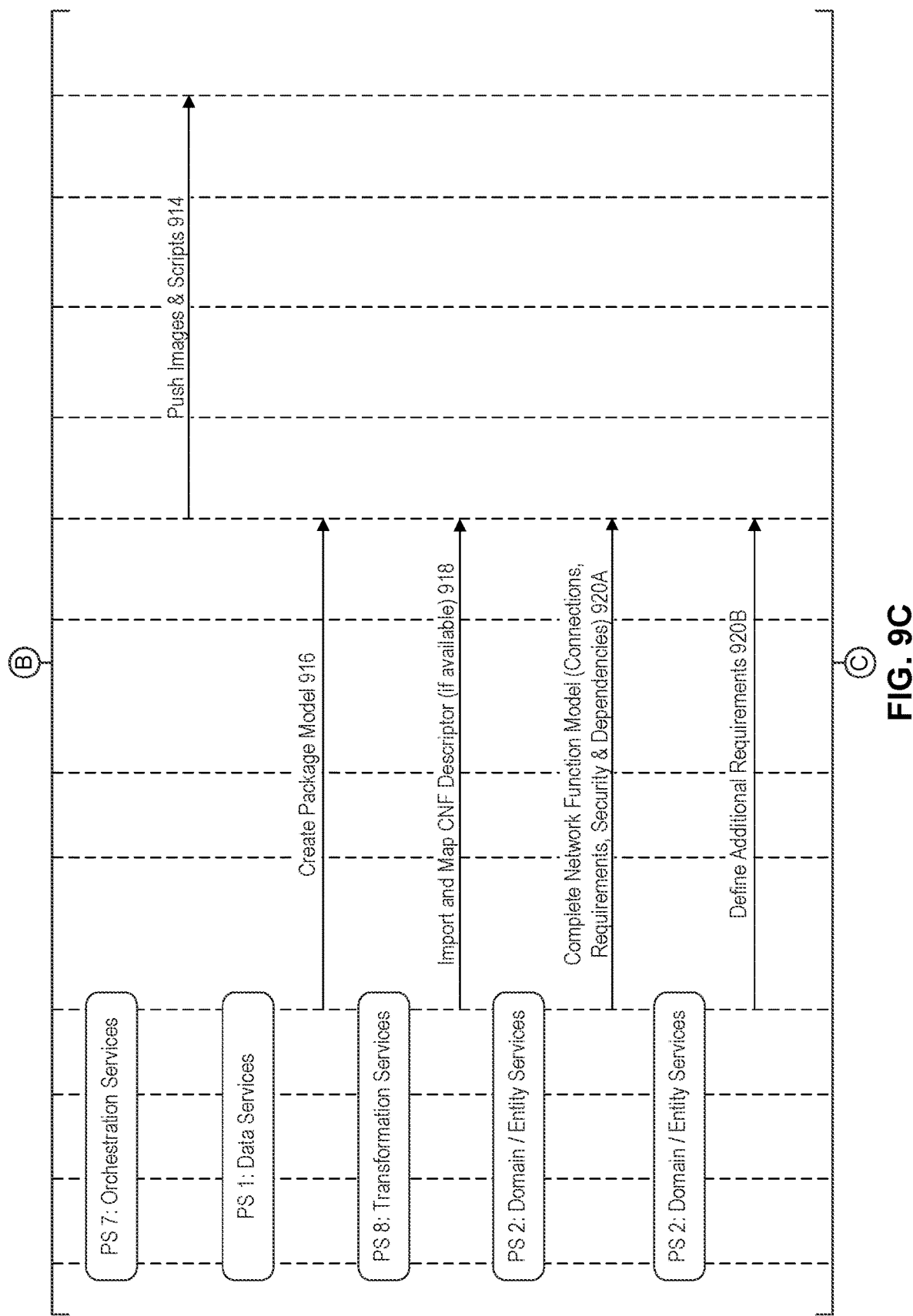
Figure 9D:
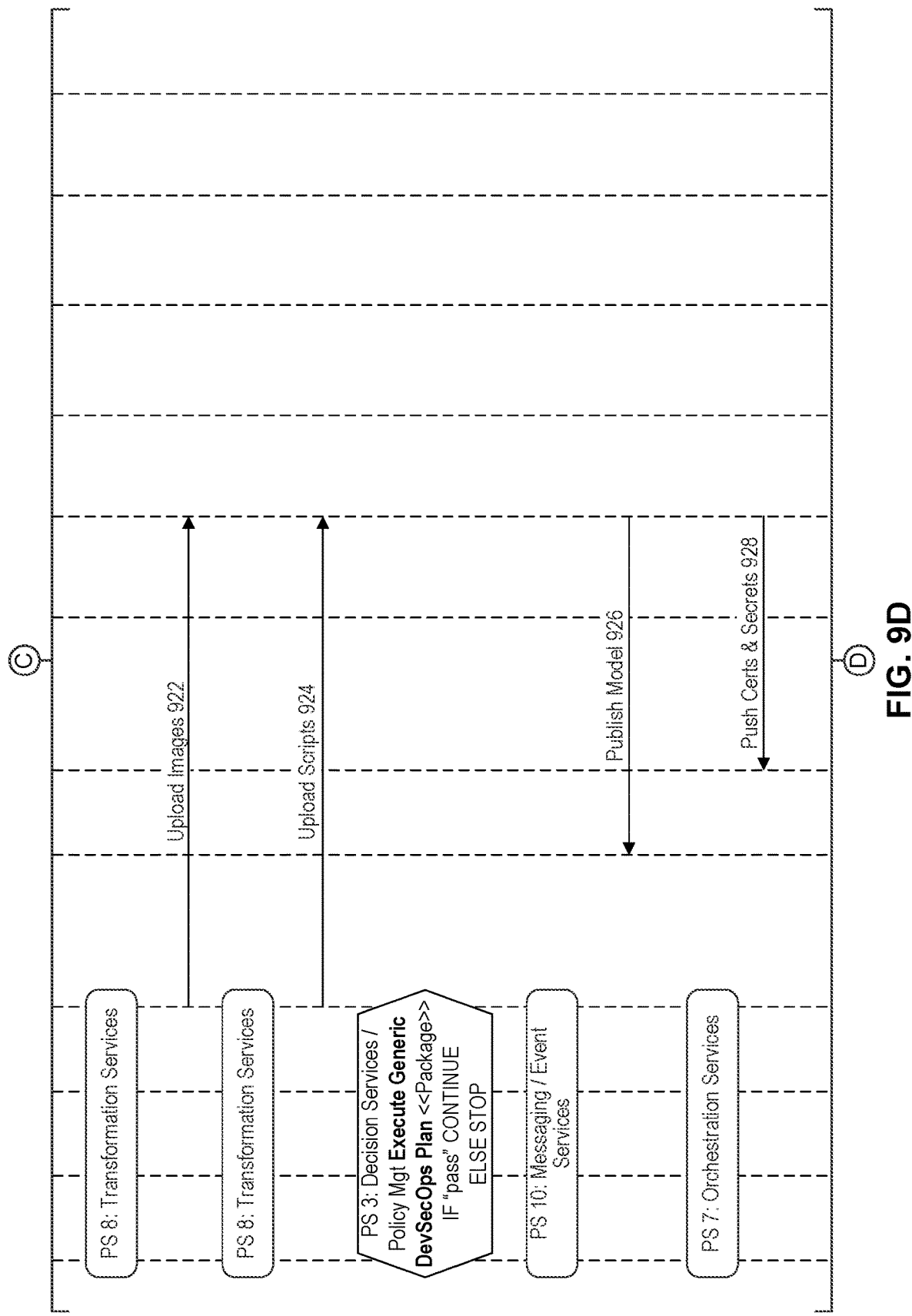
Figure 9E:
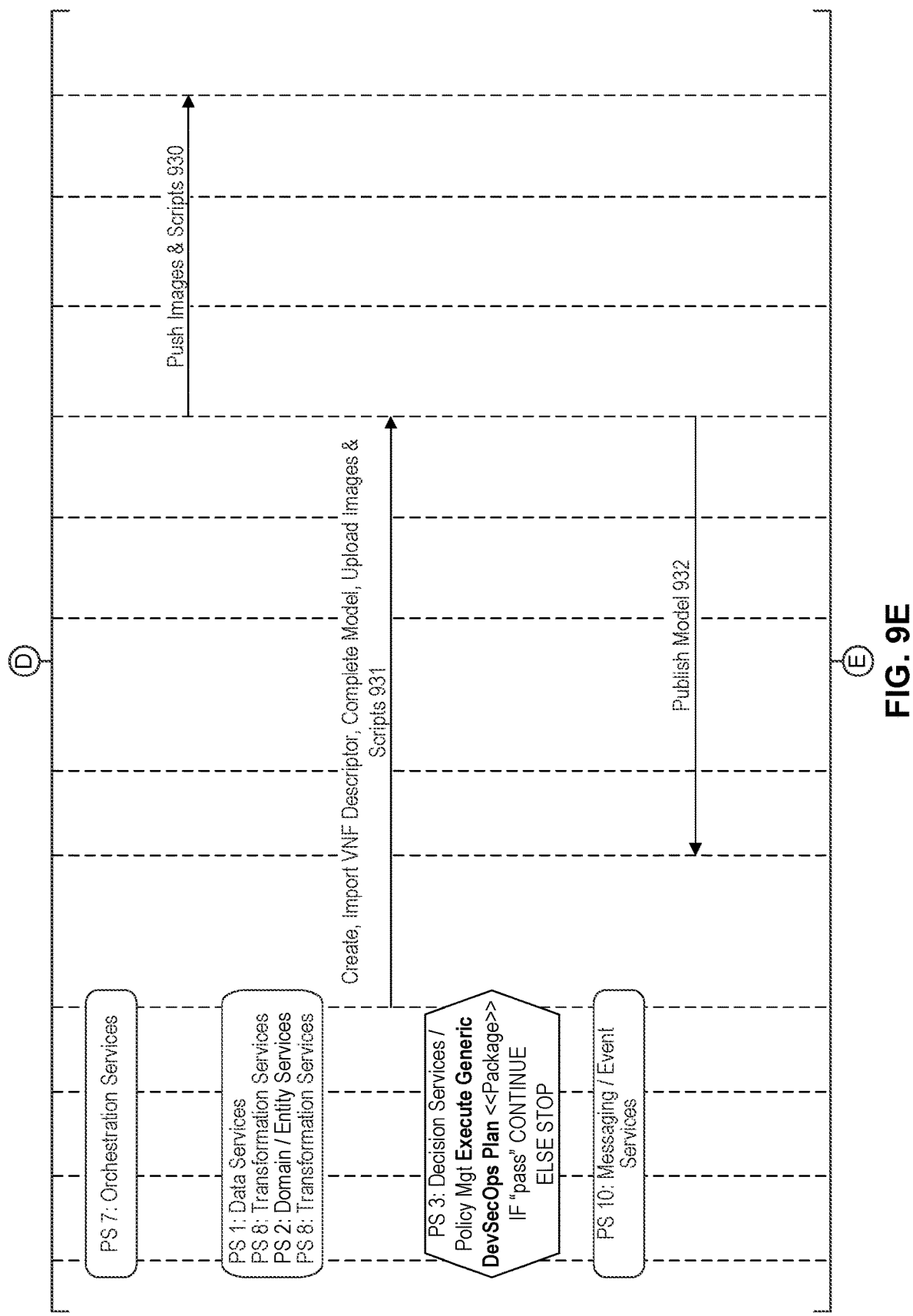
Figure 9F:
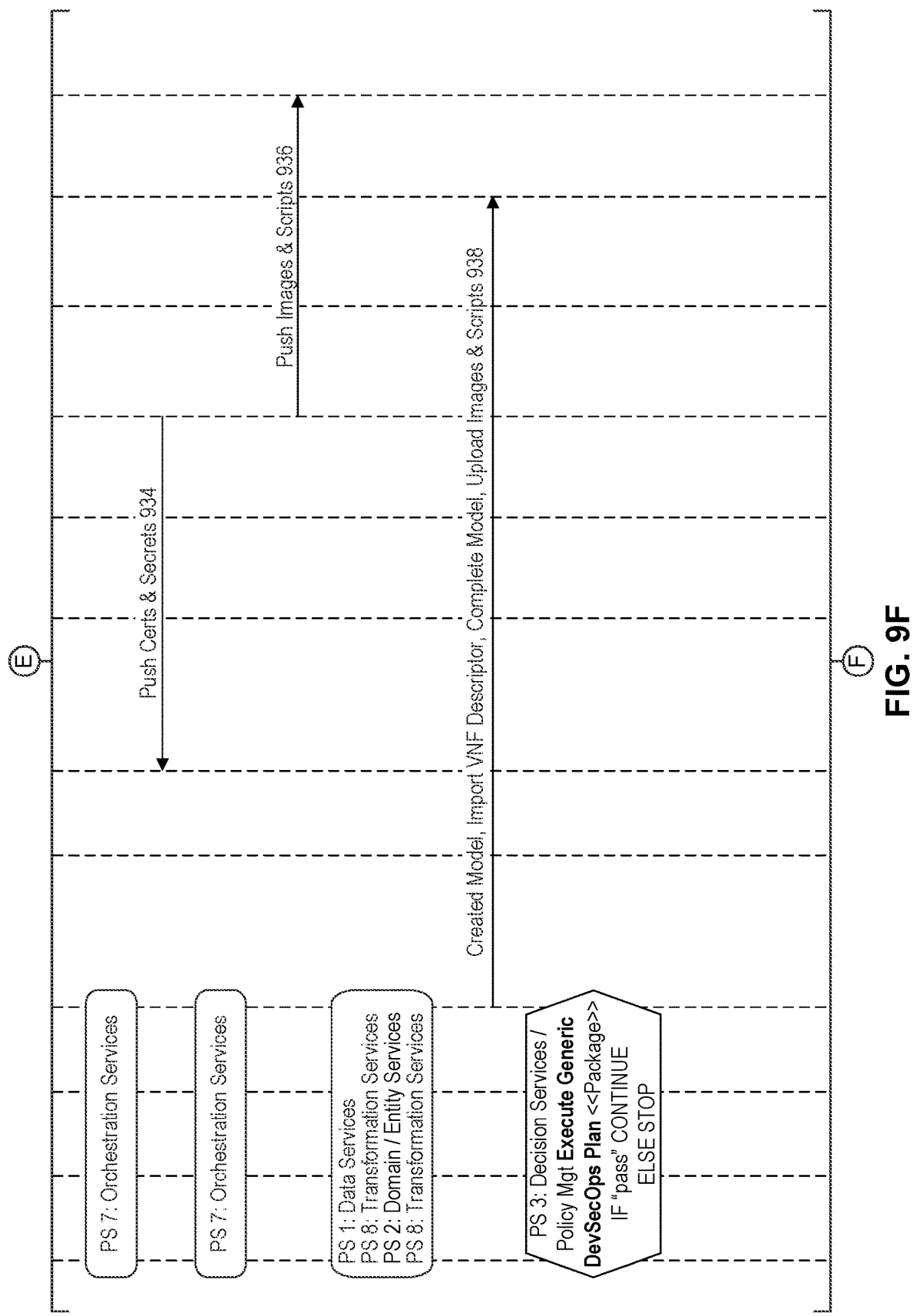
Figure 9G:
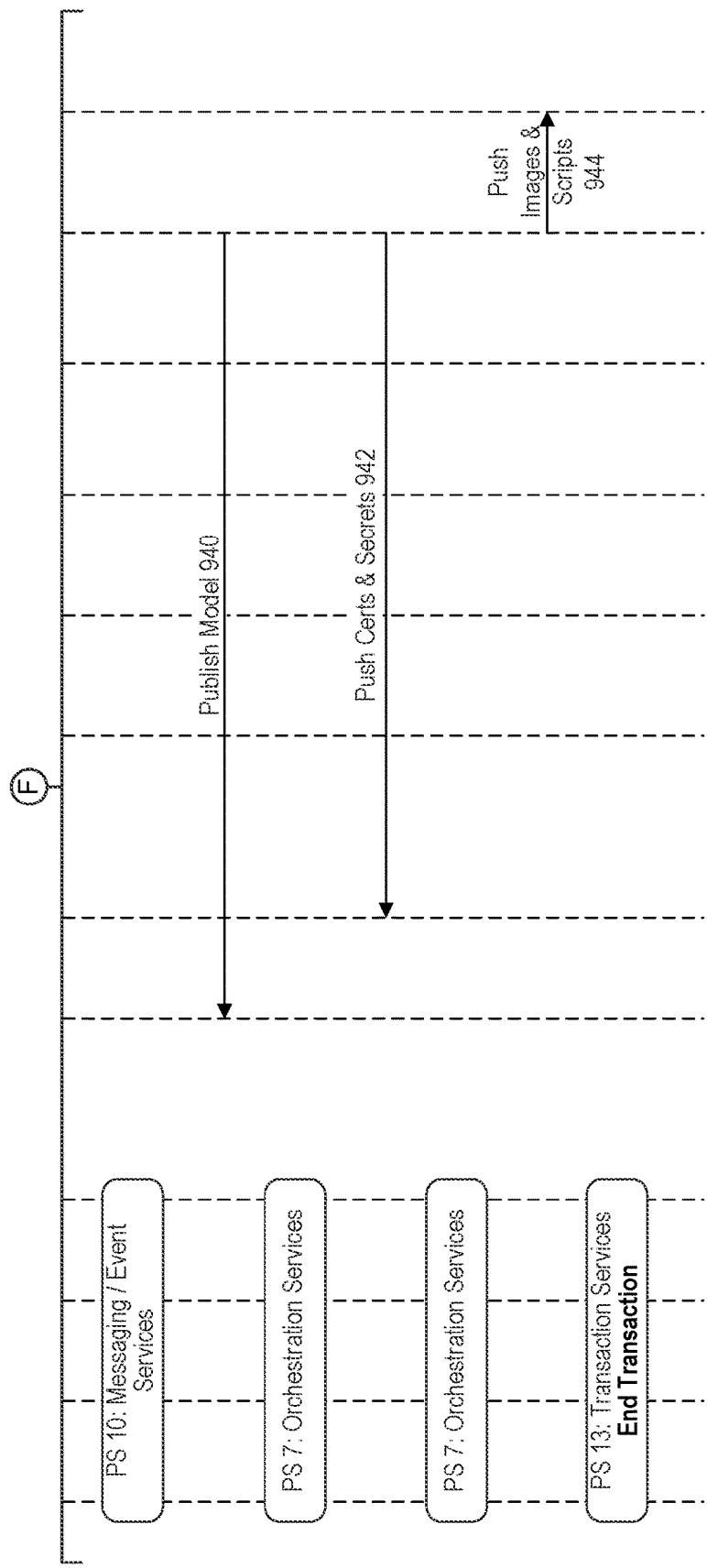

FIG. 8 is a network service diagram of a network service 800 for UC1 for testing a secure, multi-cloud network for voice. Network service 800 may include secure traffic domain 802, EPC domain 804, and IMS domain 806.

UC1 is implemented across three nodes: secure traffic domain 802, EPC domain 804, and IMS domain 806. Secure traffic domain 802, EPC domain 804, and IMS domain 806 are connected via a VPC network and connected switches. Secure traffic domain 802 is also connected to RAN 808. IMS domain 806 is also connected to the Internet. The VPC is implemented by a standard set of overlay and underlay protocols.

Secure traffic domain 802 has VMs over containers for the virtual Firewall ("vFW") and containers/pods for probes that act as performance and resource monitors. EPC domain 804 has containers/pods for the EPC and containers/pods for probes that act as a resource monitor. IMS domain 806 has containers/pods for the IMS and containers/pods for probes that act as performance and resource monitors.

A centralized deployment of system 110 may act as an operations support system ("OSS") to execute the end-to-end use-case and is connected independently via the VPC. CMS/BSS 724 is connected independently via the VPC.

Each sequence diagram (e.g., FIGS. 9-10) is organized the same. System 110's components for platform services 241-253, service factory 240, and API Gateway 230, which together are responsible for execution are shown to the left. Each system interaction includes a note indicating which platform service in platform services 241-253 is rendered (i.e., matched, dispatched, configured) to deliver the task. The right side shows the resulting interaction (i.e., coordination) with the system's actors.

Day 0 Onboarding and Service Composition for UC1

Day 0 onboarding involves an application developer modeling application packages for each solution element to be deployed, integrated and configured in the implementation of the overall network service model. This is not development of the application(s), rather the creation of models for utilizing developed code compiled into a container/VM image, binary, scripts or some other set of artifacts which carry out the execution, which were developed outside the context of the system.

FIGS. 9A-9G are a sequence diagram illustrating a method 900 of performing Day 0 onboarding in UC1 for testing a secure, multi-cloud network for voice, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 9A-9G, as will be understood by a person of ordinary skill in the art(s).

Onboarding starts with system 110 opening up a transaction, so that all tasks can be rolled back/the infrastructure can be restored if there is a failure. All interactions of the system happen within a transaction. For this, system 110 renders (i.e., matches, dispatches, and configures) platform service 253 (PS 13: Transaction Services, providing orchestration-related middleware capabilities), then upon opening the transaction creates an initial context required to carry out the sequence and creates a process token (or links to one if it already exists), to implement the transaction and allow the tasks in UC1 depicted to execute asynchronously.

In 902, the developer needs to create a new empty package model for the first solution element, EPC package 704, so system 110 renders (i.e., matches, dispatches, and configures) platform service 241 (PS 1: Data Services, providing configuration-related middleware capabilities at the application layer) which creates this template.

In 904, to populate EPC package 704, system 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by EPC package 704 for deployment, integration and configuration. In this case, EPC package 704 maps standard-based, e.g., 3rd Generation Partnership Project ("3GPP") interfaces between the internal components of the EPC and outgoing/incoming public interfaces via 3GPP. EPC package 704 also maps network level, e.g., software-defined networking ("SDN"), rules to model-based policies to control the internal behavior of the EPC when instantiated.

In 906, the remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model.

In 908, once a model for EPC package 704 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system).

In 910A, system 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for EPC package 704 is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail." In 911, if the DevOps plan passes, system 110 may publish EPC package 704 to the system catalog, so renders (i.e., matches, dispatches, and configures) platform service 250 (PS 10: Messaging/Event Services, providing workflow automation-related middleware capabilities at the application layer) for this purpose.

In 912, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 914, system 110 may push uploaded artifacts (images, scripts, etc.) to remote repository 171 (from which they will be deployed), so renders (i.e., matches, dispatches, and configures) platform service 247 (PS 7: Orchestration Services, providing configuration-related middleware capabilities at the application layer) for this purpose. Otherwise, if EPC package 704 does not pass, the activity is stopped and can either be revised and the sequence repeated to adjust the EPC package 704 until it passes DevOps verification or abandoned.

In 916, for onboarding, the developer needs to create a new IMS package 706 so system 110 renders (i.e., matches, dispatches, and configures) platform service 241 (PS 1: Data Services, providing configuration-related middleware capabilities at the application layer) which creates this template.

In 918, to populate IMS package 706, system 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by IMS package 706 for deployment, integration and configuration. In this case, IMS package 706 maps outgoing/incoming public interfaces, and generates model-based workflows for adding subscribers to the service and network policies for exposing self-service UIs and APIs that are part of the deployed offering.

In 920A-B, the remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the Application layer) for this purpose, providing a UI to guide them through completion of the model.

In 922, once a model for IMS package 706 is complete, the developer may upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system).

In 924, system 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for IMS package 706 is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail." In 926, if the DevOps plan passes, system 110 may publish IMS package 706 to the system catalog, so renders (i.e., matches, dispatches, and configures) platform service 250 (PS 10: Messaging/Event Services, providing workflow automation-related middleware capabilities at the application layer) for this purpose.

In 928, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 930, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if IMS package 706 does not pass, the activity is stopped and can either be revised and the sequence repeated to adjust the EPC package 704 until it passes DevOps verification or abandoned.

In 931, for onboarding, the developer needs to create firewall package 702 so system 110 renders (i.e., matches, dispatches, and configures) platform service 241 (PS 1: Data Services, providing configuration-related middleware capabilities at the application layer) which creates this template. System 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by firewall package 702 for deployment, integration and configuration. In this case firewall package 702 maps a configuration API to a public interface and generates model-based mappings of Firewall rules (whitelists, block-lists, traffic shapes) to system based policies so the capability can be service-chained in an automated fashion with other service elements. The remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model. Once a model for firewall package 702 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system). System 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for firewall package 702 is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail."

In 932, if the DevOps plan passes, system 110 may publish firewall package 702 to the system catalog, so renders (i.e., matches, dispatches, and configures) platform service 250 (PS 10: Messaging/Event Services, providing workflow automation-related middleware capabilities at the application layer) for this purpose.

In 934, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 936, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if firewall package 702 does not pass, the activity is stopped and can either be revised and the sequence repeated to adjust the EPC package 704 until it passes DevOps verification or abandoned.

In 938, for onboarding, the developer needs to create virtual probe package 710 so system 110 renders (i.e., matches, dispatches, and configures) platform service 241 (PS 1: Data Services, providing configuration-related middleware capabilities at the application layer) which creates this template. System 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by virtual probe package 710 for deployment, integration and configuration. In this case, virtual probe package 710 generates a model-based workflow for registering the probe with a centralized management controller. The remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model. Once a model for virtual probe package 710 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system). System 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

In 940, if the DevOps plan passes, system 110 may publish virtual probe package 710 to the system catalog, so renders (i.e., matches, dispatches, and configures) platform service 250 (PS 10: Messaging/Event Services, providing workflow automation-related middleware capabilities at the application layer) for this purpose.

In 942, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 944, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if virtual probe package 710 does not pass, the activity is stopped and can either be revised and the sequence repeated to adjust the virtual probe package until it passes DevOps verification or abandoned.

Figure 10A:
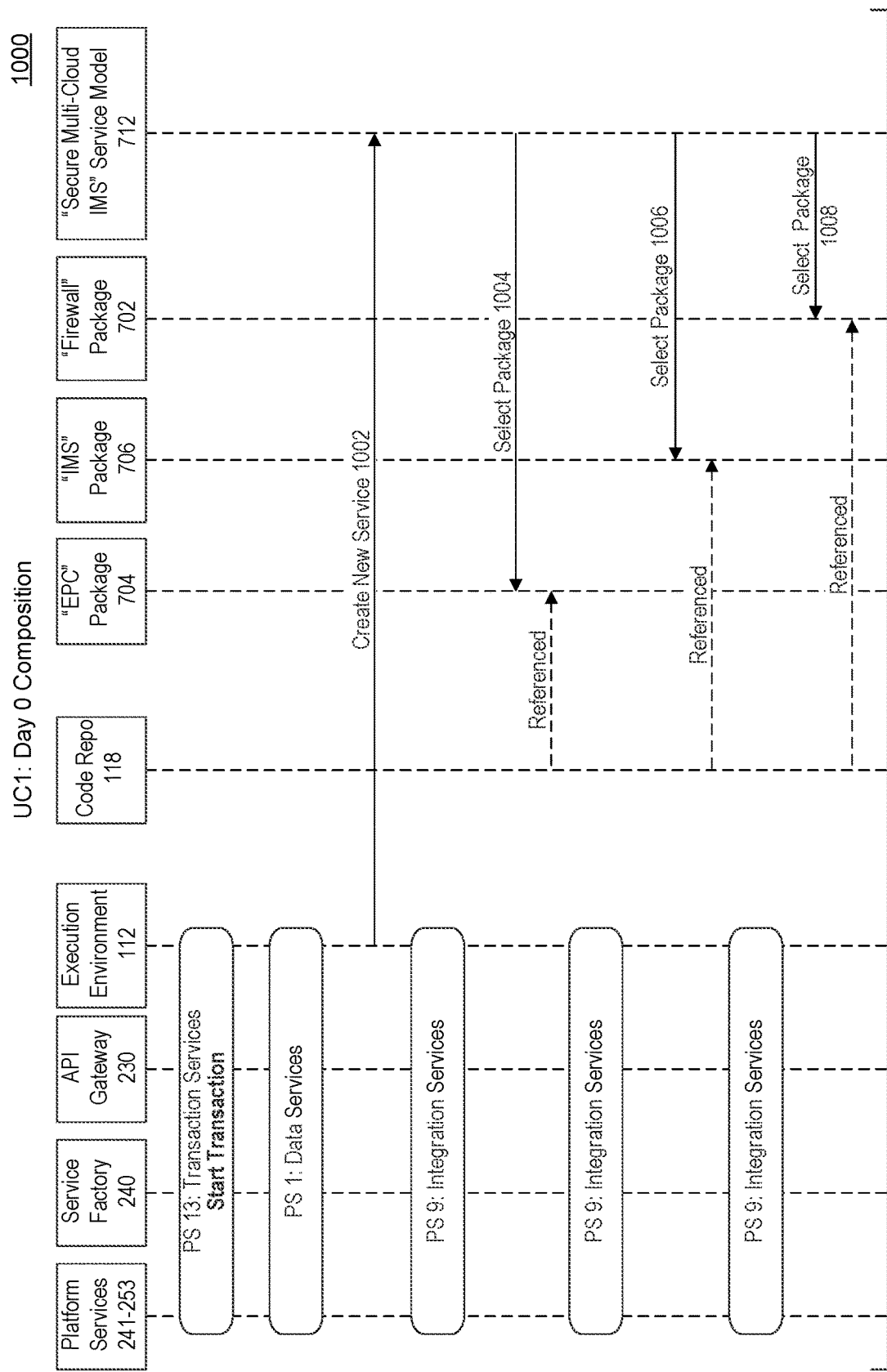
FIGS. 10A-10B are a sequence diagram illustrating a method of performing Day 0 composition in the use case for testing a radio access network ("RAN") for voice.
Figure 10B:
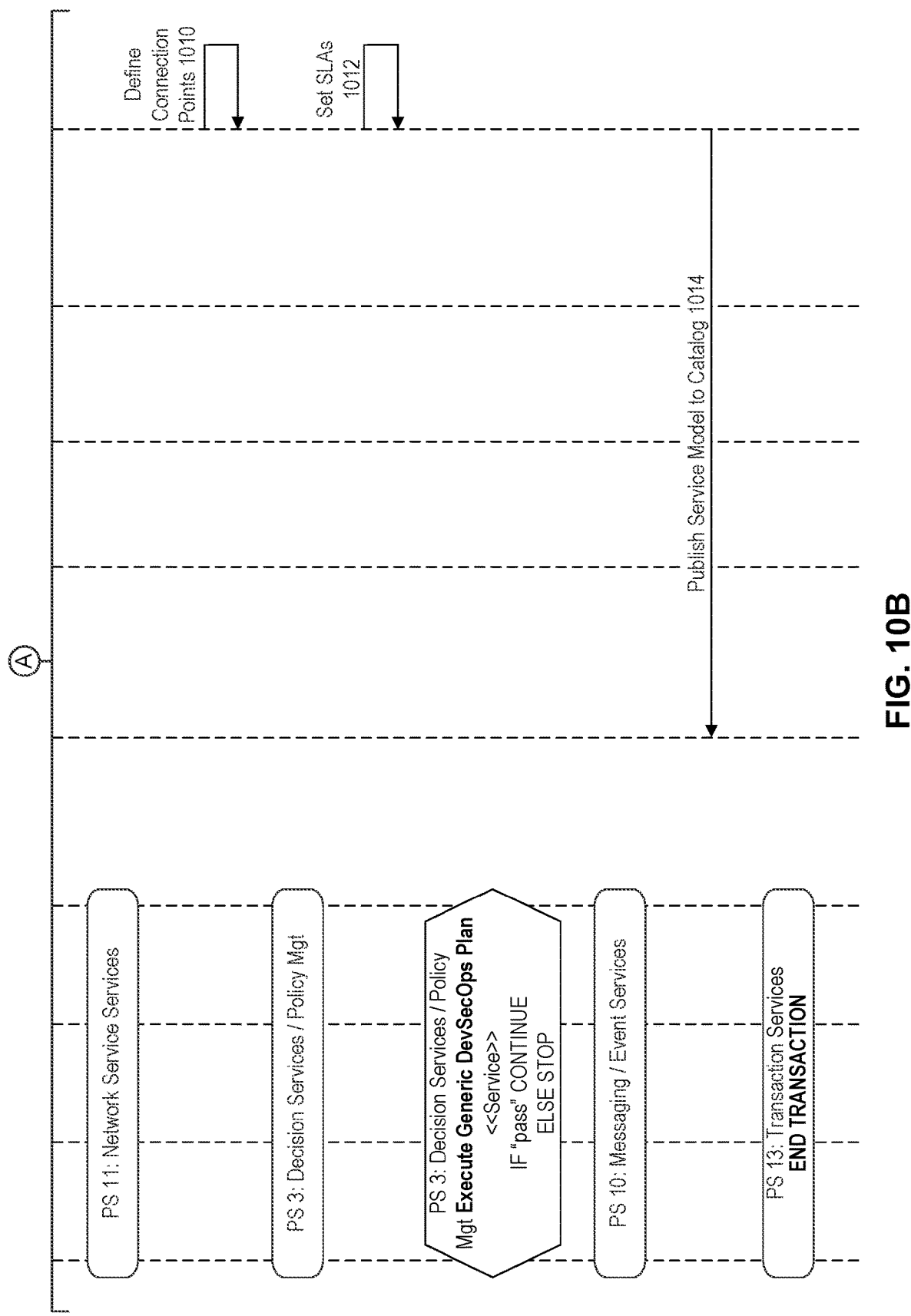

FIGS. 10A-10B are a sequence diagram illustrating a method 1000 of performing Day 0 composition in UC1 for testing a RAN for voice, according to some embodiments. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 10A-10B, as will be understood by a person of ordinary skill in the art(s).

Day 0 composition involves connecting the applications and any supporting services required by a secure, multi-cloud network for voice. Composition starts with system 110 opening up a transaction, so that all tasks can be rolled back/the infrastructure can be restored if there is a failure. All interactions of the system happen within a transaction. For this, system 110 renders (i.e., matches, dispatches, and configures) platform service 253 (PS 13: Transaction Services, providing orchestration-related middleware capabilities), then upon opening the transaction creates an initial context required to carry out the sequence and creates a process token (or links to one if it already exists), to implement the transaction and allow the tasks in the use-case depicted to execute asynchronously.

In 1002, for composition, the service designer needs to create a new empty service model for secure multi-cloud IMS 712, so system 110 renders (i.e., matches, dispatches, and configures) platform service 241 (PS 1: Data Services, providing configuration-related middleware capabilities at the application layer) which creates this template.

In 1004, secure multi-cloud IMS 712 requires solution elements to be specified by the Service designer, so system 110 renders (i.e., matches, dispatches, and configures) platform service 249 (PS 9: Integration Services, providing configuration-related middleware capabilities at the application layer) which presents them with a catalog of valid application packages to select from. Since the Service model is empty, the catalog initially presents a list of all packages. The user requires an EPC package 704 application, so selects it using service factory 240 (via a UI) binding an instance of EPC package 704 the secure multi-cloud IMS 712.

In 1006, the user requires IMS package 706 application, so selects it using service factory 240 (via a UI) binding an instance of IMS package 706 the secure multi-cloud IMS 712.

In 1008, the user requires firewall package 702 application, so selects it using service factory 240 (via a UI) binding an instance of firewall package 702 the secure multi-cloud IMS 712.

In 1010, when all application packages are bound to the service model, the service designer needs to define connection points (constraints between the application packages, and between the application packages and any supporting services), for this system 110 renders (i.e., matches, dispatches, and configures) platform service 251 (PS 11: Network Services, providing configuration-related middleware capabilities at the application layer) which presents the service designer with: A) a UI which exposes application-to-application configurations (examples: service chaining, port/traffic routing, etc.); and B) a catalog of valid support services which can be connected and configured for the service.

In 1012, when all application packages are bound to the service model and connection points are defined, the service designer may set SLAs (policies and constraints to be enforced during the execution of the service), for this system 110 renders (i.e., matches, dispatches, and configures) platform service 243 (PS 3: Decision Services/Policy Mgt., providing configuration-related middleware capabilities at the application layer) which presents the service designer with a UI which for adding and configuring SLAs based on the metrics/telemetry available for the bound package models and any supplementary policies/metrics exposed by supporting services (e.g., QoS metrics captured by a third-party monitoring tool).

When the service model is complete, system 110 may verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Service>>", which creates an instance of the network service in a DMZ/Test environment, creates a test hardness, runs all tests verifying basic connectivity, execution, security and all SLAs specified by the model, and finally returns a response of "pass or fail."

In 1014, if the DevOps plan passes, system 110 may publish the service model to the system catalog, so renders (i.e., matches, dispatches, and configures) platform service 251 (PS 10: Messaging/Event Services, providing workflow automation-related middleware capabilities at the application layer) for this purpose. Otherwise, if secure multi-cloud IMS 712 does not pass, the activity is stopped and can either be revised and the sequence repeated to adjust secure multi-cloud IMS 712 until it "passes" DevOps verification or abandoned.

Composition ends with system 110 closing the transaction via rendered (i.e., matched, dispatched and configured) platform service 253 (PS 13: Transaction Services, providing orchestration-related middleware capabilities), and at this point "committing" any/all objects.

After successful completion, the network service is in the catalog and ready to be instantiated, for example by performing Day 1 Deployment, Integration, and Configuration.
Use Case 2: Secure, 5G RAN For Voice Use case 2 ("UC2") is the testing of a secure, 5G RAN for voice. The core service for UC2 is Secure Edge IMS. FIGS. 11-14 describe UC2. UC2 allows a communication service provider to offer a "voice over IP" (VoIP) service delivered directly to their phones or other devices via a RAN (4G or 5G) with QoS guarantees.

Figure 11A:
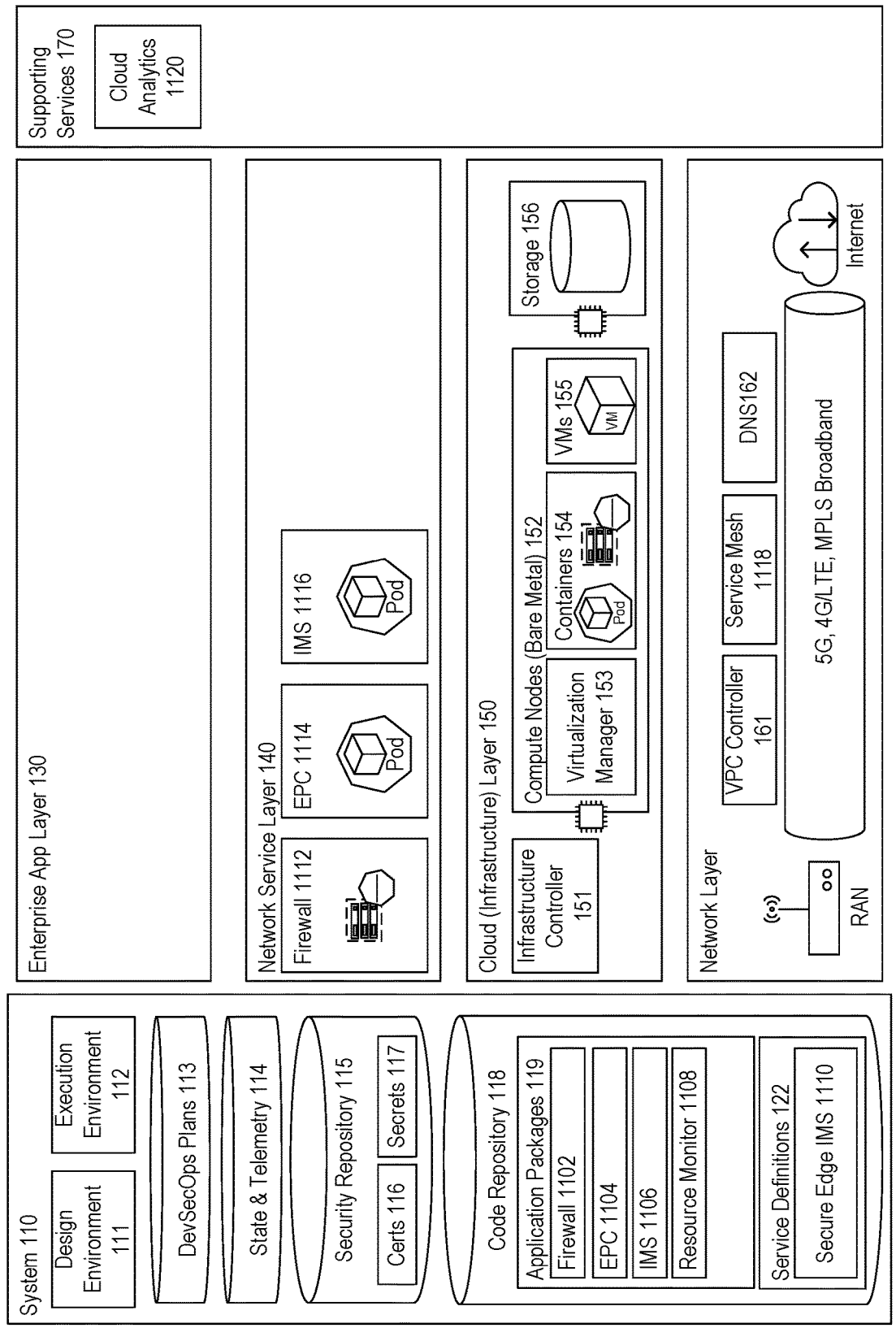
FIG. 11A is a block diagram of an architecture for testing a secure, 5G RAN for voice.

FIG. 11A is a block diagram of an architecture 1100A for deploying and assuring a secure, 5G RAN for voice. Architecture 1100A may include the components described above with reference to FIG. 1A. Additionally, architecture 1100A may include firewall package 1102, EPC package 1104, IMS package 1106, resource monitor package 1108, secure edge IMS 1110, firewall 1112, EPC 1114, IMS 1116, service mesh 1118, and cloud analytics tool 1120.

Service definitions 122 and application packages 119 are found in code repository 118 in system 110.

In network layer 160, a VPC is implemented via VPC controller 161 with a linked service mesh and DNS.

In cloud layer 150, infrastructure controller 151 provides an interface to compute nodes 152 for each site involved in UC2 and to storage 156. Compute nodes 152 have virtualization manager 153 present to support the execution of container-based applications (containers 154) and virtual machine based applications that run on virtual machines 155.

In network service layer 140, the core-network service consists of firewall 1112, EPC 1114, and IMS 1116, which together provide the end-to-end voice service. Firewall 1112 may run as a VM over containers on the edge compute node, EPC 1114 may run as containers on the access compute node, and IMS 1116 may run as containers on the core compute node. Application packages for each are found in the code repository.

No applications are deployed in enterprise application layer 130 for UC2.

Supporting service 170 for UC2 include cloud analytics tool 1120.

FIG. 11B is a table 1100B indicating Day 0 tasks performed across stages and layers in UC2 involving a secure, 5G RAN for voice, according to some embodiments.

Columns 1102B illustrate possible stages of a DevOps process for UC2 involving a secure, 5G RAN for voice. For example, columns 1102B may include stages for establishing a DMZ, deployment, configuration, and verification. Each stage in columns 1102B may involve performing Day 0 tasks relevant to the secure, 5G RAN for voice and to that stage.

Rows 1104B illustrate several layers in an architecture where relevant Day 0 tasks are performed. For example, rows 1104B may include an application layer, an infrastructure layer, and an network layer.

Cells 1106C illustrate indicative Day 0 tasks that are performed at each layer and stage (reflected by columns 1102C and rows 1104C) that are applicable to the secure, multi-cloud network for voice. Each task typically requires one or more operations, which are performed by platform services 241-253. The table below reflects particular platform services among platform services 241-253 that may be engaged by system 110 to perform the tasks in cells 1106C:

| Task | Platform Services Engaged |
|---|---|
| Assign placement of xNFs in correct Domain Hosts | PS 13 Transaction Services, PS 12 Security & Identity, PS 2 Domain Services, PS 3 Decision Services (Network), PS 3 Decision Services (Application), PS 3 Decision Services (Infrastructure), PS 11 Integration (Network), PS 11 Integration (Service) |
| Upload Docker Container Images to Repo | PS 13 Transaction Services, PS 12 Security & Identity, PS 2 Domain Services, PS 3 Decision Services (Application), PS 12 Connection (Infrastructure), PS 5 Workflow Automation (Infrastructure) |
| Configure Service Mesh | PS 13 Transaction Services, PS 12 Security & Identity, nPS 2 Domain Services, PS 3 Decision Services (Network), PS 11 Integration (Network), PS 6 Configuration (Network) |
| Deploy Pods for EPC | PS 13 Transaction Services, PS 12 Security & Identity, PS 2 Domain Services, PS 3 Decision Services (Application), PS 6 Configuration (Infrastructure), PS 11 Integration (Activation) |
| Deploy EWeb App Controller to all Nodes | PS 13 Transaction Services, PS 12 Security & Identity, PS 2 Domain Services, PS 3 Decision Services (Infrastructure), PS 9 Integration (Activation), PS 6 Configuration (Infrastructure), |
| Configure Service Mesh, register Apps | PS 13 Transaction Services, PS 12 Security & Identity, PS 2 Domain Services, PS 3 Decision Services (Network), PS 11 Integration (Network), PS 6 Configuration (Network), PS 9 Integration (Application |
| Configure EPC to Slice Mapping | PS 13 Transaction Services, PS 12 Security & Identity, PS 2 Domain Services, PS 3 Decision Services (Application), PS 3 Decision Services (Network), PS 12 Connection (Application), PS 6 Configuration (Application) |

| Task | Platform Services Engaged |
|---|---|
| Configure Cloud Analytics | PS 13 Transaction Services, PS 12 Security & Identity, PS 2 Domain Services, PS 3 Decision Services (Application), PS 3 Decision Services (Network), PS 3 Decision Services (Infrastructure), PS 12 Connection (Application), PS 6 Configuration (Infrastructure), PS 7 Orchestration (Infrastructure) |
| Configure Service-Chaining | PS 13 Transaction Services, PS 12 Security & Identity, PS 2 Domain Services, PS 3 Decision Services (Network), PS 11 Integration (Network), PS 11 Integration (Service), PS 9 Integration (Service), PS 6 Configuration (Service) |
| Evaluate Telemetry from Cloud Analytics against SLAs | PS 13 Transaction Services, PS 12 Security & Identity, PS 2 Domain Services, PS 3 Decision Services (Application), PS 3 Decision Services (Infrastructure), PS 3 Decision Services (Network), PS 3 Decision Services (Service), PS 3 Decision Services (Data) |
| Remove EWeb App Controller from all Nodes (after tests complete) | PS 13 Transaction Services, PS 12 Security & Identity, PS 2 Domain Services, PS 3 Decision Services (Infrastructure), PS 9 Integration (Activation) |
| Configure Service Mesh, removing registrations (after tests complete) | PS 13 Transaction Services, PS 12 Security & Identity, PS 2 Domain Services, PS 3 Decision Services (Network), PS 11 Integration (Network), PS 6 Configuration (Network), PS 6 Configuration (Application) |

System 110 dynamically matches, dispatches, configures, and coordinates these platform services to perform these tasks. These tasks are further detailed in the sequence diagrams included below.

Figure 12:
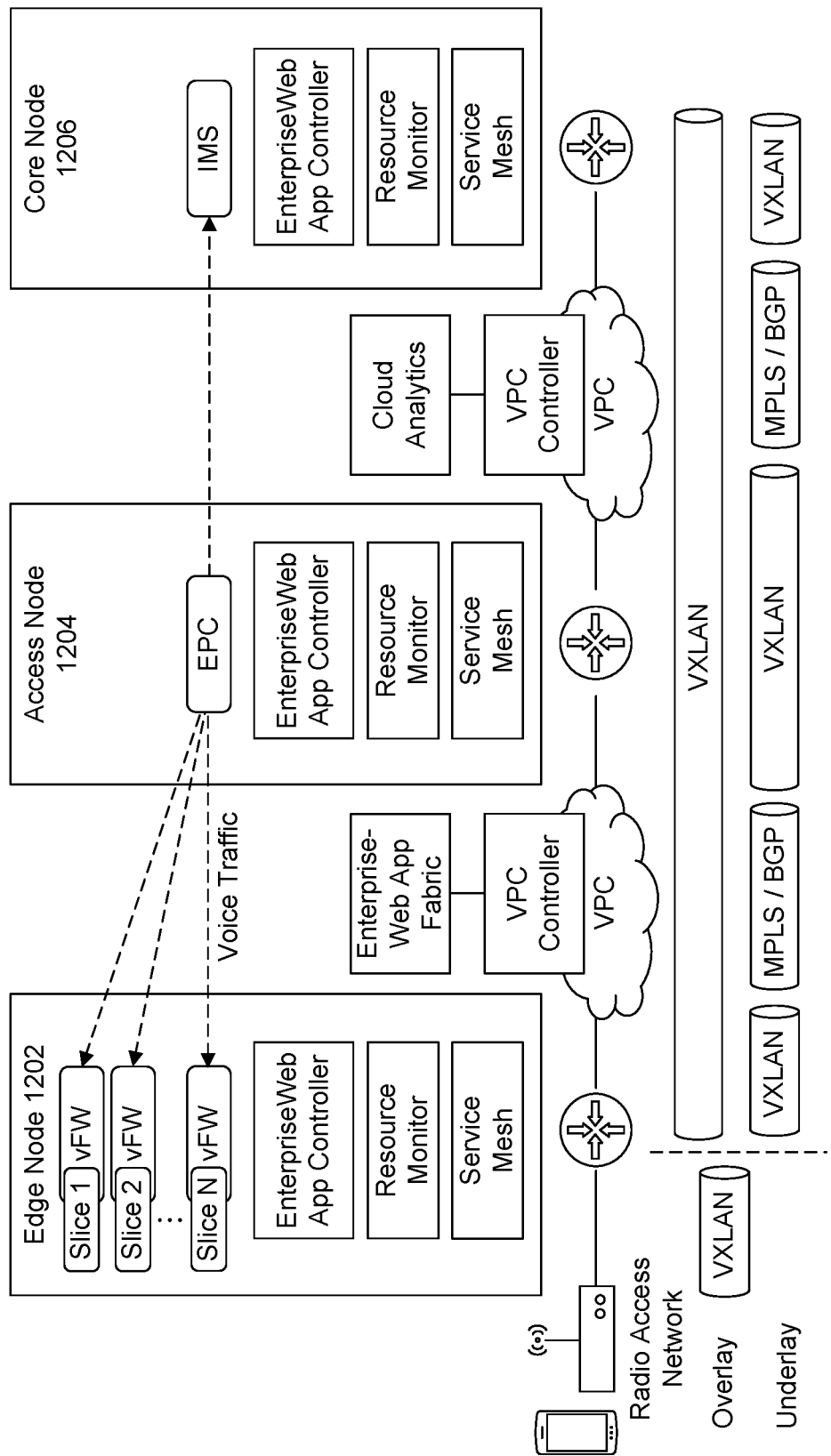
FIG. 12 is a network service diagram for a use case for testing a secure, 5G RAN for voice.
Figure 13A:
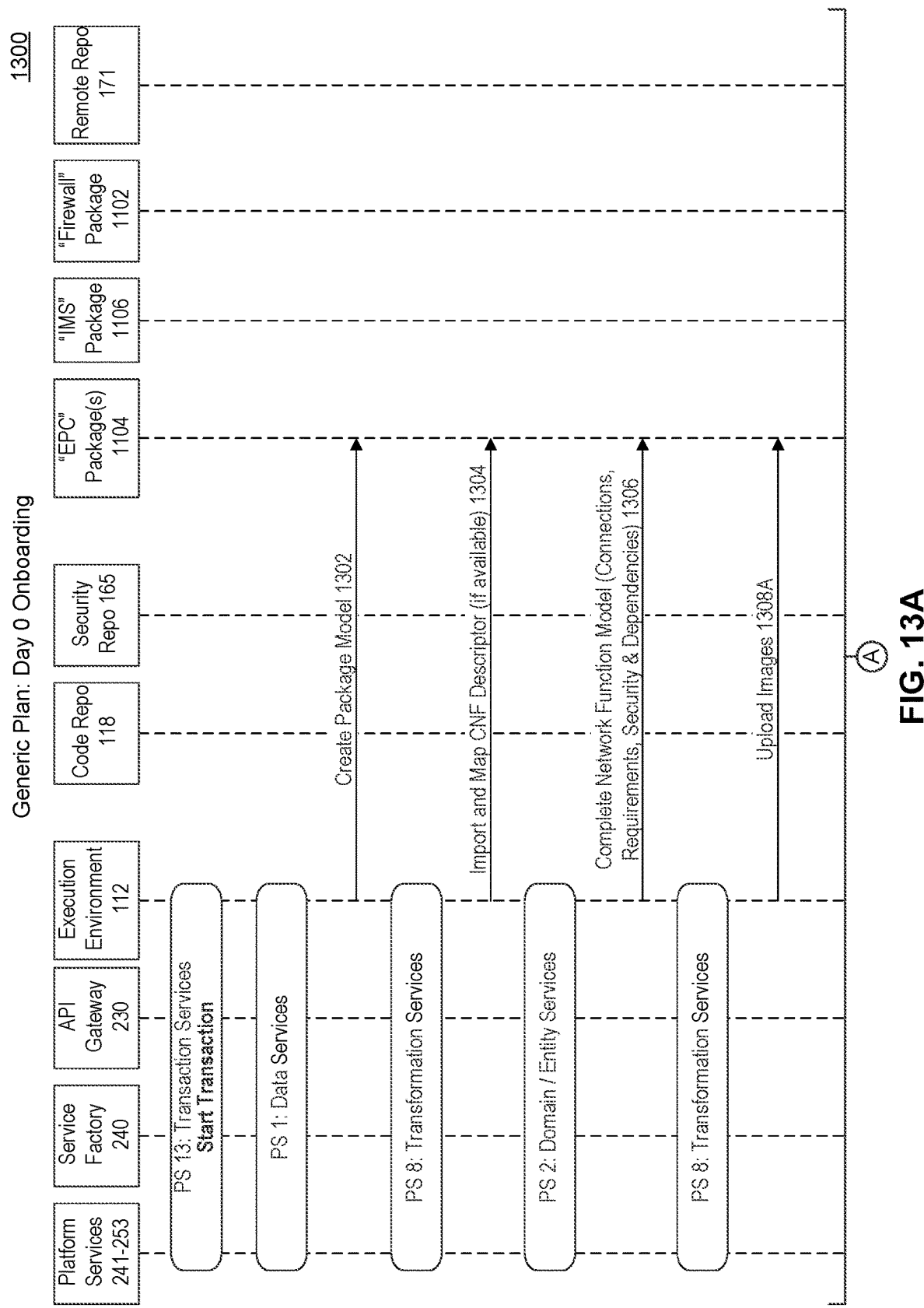
FIGS. 13A-13F are a sequence diagram illustrating a method of performing Day 0 onboarding in the use case for testing a secure, 5G RAN for voice.
Figure 13B:
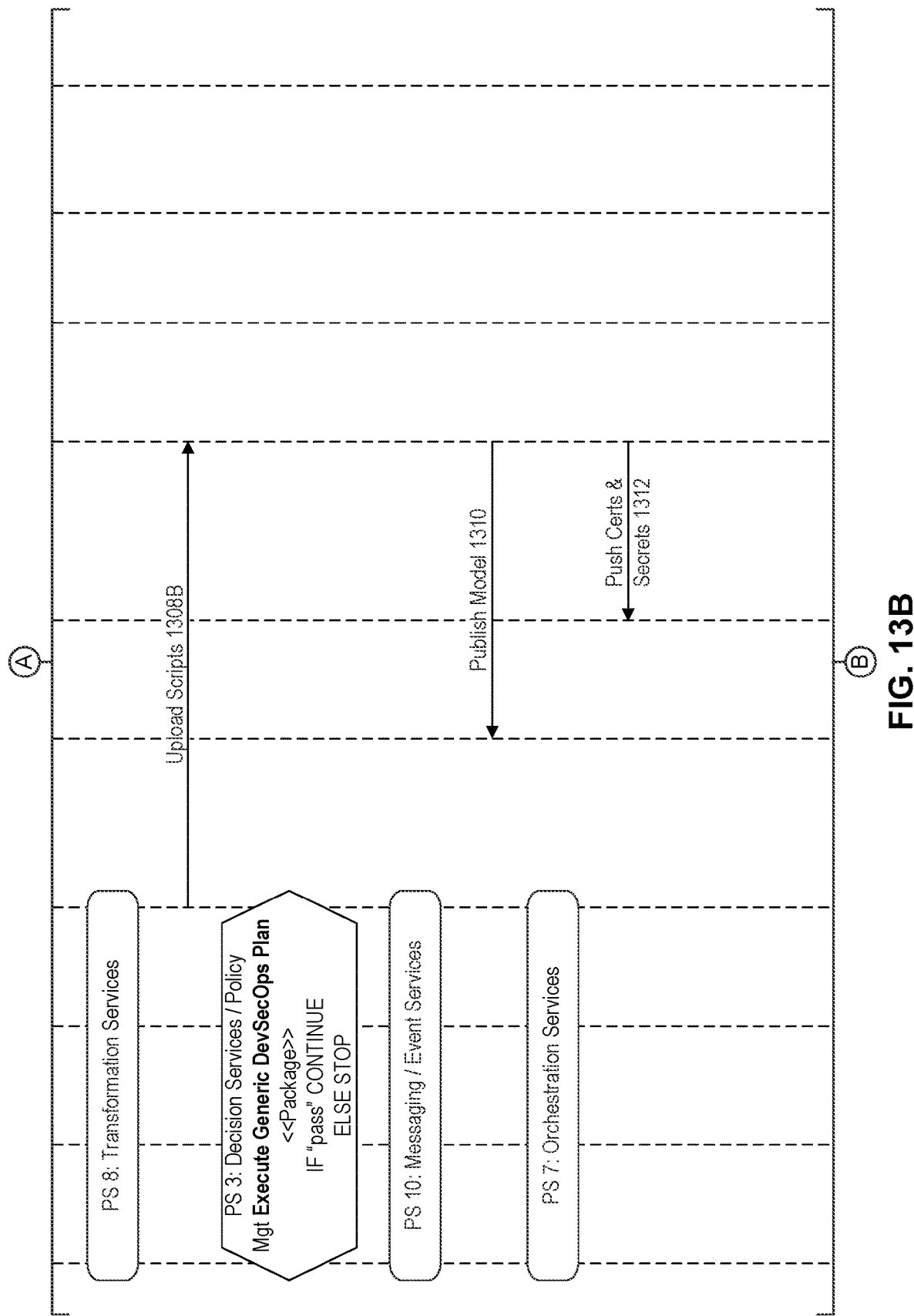
Figure 13C:
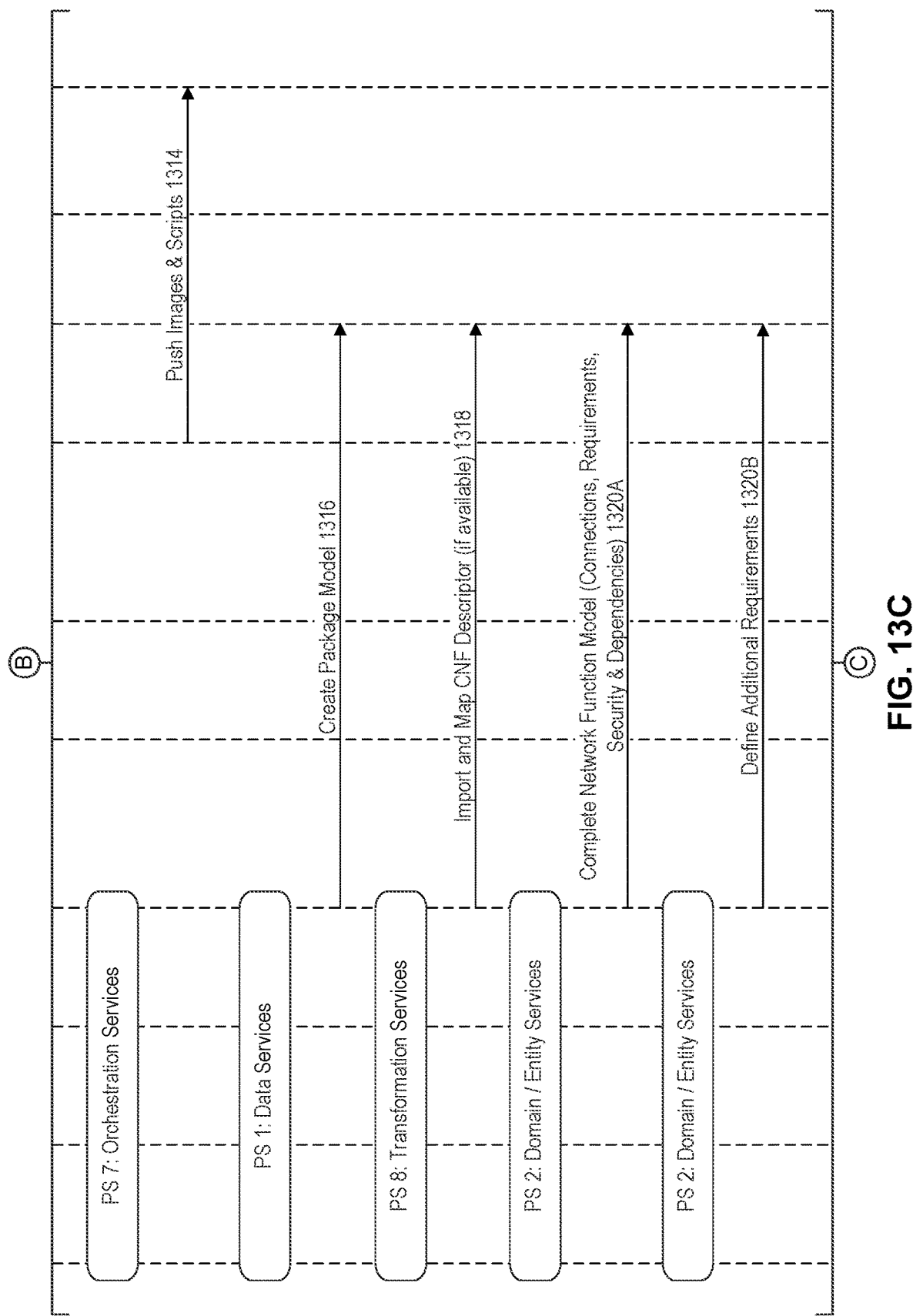
Figure 13D:
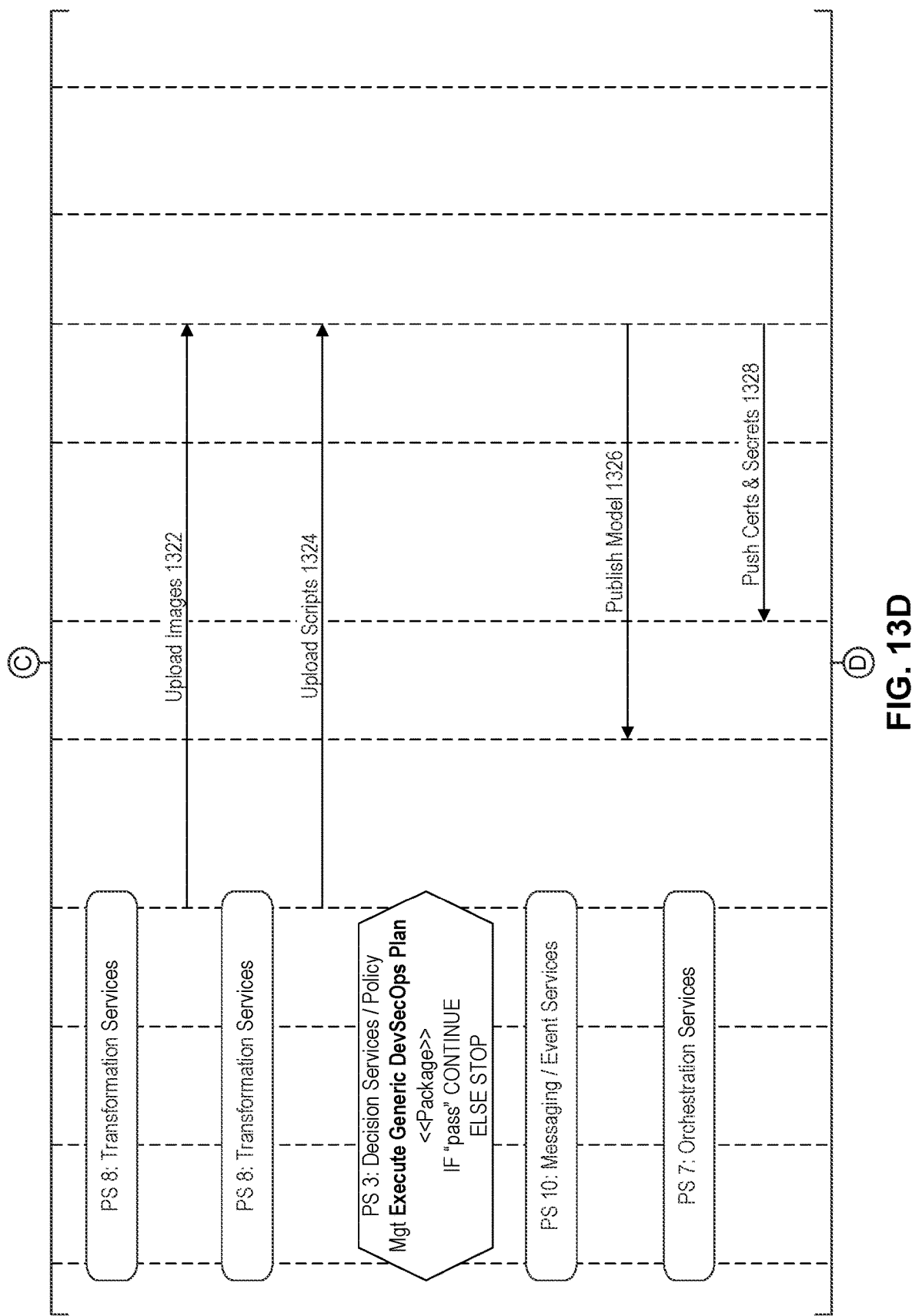
Figure 13E:
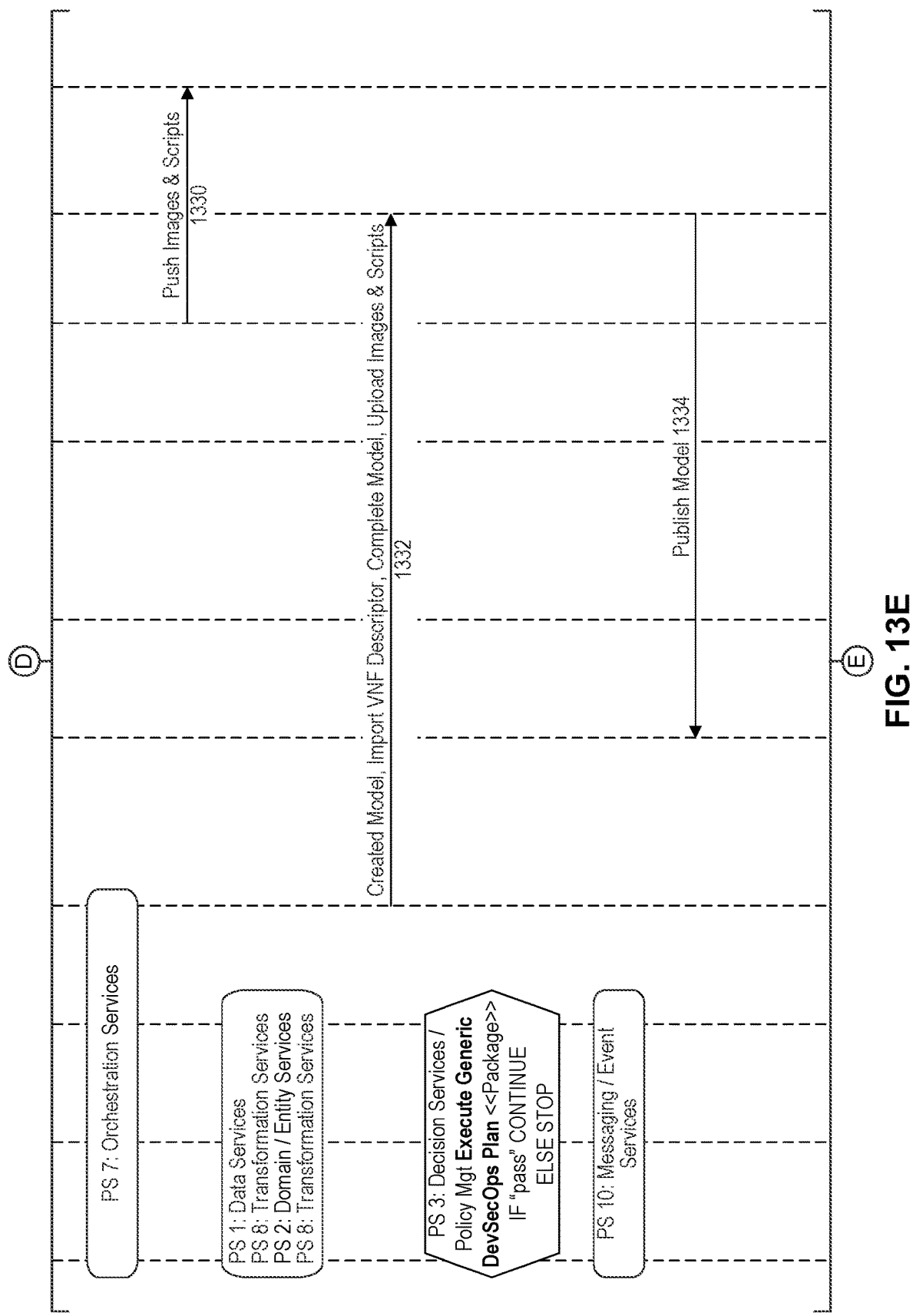
Figure 13F:
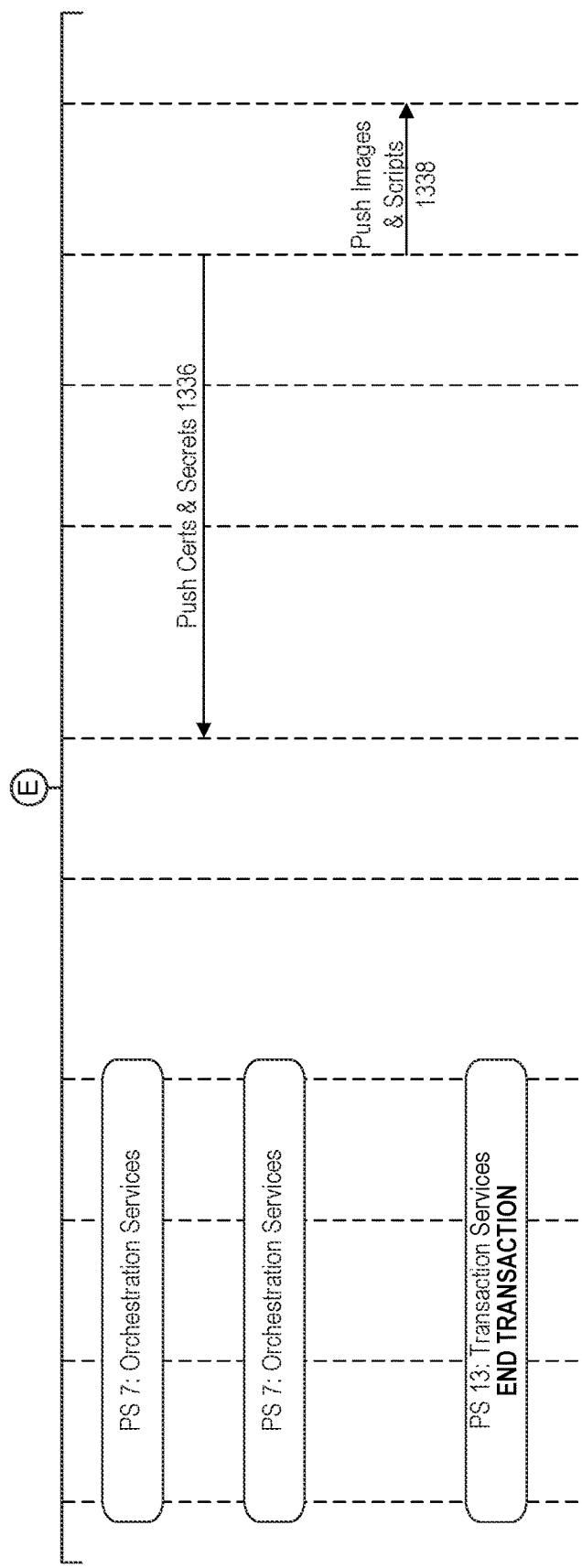

FIG. 12 is a network service diagram of a network service 1200 for UC2 for deploying and assuring a secure, 5G RAN for voice. Network service 1200 may include edge node 1202, access node 1204, and core node 1206.

UC2 is implemented across three nodes (edge node 1202, access node 1204, and core node 1206), connected via an VPC network and connected switches. Edge node 1202 may be connected to a RAN, and core node 1206 is also connected to the Internet. The VPC is implemented by a standard set of overlay and underlay protocols.

Edge node 1202 has VMs over containers for the vFW slices, containers/pods for probes that act as a resource monitor, containers/pods for system 110 deployed as an application controller to execute node-specific aspects of UC2, and a dedicated service mesh which is part of the infrastructure.

Access node 1204 has containers/pods for the EPC; containers/pods for probes that act as a resource monitor; containers/pods for system 110 deployed as an application controller to execute node-specific aspects of UC2; and a dedicated service mesh which is part of the infrastructure.

Core node 1206 has containers/pods for the IMS, containers/pods for probes that act as a resource monitor, containers/pods for system 110 deployed as an application controller to execute node-specific aspects of UC2, and a dedicated service mesh which is part of the infrastructure.

A centralized deployment of system 110 acts as an App Fabric to execute the end-to-end use-case and is connected independently via the VPC.

Cloud analytics tool 1120 is connected independently via the VPC.

Each sequence diagram (e.g., FIGS. 13-14) is organized the same. System 110's components for platform services 241-253, service factory 240, and API gateway 230, which together are responsible for execution are shown to the left. Each system interaction includes a note indicating which platform service in platform services 241-253 is rendered (i.e., matched, dispatched, configured) to deliver the task. The right side shows the resulting interaction (i.e., coordination) with the system's actors.

Day 0 Onboarding and Service Composition for UC2

Day 0 onboarding involves a developer modeling application packages for each solution element to be deployed, integrated and configured in the implementation of the overall network service model. This is not development of the application(s), rather the creation of models for utilizing developed code compiled into a container/VM image, binary, scripts or some other set of artifacts which carry out the execution, which were developed outside the context of the system.

FIGS. 13A-13F are a sequence diagram illustrating a method 1300 of performing Day 0 onboarding in UC2 for testing a secure, 5G RAN for voice, according to some embodiments. Method 1300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 13A-13F, as will be understood by a person of ordinary skill in the art(s).

Day 0 onboarding involves provisioning the network, storage and compute resources, and deploying all applications required by a secure, 5G RAN for voice. Onboarding starts with system 110 opening up a transaction, so that all tasks can be rolled back/the infrastructure can be restored if there is a failure. All interactions of the system happen within a transaction. For this, system 110 renders (i.e., matches, dispatches, and configures) platform service 253 (PS 13: Transaction Services, providing Orchestration-related middleware capabilities), then upon opening the transaction creates an initial context required to carry out the sequence and creates a process token (or links to one if it already exists), to implement the transaction and allow the tasks in UC2 depicted to execute asynchronously.

In 1302, the developer needs to create a new empty package model for the first solution element, EPC package 1104, so system 110 renders (i.e., matches, dispatches, and configures) platform service 241 (PS 1: Data Services, providing Configuration-related middleware capabilities at the Infrastructure layer) which creates this template.

In 1304, to populate EPC package 1104, system 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by EPC package 1104 for deployment, integration and configuration. In this case, EPC package 1104 maps standard-based (3GPP) interfaces between the internal components of the EPC, outgoing/incoming public interfaces via 3GPP, and network level (SDN) rules to model-based policies to control the internal behavior of the EPC when instantiated.

In 1306, the remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model.

In 1308, once a model for EPC package 704 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system).

In 1308A-B, system 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for EPC package 1104 is complete, system 110 needs to verify it before adding to the catalog, so renders (i.e., matches, dispatches, and configures) platform service 243 (PS 3: Decision Services/Policy Mgt. providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail." In 1310, if the DevOps plan passes, system 110 may publish EPC package 1104 to the system catalog, so renders (i.e., matches, dispatches, and configures) platform service 250 (PS 10: Messaging/Event Services, providing orchestration-related middleware capabilities at the infrastructure layer)) for this purpose.

In 1312, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 1314, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if EPC package 1104 does not pass, the activity is stopped and can either be revised and the sequence repeated to adjust the EPC package 704 until it passes DevOps verification or abandoned.

In 1316, for onboarding, the developer needs to create a new IMS package 1106 so system 110 renders (i.e., matches, dispatches, and configures) platform service 241 (PS 1: Data Services, providing configuration-related middleware capabilities at the application layer) which creates this template.

In 1318, to populate IMS package 1106, system 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by IMS package 706 for deployment, integration and configuration. In this case, IMS package 706 maps outgoing/incoming public interfaces and generates model-based workflows for adding subscribers to the service and network policies for exposing self-service UIs and APIs that are part of the deployed offering.

In 1320A-B, the remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model.

In 1322, once a model for IMS package 706 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer)) allowing the upload of any images, which system 110 maps to an executable type (e.g., a container image is not only uploaded but also wrapped by a YAML configuration so it can be deployed as a pod in a container management system).

In 1324, system 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for IMS package 1106 is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan "<<Package>>", which creates an instance of the application in a DMZ/Test environment, creates a test hardness, runs all tests verifying basic connectivity, execution, security and all requirements specified by the model, and finally returns a response of "pass or fail." In 1326, if the DevOps plan passes, system 110 may publish IMS package 1106 to the system catalog, so renders (i.e., matches, dispatches, and configures) platform service 250 (PS 10: Messaging/Event Services, providing workflow automation-related middleware capabilities at the application layer) for this purpose.

In 1328, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 1330, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if IMS package 706 does not pass, the activity is stopped and can either be revised and the sequence repeated to adjust the EPC package 704 until it passes DevOps verification or abandoned.

In 1332, for onboarding, the developer needs to create firewall package 1102 so system 110 renders (i.e., matches, dispatches, and configures) platform service 241 (PS 1: Data Services, providing configuration-related middleware capabilities at the application layer) which creates this template. System 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by firewall package 1102 for deployment, integration and configuration. In this case firewall package 1102 maps a configuration API to a public interface and generates model-based mappings of Firewall rules (whitelists, block-lists, traffic shapes) to system based policies so the capability can be service-chained in an automated fashion with other service elements. The remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model. Once a model for firewall package 1102 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system). System 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for firewall package 1102 is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail."

In 1334, if the DevOps plan passes, system 110 may publish firewall package 1102 to the system catalog, so renders (i.e., matches, dispatches, and configures) platform service 250 (PS 10: Messaging/Event Services, providing workflow automation-related middleware capabilities at the application layer) for this purpose.

In 1336, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 1338, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if firewall package 1102 does not pass, the activity is stopped and can either be revised and the sequence repeated to adjust the firewall package 1102 until it passes DevOps verification or abandoned.

Figure 14A:
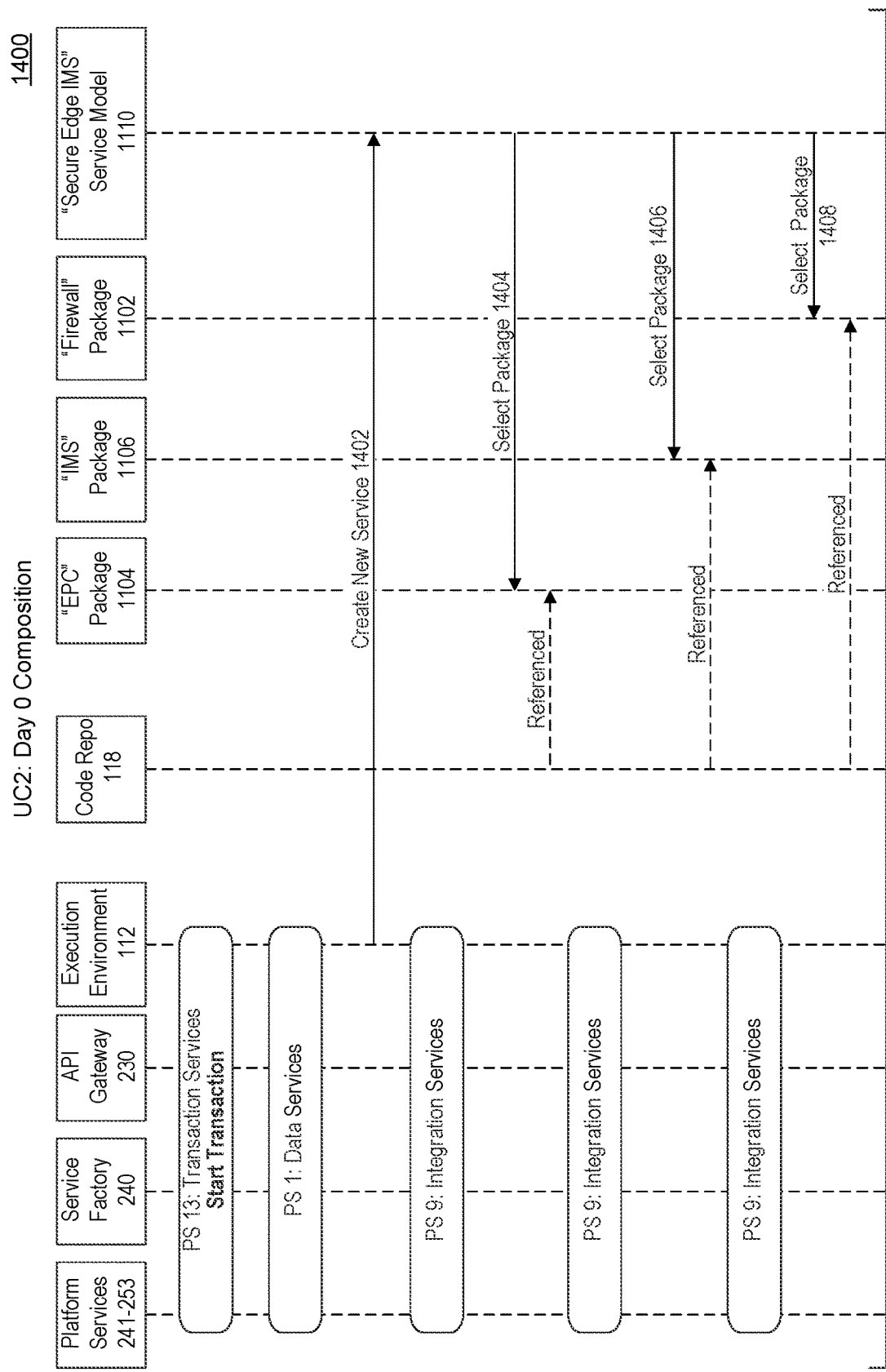
FIGS. 14A-14B are a sequence diagram illustrating a method of performing Day 0 composition in the use case for testing a secure, 5G RAN for voice.
Figure 14B:
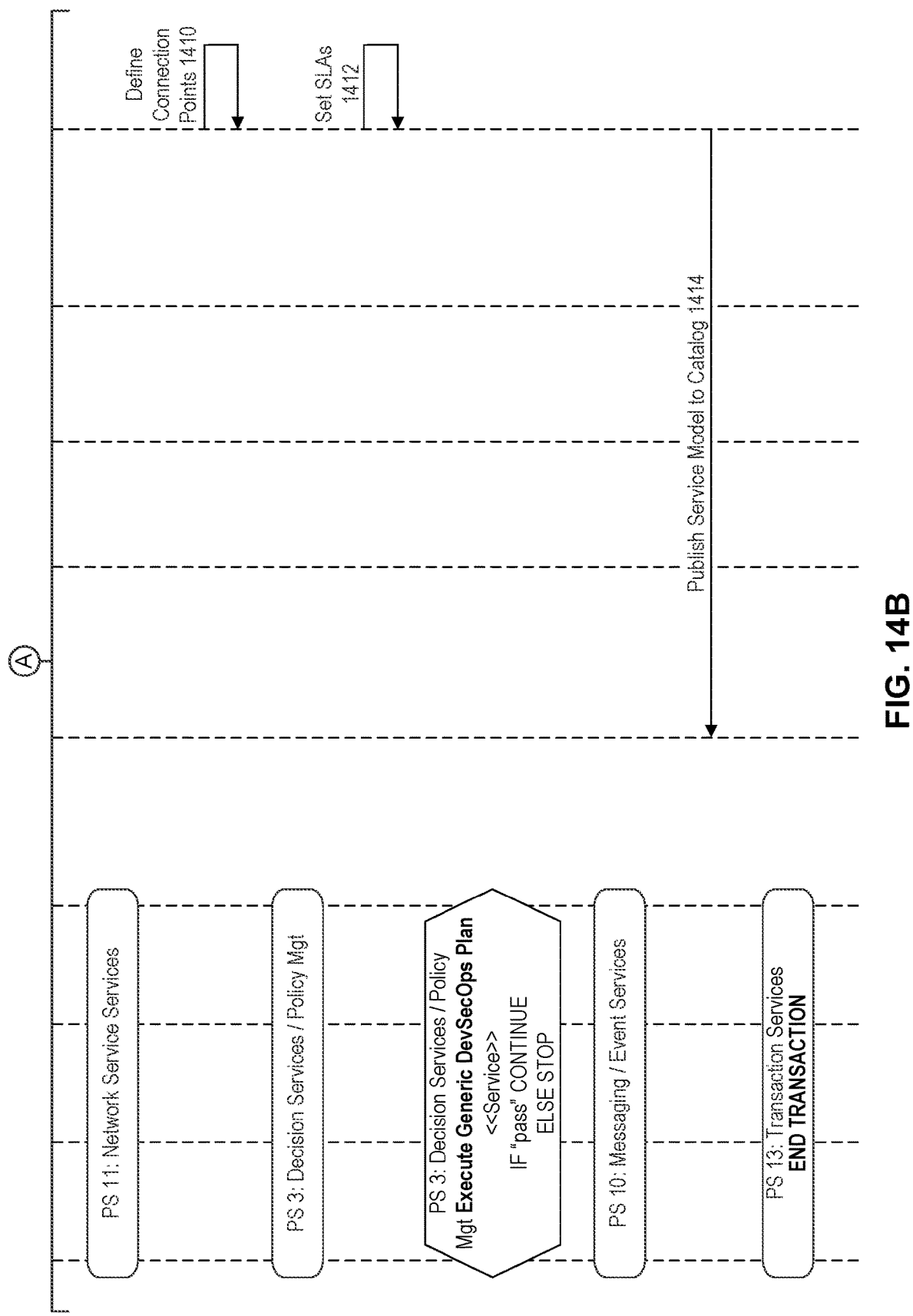

FIGS. 14A-14B are a sequence diagram illustrating a method 1400 of performing Day 0 composition in UC2 for testing a secure, 5G RAN for voice, according to some embodiments. Method 1400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 14A-14B, as will be understood by a person of ordinary skill in the art(s).

Day 0 composition involves connecting the applications and any supporting services required by a secure, multi-cloud network for voice. Composition starts with system 110 opening up a transaction, so that all tasks can be rolled back/the infrastructure can be restored if there is a failure. All interactions of the system happen within a transaction. For this, system 110 renders (i.e., matches, dispatches, and configures) platform service 253 (PS 13: Transaction Services, providing orchestration-related middleware capabilities), then upon opening the transaction creates an initial context required to carry out the sequence and creates a process token (or links to one if it already exists), to implement the transaction and allow the tasks in UC2 depicted to execute asynchronously.

In 1402, for composition, the service designer needs to create a new empty service model for secure edge IMS 1110, so system 110 renders (i.e., matches, dispatches, and configures) platform service 241 (PS 1: Data Services, providing configuration-related middleware capabilities at the application layer) which creates this template.

In 1404, secure edge IMS 1110 requires solution elements to be specified by the Service designer, so system 110 renders (i.e., matches, dispatches, and configures) platform service 249 (PS 9: Integration Services, providing configuration-related middleware capabilities at the application layer) which presents them with a catalog of valid application packages to select from. Since secure edge IMS 1110 is empty, the catalog initially presents a list of all packages. The user requires a EPC package 1104, so selects it using service factory 240 (via a UI) binding an instance of EPC package 1104 the secure multi-cloud IMS 1110.

In 1406, the user requires IMS package 1106, so selects it using service factory 240 (via a UI) binding an instance of IMS package 1106 the secure edge IMS 1110.

In 1408, the user requires firewall package 1102, so selects it using service factory 240 Service (via a UI) binding an instance of firewall package 702 the secure multi-cloud IMS 712.

In 1410, when all application packages are bound to secure edge IMS 1110, the service designer needs to define connection points (constraints between the application packages, and between the application packages and any supporting services), for this system 110 renders (i.e., matches, dispatches, and configures) platform service 251 (PS 11: Network Services, providing configuration-related middleware capabilities at the application layer) which presents the service designer with: A) a UI which exposes application-to-application configurations (examples: service chaining, port/traffic routing, etc.); and B) a catalog of valid support services which can be connected and configured for the service.

In 1412, when all application packages are bound to the service model and connection points are defined, the service designer may set SLAs (policies and constraints to be enforced during the execution of the service), for this system 110 renders (i.e., matches, dispatches, and configures) platform service 243 (PS 3: Decision Services/Policy Mgt., providing configuration-related middleware capabilities at the application layer) which presents the service designer with a UI which for adding and configuring SLAs based on the metrics/telemetry available for the bound package models and any supplementary policies/metrics exposed by supporting services (e.g., QoS metrics captured by a third-party monitoring tool).

When the service model is complete, system 110 may verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Service>>", which creates an instance of the network service in a DMZ/Test environment, creates a test hardness, runs all tests verifying basic connectivity, execution, security and all SLAs specified by the model, and finally returns a response of "pass or fail."

In 1414, if the DevOps plan passes, system 110 may publish the service model to the system catalog, so renders (i.e., matches, dispatches, and configures) platform service 251 (PS 10: Messaging/Event Services, providing Workflow Automation-related middleware capabilities at the Application layer) for this purpose. Otherwise, if secure edge IMS 1110 does not pass, the activity is stopped and can either be revised and the sequence repeated to adjust secure multi-cloud IMS 712 until it "passes" DevOps verification or abandoned.

Composition ends with system 110 closing the transaction via rendered (i.e., matched, dispatched and configured) platform service 253 (PS 13: Transaction Services, providing Orchestration-related middleware capabilities), and at this point "committing" any/all objects.

After successful completion, the network service is in the catalog and ready to be instantiated, for example by performing Day 1 Deployment, Integration, and Configuration.

Use Case 3: Secure, Multi-Cloud 5G Network

Use-case 3 ("UC3") is the testing of a secure, multi-cloud 5G network. Users on mobile devices connect to a 5G network which provides secure access to an edge-hosted IoT application. The end-to-end network is deployed as part of UC3. The core service for UC3 is "Secure Multi-Cloud 5G Core." FIGS. 15-18 describe UC3. UC3 allows a communication service provider to offer a "voice over IP" (VoIP) service and secured access to "core services" (e.g., content management systems) delivered directly to their phones or other devices via a RAN (4G or 5G) with QoS guarantees.

Figure 15A:
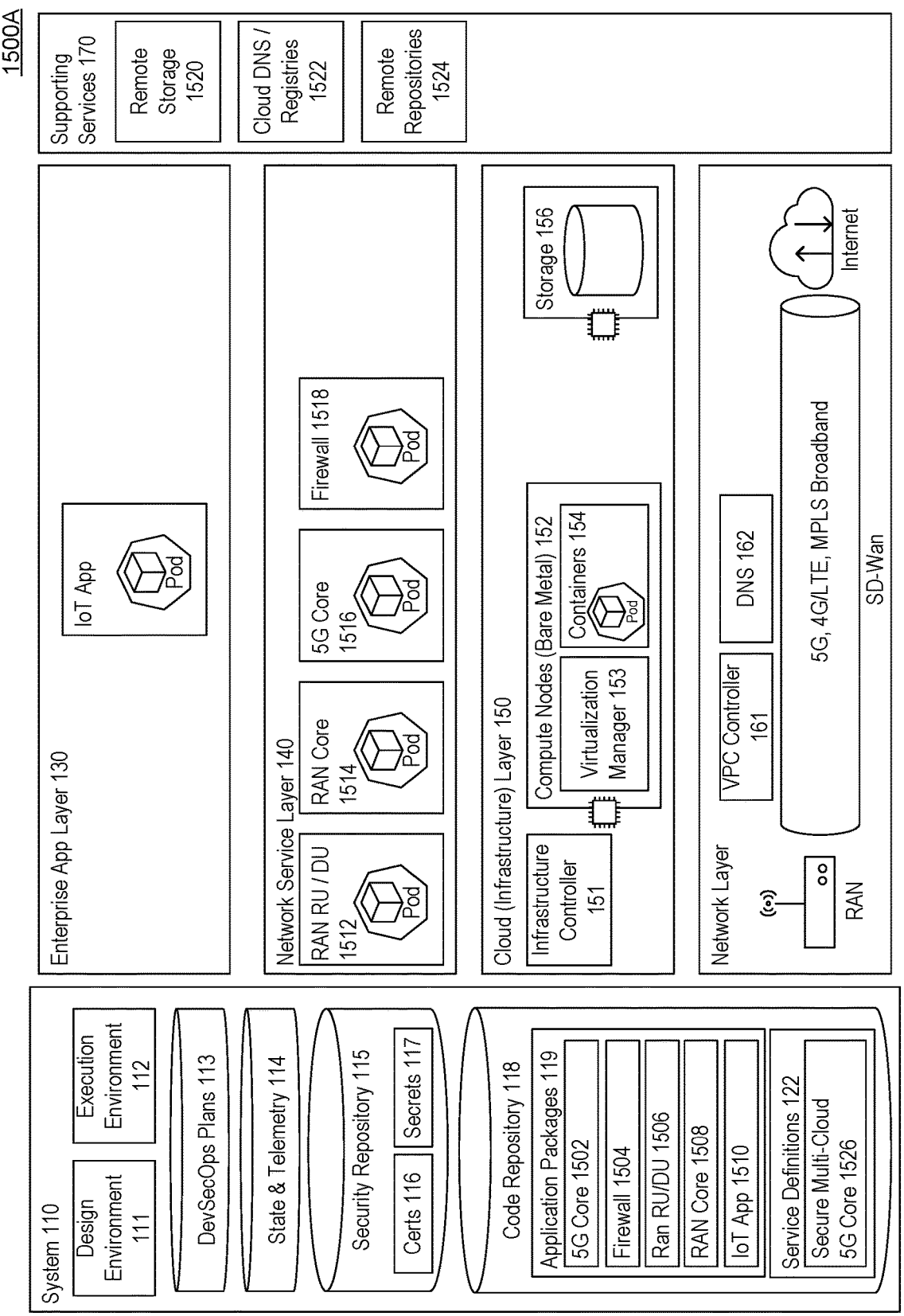
FIG. 15A is a block diagram of an architecture for testing a secure, multi-cloud 5G network.

FIG. 15A is a block diagram of an architecture 1500A for testing a secure, multi-cloud 5G network. Architecture 1500A may include the components described above with reference to FIG. 1A. Additionally, architecture 1500A may include 5G core package 1502, firewall package 1504, RAN RU/DU package 1506, RAN Core package 1508, IoT App package 1510, RAN RU/DU 1512, RAN core 1514, 5G core 1516, firewall 1518, remote storage 1520, cloud DNS 1522, remote repositories 1524, and secure multi-cloud 5G core 1526.

Service definitions 122 and application packages 119 are found in code repository 118 in system 110. IoT application 1514 is then deployed on the resulting edge network.

In network layer 160, a software defined wide area network ("SD-WAN") is implemented via VPC controller 161 with DNS 162.

In cloud layer 150, infrastructure controller 151 provides an interface to compute nodes 152 for each site involved in UC3 and to storage 156. Compute nodes 152 have virtualization manager 153 present to support the execution of container-based applications (containers 154).

In network service layer 140, the core-network service consists of a radio access network radio unit/distributed unit ("RAN RU/DU") 1512, RAN core 1514, 5G core 1516, and firewall 1518, which together provide the end-to-end 5G connectivity for connected devices. All components are running over containers on the compute nodes. Application packages 119 for each component are found in code repository 118 (5G core package 1502, firewall package 1504, RAN RU/DU package 1506, RAN core package 1508, and IoT app package 1510).

In enterprise application layer 130, IoT application 1514 is deployed as a container on the edge compute node. The application package is found in the code repository.

Supporting service 170 for UC3 includes centralized remote storage 1520 (a cloud-based database), cloud DNS 1522, and remote repositories 1524 (for images).

FIG. 15B is a table 1500B indicating Day 0 tasks performed across stages and layers in UC3 involving a secure, multi-cloud 5G network, according to some embodiments.

Columns 1502B illustrate possible stages of a DevOps process for UC3 involving a secure, multi-cloud 5G network. For example, columns 1502B may include stages for establishing a DMZ, deployment, configuration, and verification. Each stage in columns 1502B may involve performing Day 0 tasks relevant to the secure, multi-cloud 5G network and to that stage.

Rows 1504B illustrate several layers in an architecture where relevant Day 0 tasks are performed. For example, rows 1504B may include an application layer, an infrastructure layer, and an network layer.

Cells 1506C illustrate indicative Day 0 tasks that are performed at each layer and stage (reflected by columns 1502C and rows 1504C) that are applicable to the secure, multi-cloud 5G network. Each task typically requires one or more operations, which are performed by platform services 241-253. The table below reflects particular platform services among platform services 241-253 that may be engaged by system 110 to perform the tasks in cells 1506C:

| Task | Platform Services Engaged |
| --- | --- |
| Determine 5G Slice Target | PS 13 Transaction Services, PS 12 Security & Identity, PS 2 Domain Services, PS 3 Decision Services (Network), PS 3 Decision Services (Application), PS 3 Decision Services (Infrastructure), PS 9 Integration (Network), PS 9 Integration (Service) |
| Upload Certs & Create Service Accounts | PS 13 Transaction Services, PS 12 Security & Identity, PS 2 Domain Services, PS 3 Decision Services (Data), PS 9 Integration (Infrastructure) |
| Configure Firewall Ingress Rules | PS 13 Transaction Services, PS 12 Security & Identity, PS 2 Domain Services, PS 3 Decision Services (Network), PS 9 Integration (Network), PS 3 Decision Services (Infrastructure), PS 9 Integration (Service), PS 9 Integration (Infrastructure) |
| Deploy Pod for 5G Core to Edge | PS 13 Transaction Services, PS 12 Security & Identity, PS 2 Domain Services, PS 3 Decision Services (Application), PS 6 Configuration (Infrastructure), PS 9 Integration (Activation) |
| Connect Remote DB to 5G Core | PS 13 Transaction Services, PS 12 Security & Identity, PS 2 Domain Services, PS 9 Integration (Data), PS 3 Decision Services (Network), PS 9 Integration (Data), PS 12 Connection (Application), PS 9 Integration (Application), PS 6 Configuration (Service) |
| Connect 5G Core Pods to Subnets | PS 13 Transaction Services, PS 12 Security & Identity, PS 2 Domain Services, PS 3 Decision Services (Network), PS 9 Integration (Network), PS 9 Integration (Application), PS 6 Configuration (Application) |
| Configure vFirewall Rules via REST API | PS 13 Transaction Services, PS 12 Security & Identity, PS 2 Domain Services, PS 3 Decision Services (Application), PS 12 Connection (Application), PS 6 Configuration (Application) |
| Configure Resource Monitoring policies via REST API | PS 13 Transaction Services, PS 12 Security & Identity, PS 2 Domain Services, PS 3 Decision Services (Application), PS 3 Decision Services (Network), PS 12 Connection (Application), PS 6 Configuration (Infrastructure) |
| Configure vFirewall to Business App chaining | PS 13 Transaction Services, PS 12 Security & Identity, PS 2 Domain Services, PS 3 Decision Services (Network), PS 9 Integration (Network), PS 9 Integration (Application), PS 6 Configuration (Application) |
| Evaluate Test Results and publish to Catalog or return errors | PS 13 Transaction Services, PS 12 Security & Identity, PS 2 Domain Services, PS 3 Decision Services (Application), PS 3 Decision Services (Infrastructure), PS 3 Decision Services (Network), PS 3 Decision Services (Service), PS 7 Orchestration (Service) |
| Remove Remote DB (after tests complete) | PS 13 Transaction Services, PS 12 Security & Identity, PS 2 Domain Services, PS 9 Integration (Data), PS 6 Configuration (Service) |
| Remove Firewall Ingress Rules (after tests complete) | PS 13 Transaction Services, PS 12 Security & Identity, PS 2 Domain Services, PS 3 Decision Services (Network), PS 9 Integration (Network), PS 3 Decision Services (Infrastructure), PS 9 Integration (Service), PS 9 Integration (Infrastructure) |

System 110 dynamically matches, dispatches, configures, and coordinates these platform services to perform these tasks. These tasks are further detailed in the sequence diagrams included below.

Figure 16:
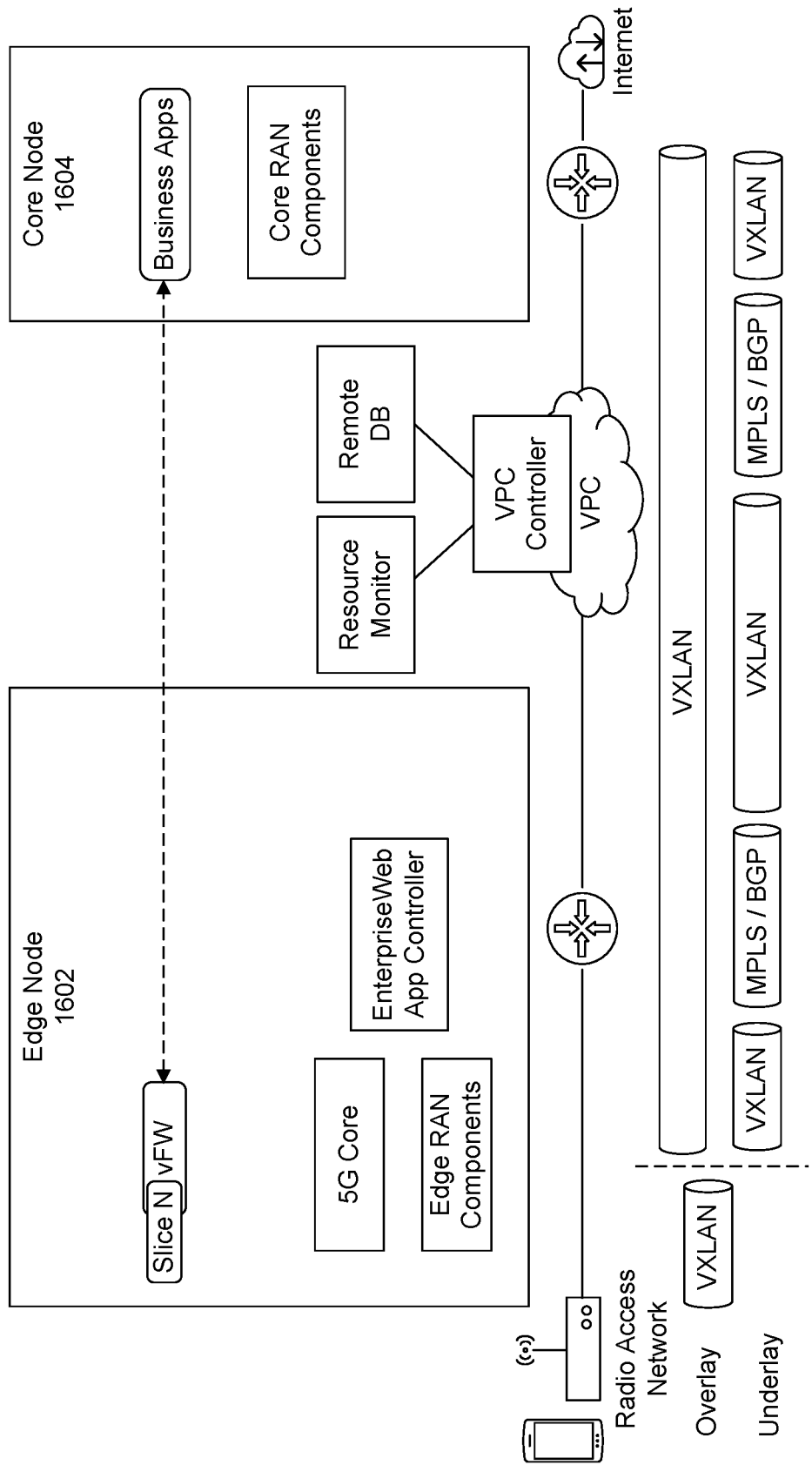
FIG. 16 is a network service diagram for a use case for testing a secure, multi-cloud 5G network.
Figure 17A:
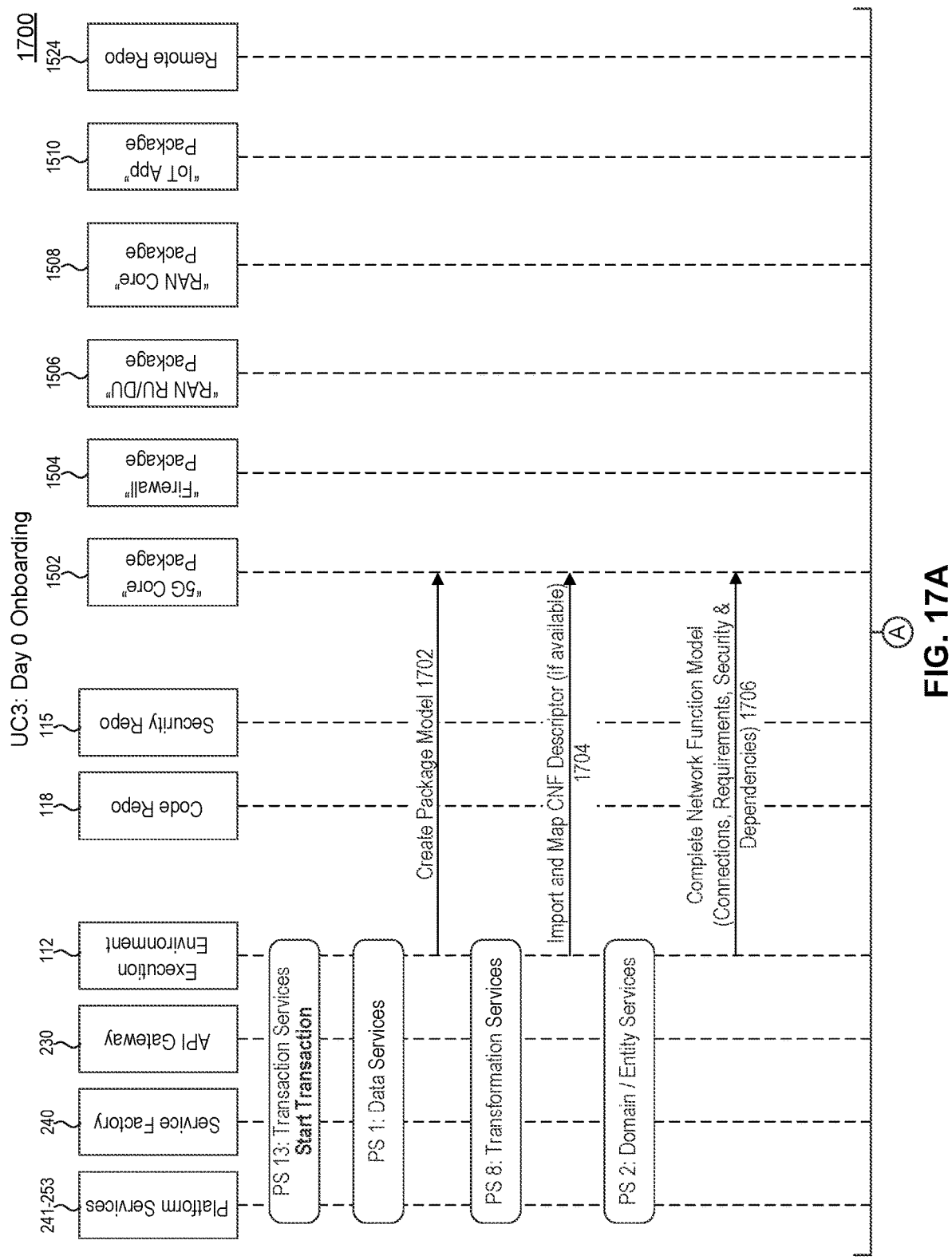
Figure 17C:
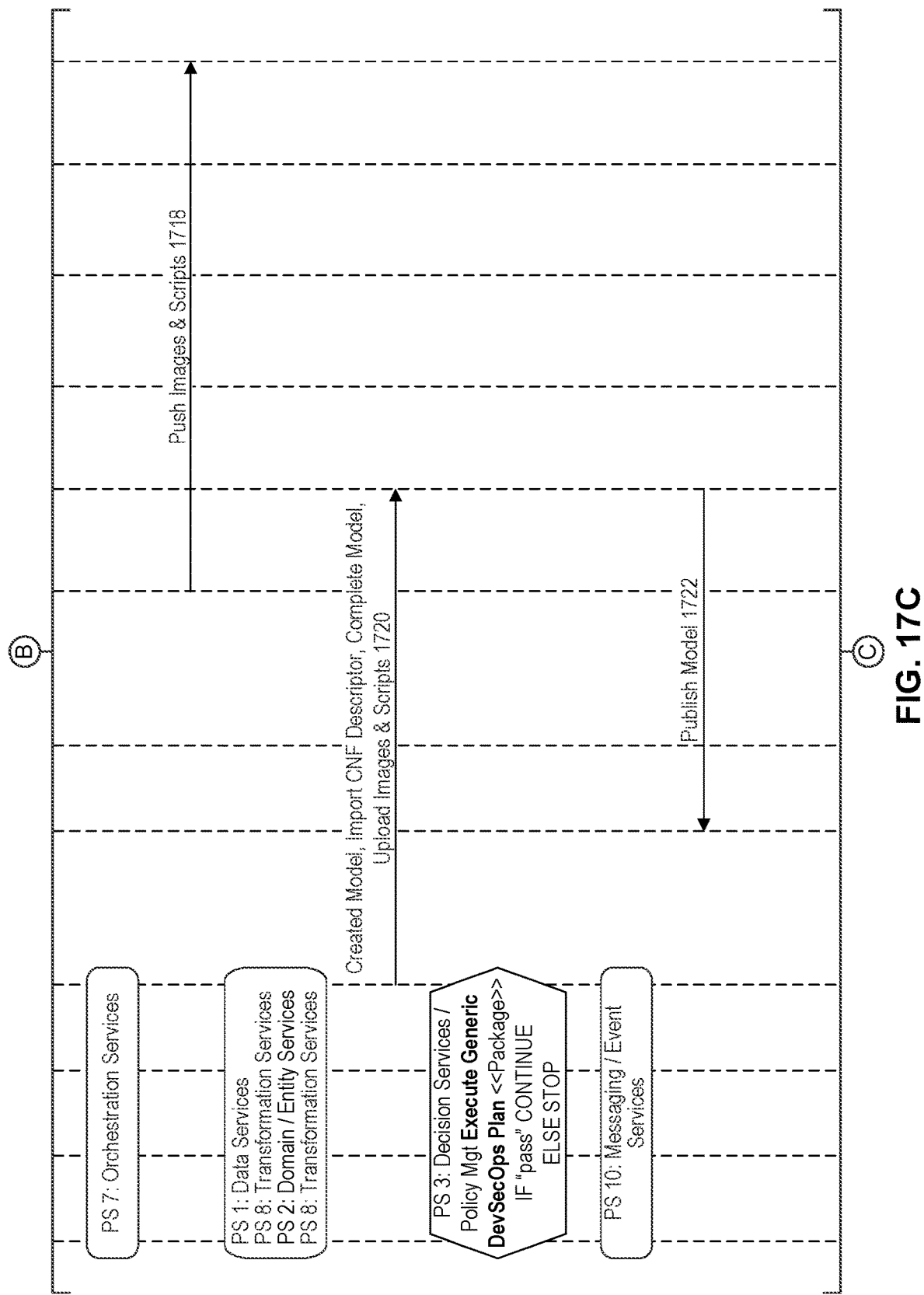
Figure 17D:
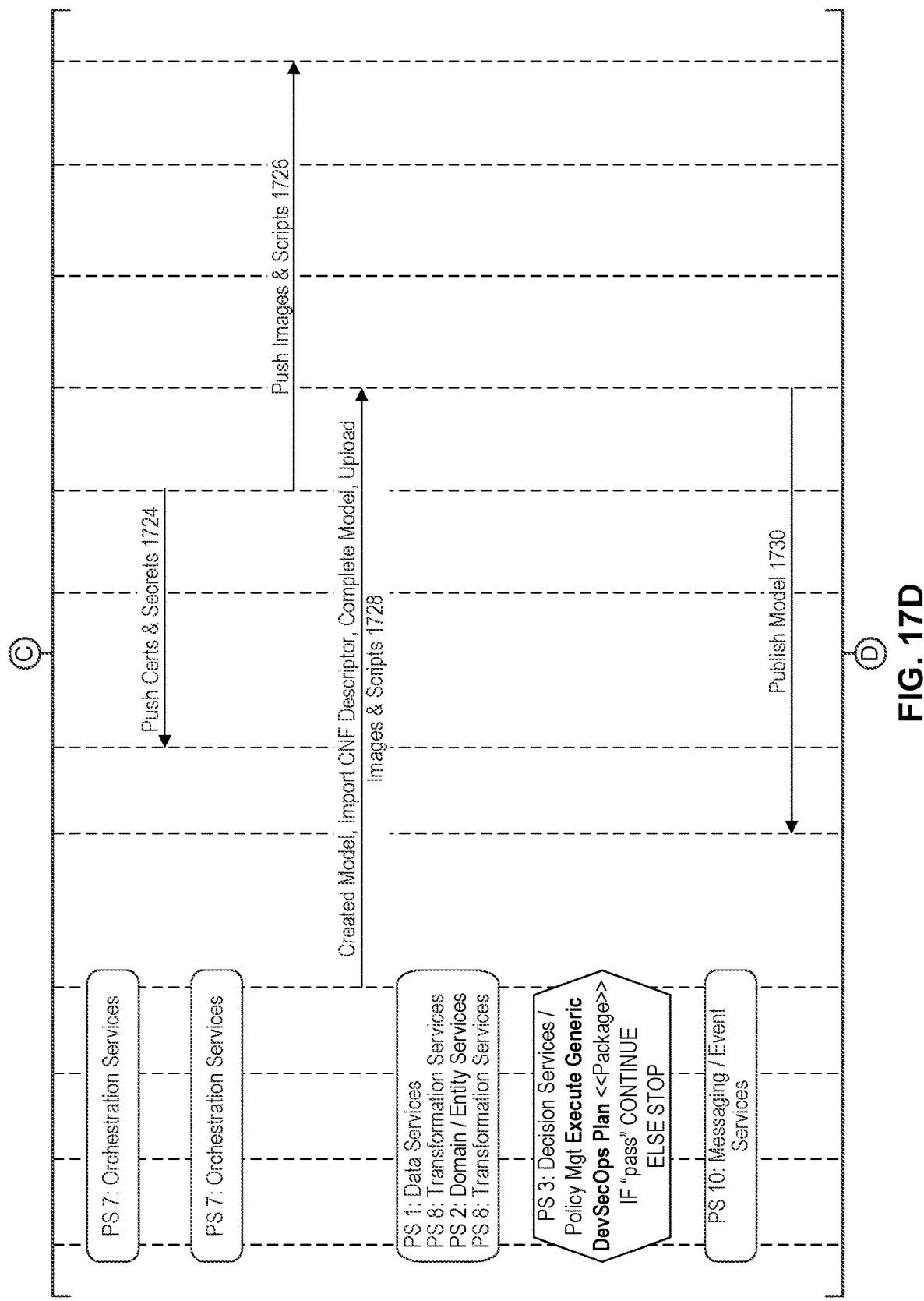
Figure 17E:
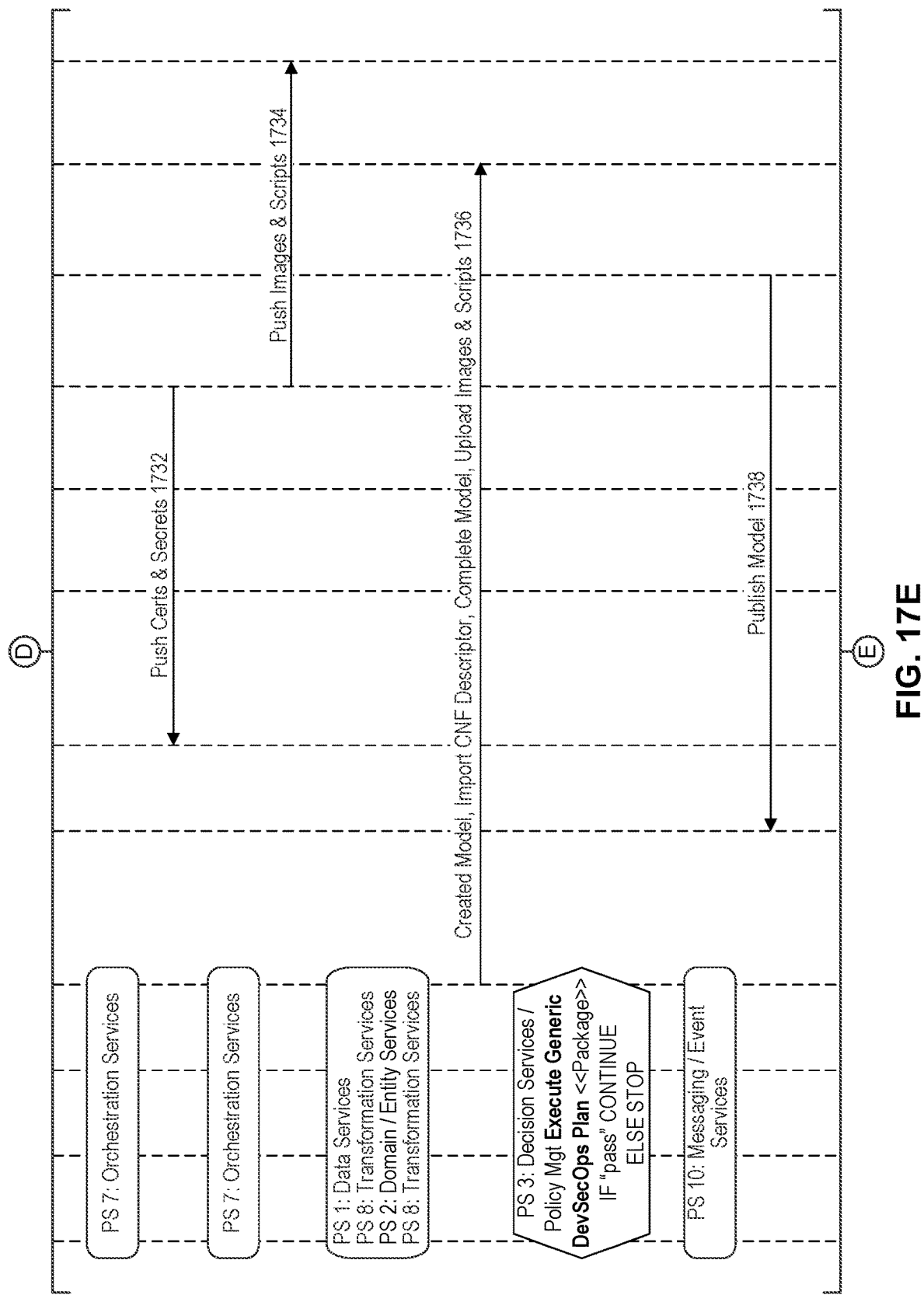
Figure 17F:
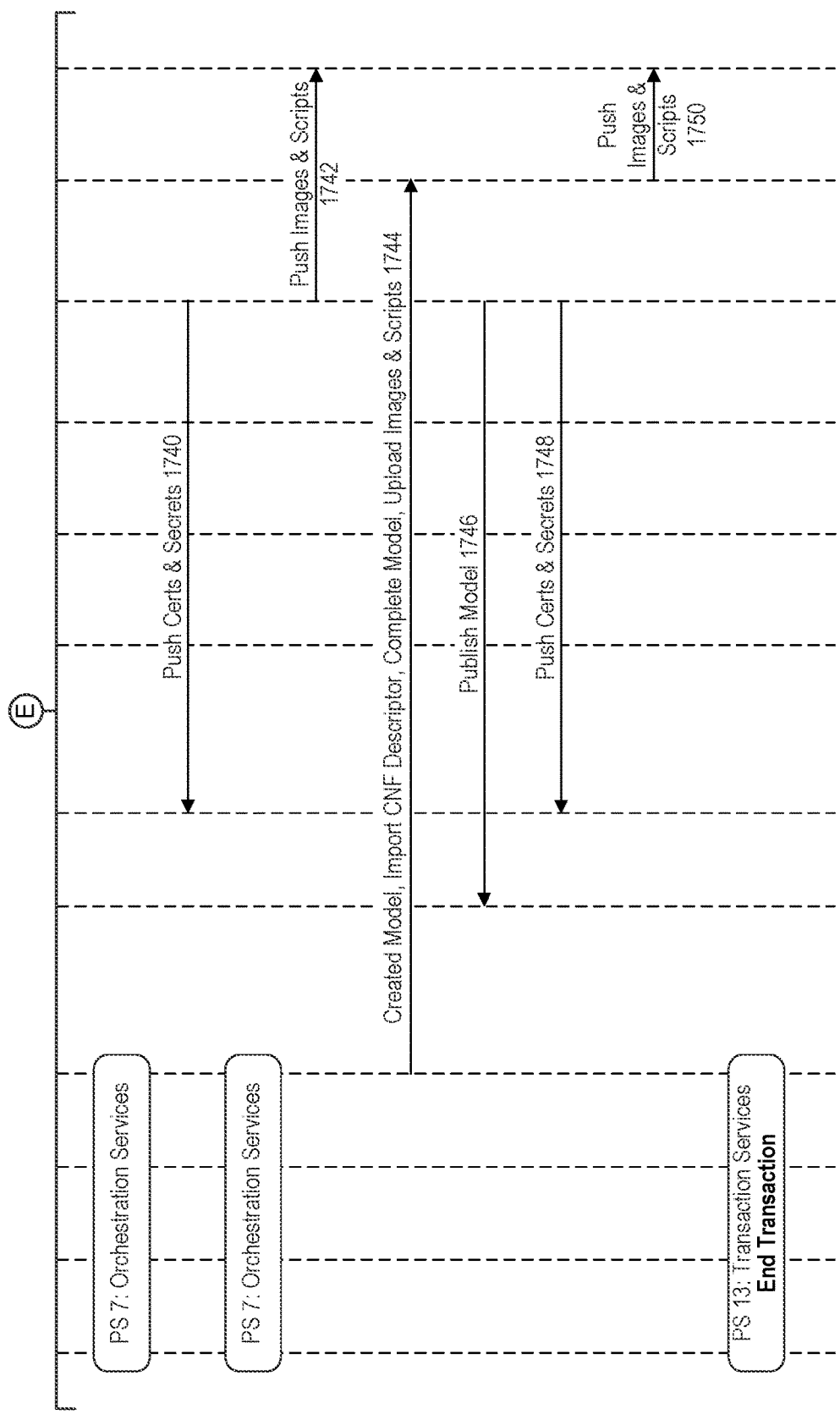

FIG. 16 is a network service diagram for a network service 1600 for UC3 for testing a secure, multi-cloud 5G network. Network service 1600 may include edge node 1602 and core node 1604.

UC3 is implemented across two nodes (edge node 1602 and core node 1604), connected via a VPC (SD-WAN) network and connected switches. Edge node 1602 is also connected to a RAN, and core node 1604 is also connected to the Internet. The VPC is implemented by a standard set of overlay and underlay protocols.

Edge node 1602 has containers/pods for the 5G core and edge RAN components to deliver shared base functionality across all 5G slices, containers/pods per 5G slice for the vFW, and containers/pods for system 110 deployed as an application controller to execute UC3.

Core node 1604 has containers/pods for the core RAN components. Optionally, other business applications could be deployed at the core.

A remote database and centralized resource monitoring are both connected independently via the VPC.

Each sequence diagram (e.g., FIGS. 17-18) is organized the same. System 110's components for platform services 241-253, service factory 240, and API gateway 230, which together are responsible for execution are shown to the left. Each system interaction includes a note indicating which platform service in platform services 241-253 is rendered (i.e., matched, dispatched, configured) to deliver the task. The right side shows the resulting interaction (i.e., coordination) with the system's actors.

Day 0 Onboarding and Service Composition for UC3

FIGS. 17A-17F are a sequence diagram illustrating a method 1700 of performing Day 0 onboarding in UC3 for testing a secure, multi-cloud 5G network, according to some embodiments. Method 1700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 17A-17F, as will be understood by a person of ordinary skill in the art(s).

Day 0 onboarding involves provisioning the network, storage and compute resources, and deploying all applications required by a secure, multi-cloud 5G network. Onboarding starts with system 110 opening up a transaction, so that all tasks can be rolled back/the infrastructure can be restored if there is a failure. All interactions of the system happen within a transaction. For this, system 110 renders (i.e., matches, dispatches, and configures) platform service 253 (PS 13: Transaction Services, providing orchestration-related middleware capabilities), then upon opening the transaction creates an initial context required to carry out the sequence and creates a process token (or links to one if it already exists), to implement the transaction and allow the tasks in UC3 depicted to execute asynchronously.

In 1702, the developer needs to create a new empty package model for the first solution element, 5G core package 1502, so system 110 renders (i.e., matches, dispatches, and configures) platform service 241 (PS 1: Data Services, providing configuration-related middleware capabilities at the application layer) which creates this template.

In 1704, to populate 5G core package 1502, system 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by 5G core package 1502 for deployment, integration and configuration. In this case, 5G core package 1502 maps standard-based (3GPP) interfaces between the internal components of the core, outgoing/incoming public interfaces via 3GPP, and network level (SDN) rules to model-based policies to control the internal behavior of the underlying networks when instantiated.

In 1706, the remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model.

In 1708, once a model for 5G core package 1502 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system).

In 1712, system 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for 5G core package 1502 is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail." In 1714, if the DevOps plan passes, system 110 may publish 5G core package 1502 to the system catalog, so renders (i.e., matches, dispatches, and configures) platform service 250 (PS 10: Messaging/Event Services, providing workflow automation-related middleware capabilities at the application layer) for this purpose.

In 1716, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer)) for this purpose.

In 1718, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if 5G core package 1502 does not pass, the activity is stopped and can either be revised and the sequence repeated to adjust the 5G core package 1502 until it passes DevOps verification or abandoned.

In 1720, for onboarding, the developer needs to create firewall package 1504 so system 110 renders (i.e., matches, dispatches, and configures) platform service 241 (PS 1: Data Services, providing configuration-related middleware capabilities at the application layer) which creates this template. System 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by firewall package 1504 for deployment, integration and configuration. In this case firewall package 1504 maps a configuration API to a public interface and generates model-based mappings of Firewall rules (whitelists, block-lists, traffic shapes) to system based policies so the capability can be service-chained in an automated fashion with other service elements. The remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model. Once a model for firewall package 1504 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system). System 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for firewall package 1504 is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail."

In 1722, if the DevOps plan passes, system 110 may publish firewall package 702 to the system catalog, so renders (i.e., matches, dispatches, and configures) platform service 250 (PS 10: Messaging/Event Services, providing workflow automation-related middleware capabilities at the application layer) for this purpose.

In 1724, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 1726, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if firewall package 1504 does not pass, the activity is stopped and can either be revised and the sequence repeated to adjust 5G core package 1502 until it passes DevOps verification or abandoned.

In 1728, for onboarding, the developer needs to create RAN RU/DU package 1506 so system 110 renders (i.e., matches, dispatches, and configures) platform service 241 (PS 1: Data Services, providing configuration-related middleware capabilities at the application layer) which creates this template. System 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by RAN RU/DU package 1506 for deployment, integration and configuration. In this case, RAN RU/DU package 1506 maps standard-based (3GPP) interfaces between the internal components, generates outgoing/incoming public interfaces via 3GPP, and maps hardware configuration rules to model-based policies to control connected radio equipment when instantiated. The remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model. Once a model for create RAN RU/DU package 1506 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system). System 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for create RAN RU/DU package 1506 is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail."

In 1730, if the DevOps plan passes, system 110 may publish firewall package 702 to the system catalog, so renders (i.e., matches, dispatches, and configures) platform service 250 (PS 10: Messaging/Event Services, providing workflow automation-related middleware capabilities at the application layer) for this purpose.

In 1732, system 110 may generate and push related security artifacts (certs, secrets, etc.) to any security repository 173, so renders (i.e., matches, dispatches, and configures) platform service 247 (PS 7: Orchestration Services, providing integration-related middleware capabilities at the infrastructure layer) for this purpose.

In 1734, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if create RAN RU/DU package 1506 does not pass, the activity is stopped and can either be revised and the sequence repeated to adjust 5G core package 1502 until it passes DevOps verification or abandoned.

In 1736, for onboarding, the developer needs to create RAN Core package 1508 so system 110 renders (i.e., matches, dispatches, and configures) platform service 241 (PS 1: Data Services, providing configuration-related middleware capabilities at the application layer) which creates this template. System 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by RAN Core package 1508 for deployment, integration and configuration. In this case, RAN Core package 1508 maps standard-based (3GPP) interfaces between the internal components of the core and generates outgoing/incoming public interfaces via 3GPP. The remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model. Once a model for create RAN RU/DU package 1506 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer)) allowing the upload of any images, which system 110 maps to an executable type (e.g., a container image is not only uploaded but also wrapped by a YAML configuration so it can be deployed as a pod in a container management system). System 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for create RAN Core package 1508 is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail."

In 1738, if the DevOps plan passes, system 110 may publish firewall package 702 to the system catalog, so renders (i.e., matches, dispatches, and configures) platform service 250 (PS 10: Messaging/Event Services, providing workflow automation-related middleware capabilities at the application layer) for this purpose.

In 1740, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 1742, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if create RAN Core package 1508 does not pass, the activity is stopped and can either be revised and the sequence repeated to adjust RAN Core package 1508 until it passes DevOps verification or abandoned.

In 1744, for onboarding, the developer needs to create IoT App package 1510 so system 110 renders (i.e., matches, dispatches, and configures) platform service 241 (PS 1: Data Services, providing configuration-related middleware capabilities at the application layer) which creates this template. System 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer)) for this purpose. The developer in this case uploads a CNFD, which system 110 maps to populate approximately 90% of the properties, behaviors, connections, operations and other details required by IoT App package 1510 for deployment, integration and configuration. In this case, IoT App package 1510 generates an outgoing/incoming public interface via HTTP and a command line based configuration interface via the Secure Shell Protocol ("SSH"). The remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model. Once a model for IoT App package 1510 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system). System 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

In 1746, if the DevOps plan passes, system 110 may publish IoT App package 1510 to the system catalog, so renders (i.e., matches, dispatches, and configures) platform service 250 (PS 10: Messaging/Event Services, providing workflow automation-related middleware capabilities at the application layer) for this purpose.

In 1748, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 1750, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the Infrastructure layer) for this purpose. Otherwise, if IoT App package 1510 does not pass, the activity is stopped and can either be revised and the sequence repeated to adjust the virtual probe package until it passes DevOps verification or abandoned.

Figure 18A:
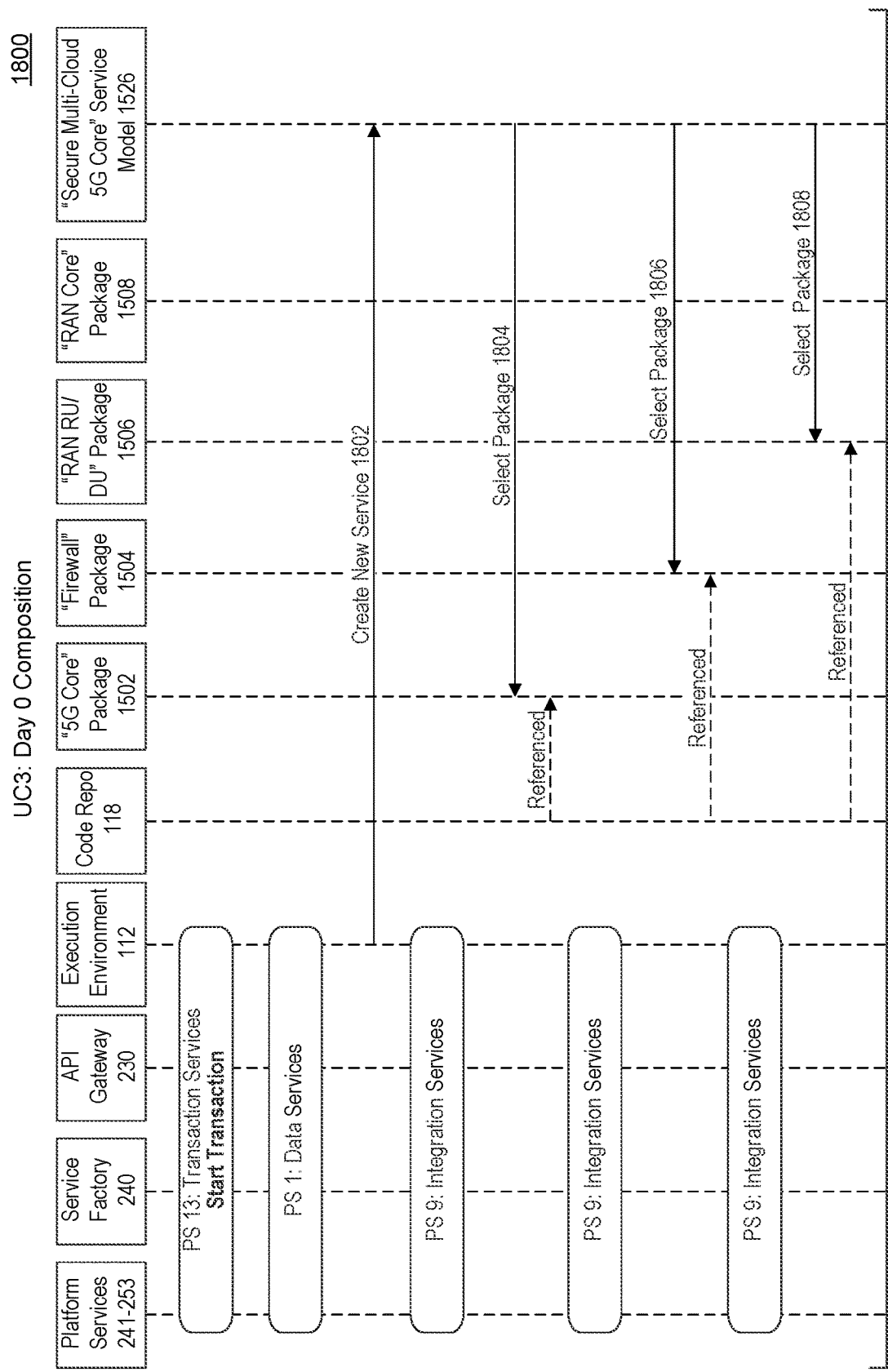
FIGS. 18A-18B are a sequence diagram illustrating a method of performing Day 0 composition in the use case for testing a secure, multi-cloud 5G network.
Figure 18B:
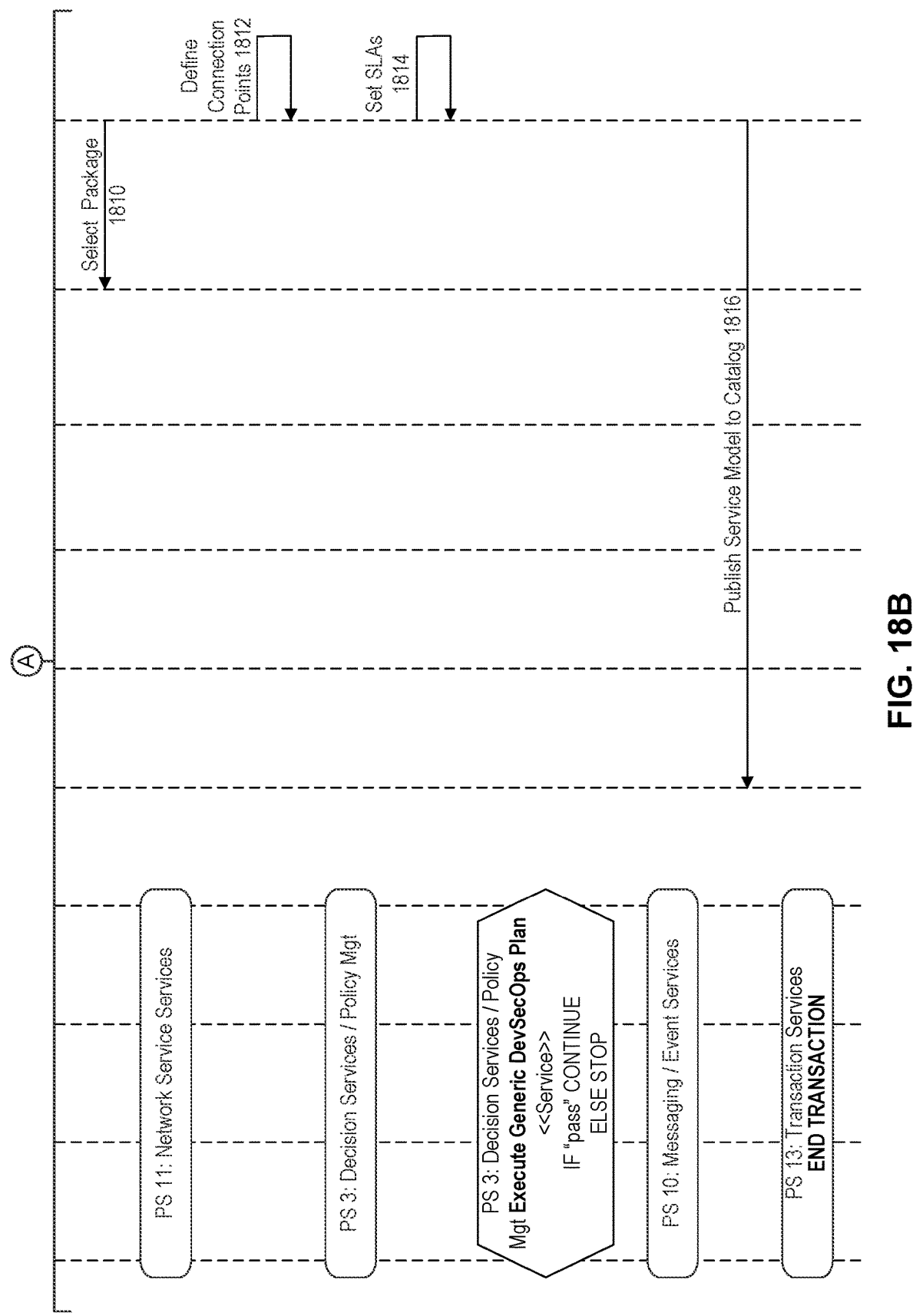

FIGS. 18A-18B are a sequence diagram illustrating a method 1800 of performing Day 0 composition in UC3 for testing a secure, multi-cloud 5G network, according to some embodiments. Method 1800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 18A-18B, as will be understood by a person of ordinary skill in the art(s).

Day 0 composition involves connecting the applications and any supporting services required by a secure, multi-cloud 5G network. Composition starts with system 110 opening up a transaction, so that all tasks can be rolled back/the infrastructure can be restored if there is a failure. All interactions of the system happen within a transaction. For this, system 110 renders (i.e., matches, dispatches, and configures) platform service 253 (PS 13: Transaction Services, providing Orchestration-related middleware capabilities), then upon opening the transaction creates an initial context required to carry out the sequence and creates a process token (or links to one if it already exists), to implement the transaction and allow the tasks in UC3 depicted to execute asynchronously.

In 1802, for composition, the service designer needs to create a new empty service model for secure multi-cloud 5G core 1526, so system 110 renders (i.e., matches, dispatches, and configures) platform service 241 (PS 1: Data Services, providing configuration-related middleware capabilities at the application layer) which creates this template.

In 1804, secure multi-cloud 5G core 1526 requires solution elements to be specified by the Service designer, so system 110 renders (i.e., matches, dispatches, and configures) platform service 249 (PS 9: Integration Services, providing configuration-related middleware capabilities at the application layer) which presents them with a catalog of valid application packages to select from. Since the service model is empty, the catalog initially presents a list of all packages. The user requires a 5G core package application, so selects it using service factory 240 (via a UI) binding an instance of 5G core package 1502 the secure multi-cloud 5G core 1526.

In 1806, the user requires firewall package 1504 application, so selects it using service factory 240 (via a UI) binding an instance of firewall package 1504 to the secure multi-cloud 5G core 1526.

In 1808, the user requires RAN RU/DU package 1506, so selects it using service factory 240 (via a UI) binding an instance of firewall package 702 to the secure multi-cloud 5G core 1526.

In 1808, the user requires RAN RU/DU package 1506, so selects it using service factory 240 (via a UI) binding an instance of RAN RU/DU package 1506 to the secure multi-cloud 5G core 1526.

In 1810, the user requires RAN core package 1508, so selects it using service factory 240 (via a UI) binding an instance of RAN core package 1508 to the secure multi-cloud 5G core 1526.

In 1812, when all application packages are bound to the service model, the service designer needs to define connection points (constraints between the application packages, and between the application packages and any supporting services), for this system 110 renders (i.e., matches, dispatches, and configures) platform service 251 (PS 11: Network Services providing configuration-related middleware capabilities at the application layer) which presents the service designer with: A) a UI which exposes application-to-application configurations (examples: service chaining, port/traffic routing, etc.); and B) a catalog of valid support services which can be connected and configured for the service.

In 1814, when all application packages are bound to the service model and connection points are defined, the service designer may set SLAs (policies and constraints to be enforced during the execution of the service), for this system 110 renders (i.e., matches, dispatches, and configures) platform service 243 (PS 3: Decision Services/Policy Mgt., providing workflow automation-related middleware capabilities at the application layer) which presents the service designer with a UI which for adding and configuring SLAs based on the metrics/telemetry available for the bound package models and any supplementary policies/metrics exposed by supporting services (e.g., QoS metrics captured by a third-party monitoring tool).

When the service model is complete, system 110 may verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Service>>", which creates an instance of the network service in a DMZ/Test environment, creates a test hardness, runs all tests verifying basic connectivity, execution, security and all SLAs specified by the model, and finally returns a response of "pass or fail."

In 1816, if the DevOps plan passes, system 110 may publish the service model to the system catalog, so renders (i.e., matches, dispatches, and configures) platform service 251 (PS 10: Messaging/Event Services, providing configuration-related middleware capabilities at the application layer) for this purpose. Otherwise, if secure multi-cloud IMS 712 does not pass, the activity is stopped and can either be revised and the sequence repeated to adjust secure multi-cloud 5G core 1526 until it "passes" DevOps verification or abandoned.

Composition ends with system 110 closing the transaction via rendered (i.e., matched, dispatched and configured) platform service 253 (PS 13: Transaction Services, providing orchestration-related middleware capabilities), and at this point "committing" any/all objects.

After successful completion, the network service is in the catalog and ready to be instantiated, for example by performing Day 1 Deployment, Integration, and Configuration.

Use Case 4: Optimized, Secure 5G RAN

Use-case 4 ("UC4") is the testing of an optimized, secure 5G RAN. Users on mobile devices use a virtual private network ("VPN") client to connect to a 5G edge node which provides optimized, private, secure traffic (Secure Access Service Edge). The end-to-end network is deployed and optimized as part of UC4, and assured both in terms of SLAs and security. FIGS. 19-22 describe UC4. UC4 allows a communication service provider to offer an optimized VPN service allowing customers secured access to all of their "core services" (e.g., secure business systems like content management, human resources management, etc.) delivered directly to their phones or other devices via a RAN (4G or 5G) with QoS guarantees.

Figure 19A:
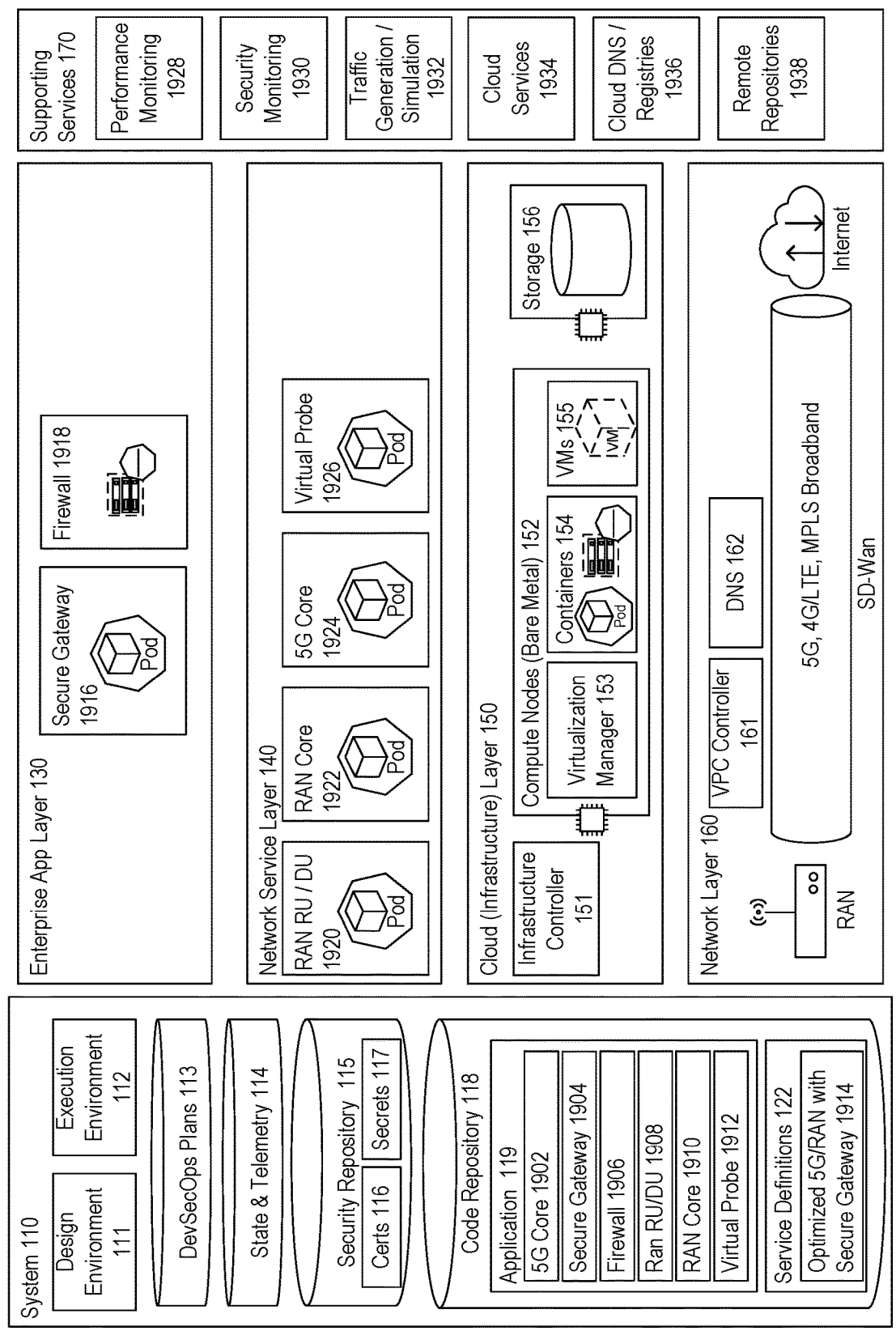
FIG. 19A is a block diagram of an architecture for testing an optimized, secure 5G RAN.

FIG. 19A is a block diagram of an architecture 1900A for testing an optimized, secure 5G RAN. Architecture 1900A may include the components described above with reference to FIG. 1A. Additionally, architecture 1900A may include 5G core package 1902, secure gateway package 1904, firewall package 1906, RAN RU/DU package 1908, RAN core package 1910, virtual probe package 1912, optimized 5G/RAN 1914, secure gateway 1916, firewall 1918, RAN RU/DU 1920, RAN core 1922, 5G core 1924, virtual probe 1926, performance monitoring components 1928, security monitoring 1930, traffic generation 1932, cloud services 1934, cloud DNS 1936, and remote repositories 1938.

The core service for UC4 is "Optimized 5G/RAN with Secure Gateway." Service definitions 122 and application packages 119 are found in code repository 118 in system 110.

In network layer 160, a VPC is implemented via VPC controller 161 with DNS 162.

In cloud layer 150, infrastructure controller 151 provides an interface to compute nodes 152 for each site involved in UC4 and to storage 156. Compute nodes 152 have virtualization manager 153 present to support the execution of container-based applications (containers 154) and virtual machine based applications that run on virtual machines 155. Also, compute nodes 152 provide a programming interface for their hardware (NIC—Network Interface Controllers) so that they can be optimized for the applications running on them.

In network service layer 140, the core-network service consists of a RAN RU/DU 1920, RAN core 1922, and 5G core 1924, which together provide the end-to-end 5G connectivity for connected devices. Virtual probe 1926 is also deployed for monitoring. All components are running over containers on the compute nodes. Application packages 119 for each component are found in code repository 118.

In enterprise application layer 130, secure gateway 1914 is deployed as a container, and firewall 1918 is deployed as a VM over containers, both on the Edge Compute node. Application packages 119 for each component are found in code repository 118.

Supporting services 170 for UC4 include performance monitoring components 1928, security monitoring 1930, traffic generation 1932, cloud services 1934 for service account creation, a cloud DNS/Registry 1936, and remote repositories 1938 (for images).

FIG. 19B is a table 1900B indicating Day 0 tasks performed across stages and layers in UC4 involving an optimized, secure 5G RAN, according to some embodiments.

Columns 1902B illustrate possible stages of a DevOps process for UC4 involving an optimized, secure 5G RAN. For example, columns 1902B may include stages for establishing a DMZ, deployment, configuration, and verification. Each stage in columns 1902B may involve performing Day 0 tasks relevant to the optimized, secure 5G RAN and to that stage.

Rows 1904B illustrate several layers in an architecture where relevant Day 0 tasks are performed. For example, rows 1904B may include an application layer, an infrastructure layer, and an network layer.

Cells 1906C illustrate indicative Day 0 tasks that are performed at each layer and stage (reflected by columns 1902C and rows 1904C) that are applicable to the optimized, secure 5G RAN. Each task typically requires one or more operations, which are performed by platform services 241-253. The table below reflects particular platform services among platform services 241-253 that may be engaged by system 110 to perform the tasks in cells 1906C:

| Task | Platform Services Engaged |
|---|---|
| Assign placement of xNF components to Core or Edge | PS 13 Transaction Services, PS 12 Security & Identity, PS 2 Domain Services, PS 3 Decision Services (Network), PS 3 Decision Services (Application), PS 3 Decision Services (Infrastructure), PS 9 Integration (Network), PS 9 Integration (Service) |
| Transfer Firewall VM Image to Repo | PS 13 Transaction Services, PS 12 Security & Identity, PS 2 Domain Services, PS 3 Decision Services (Application), PS 12 Connection (Infrastructure), PS 5 Workflow Automation (Infrastructure) |
| Create Subnets | PS 13 Transaction Services, PS 12 Security & Identity, PS 2 Domain Services, PS 3 Decision Services (Network), PS 9 Integration (Network), PS 6 Configuration (Activation), PS 6 Configuration (Network) |
| Deploy VM over Pods for Firewall at Edge | PS 13 Transaction Services, PS 12 Security & Identity, PS 2 Domain Services, PS 3 Decision Services (Application), PS 6 Configuration (Infrastructure), PS 7 Orchestration (Activation) |
| Connect Storage to Application Firewall VM | PS 13 Transaction Services, PS 12 Security & Identity, PS 2 Domain Services, PS 9 Integration (Data), PS 3 Decision Services (Network), PS 9 Integration (Data), PS 9 Integration (Infrastructure), PS 9 Configuration (Infrastructure) |
| Configure Ingress and Egress Rules for Network to Support Firewall | PS 13 Transaction Services, PS 12 Security & Identity, PS 2 Domain Services, PS 3 Decision Services (Network), PS 9 Integration (Application), PS 6 Configuration (Application), PS 9 Integration (Infrastructure), PS 9 Integration (Infrastructure) |
| Calculate Firewall White & Block Lists | PS 13 Transaction Services, PS 12 Security & Identity, PS 2 Domain Services, PS 3 Decision Services (Application), PS 9 Integration (Network), PS 6 Configuration (Network), PS 9 Integration (Application) |

| Task | Platform Services Engaged |
|---|---|
| Apply Hardware Optimizations | PS 13 Transaction Services, PS 12 Security & Identity, PS 2 Domain Services, PS 3 Decision Services (Network), PS 9 Integration (Network), PS 9 Integration (Application), PS 3 Integration (Infrastructure), PS 6 Configuration (Infrastructure) |
| Configure Service-Chain from Firewall to Ingress | PS 13 Transaction Services, PS 12 Security & Identity, PS 2 Domain Services, PS 3 Decision Services (Network), PS 9 Integration (Network), PS 6 Configuration (Infrastructure), PS 9 Integration (Service), PS 9 Integration (Infrastructure) |
| Initiate Simulated Traffic | PS 13 Transaction Services, PS 12 Security & Identity, PS 2 Domain Services, PS 3 Decision Services (Application), PS 12 Connection (Application), PS 7 Orchestration (Service) |
| Remove Hardware Optimizations (after tests complete) | PS 13 Transaction Services, PS 12 Security & Identity, PS 2 Domain Services, PS 3 Decision Services (Network), PS 3 Decision Services (Application), PS 3 Decision Services (Infrastructure), PS 6 Configuration (Infrastructure) |
| Remove Subnets (after tests complete) | PS 13 Transaction Services, PS 12 Security & Identity, PS 2 Domain Services, PS 3 Decision Services (Network), PS 9 Integration (Network), PS 6 Configuration (Activation), PS 6 Configuration Network) |

System 110 dynamically matches, dispatches, configures, and coordinates these platform services to perform these tasks. These tasks are further detailed in the sequence diagrams included below.

Figure 20:
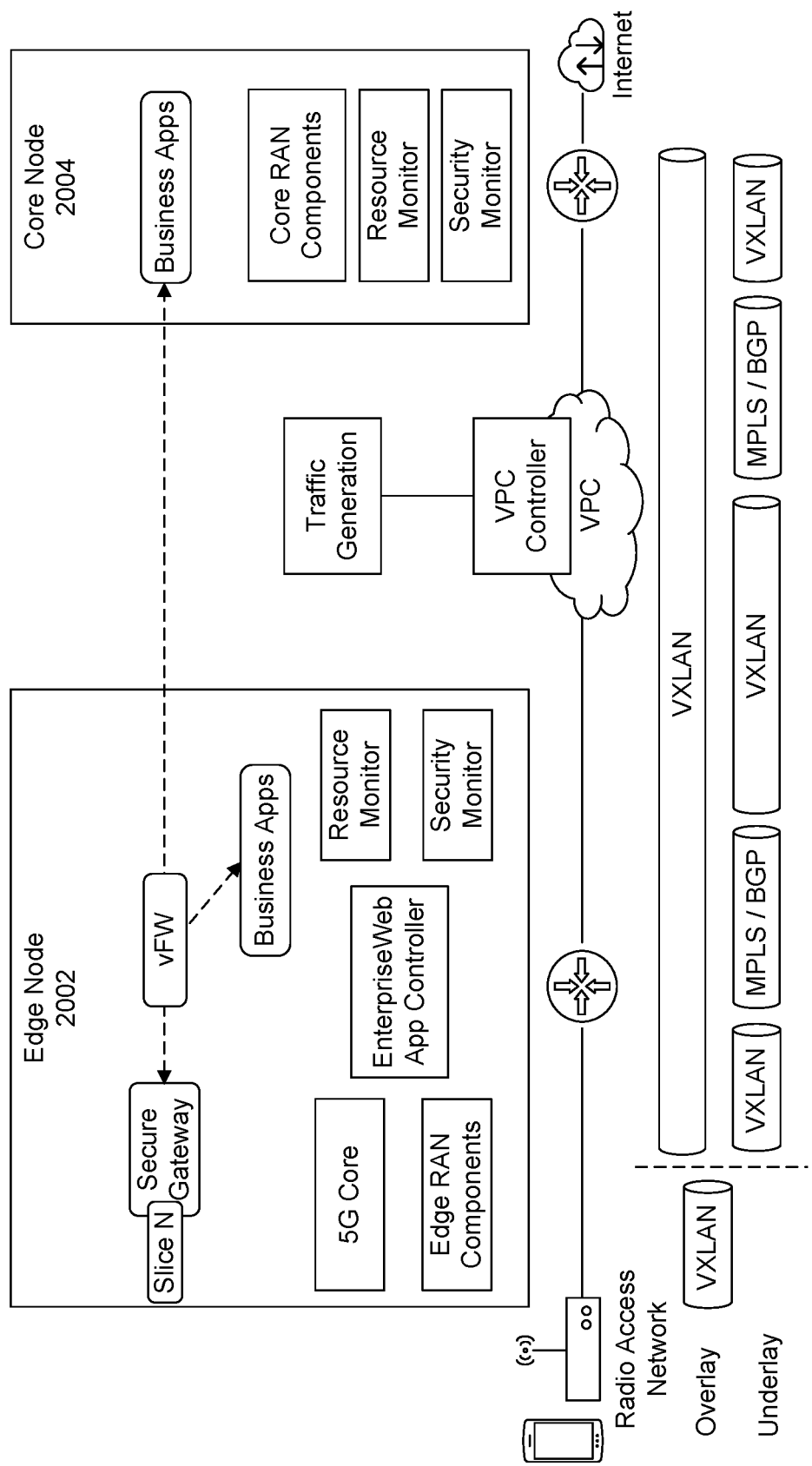
FIG. 20 is a network service diagram for a use case for testing an optimized, secure 5G RAN.
Figure 21A:
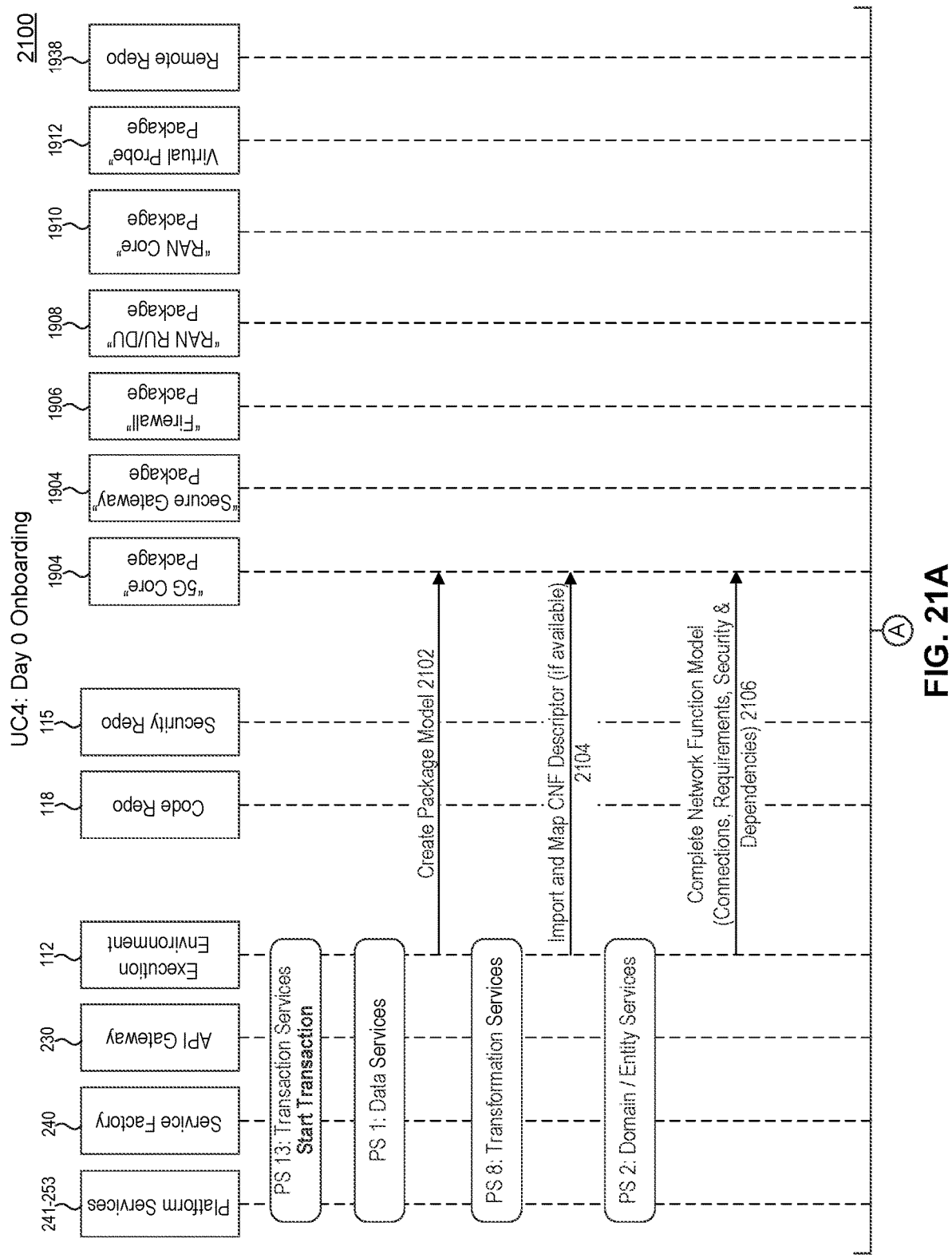
FIGS. 21A-21I are a sequence diagram illustrating a Day 0 onboarding method performed in the use case for testing an optimized, secure 5G RAN.
Figure 21B:
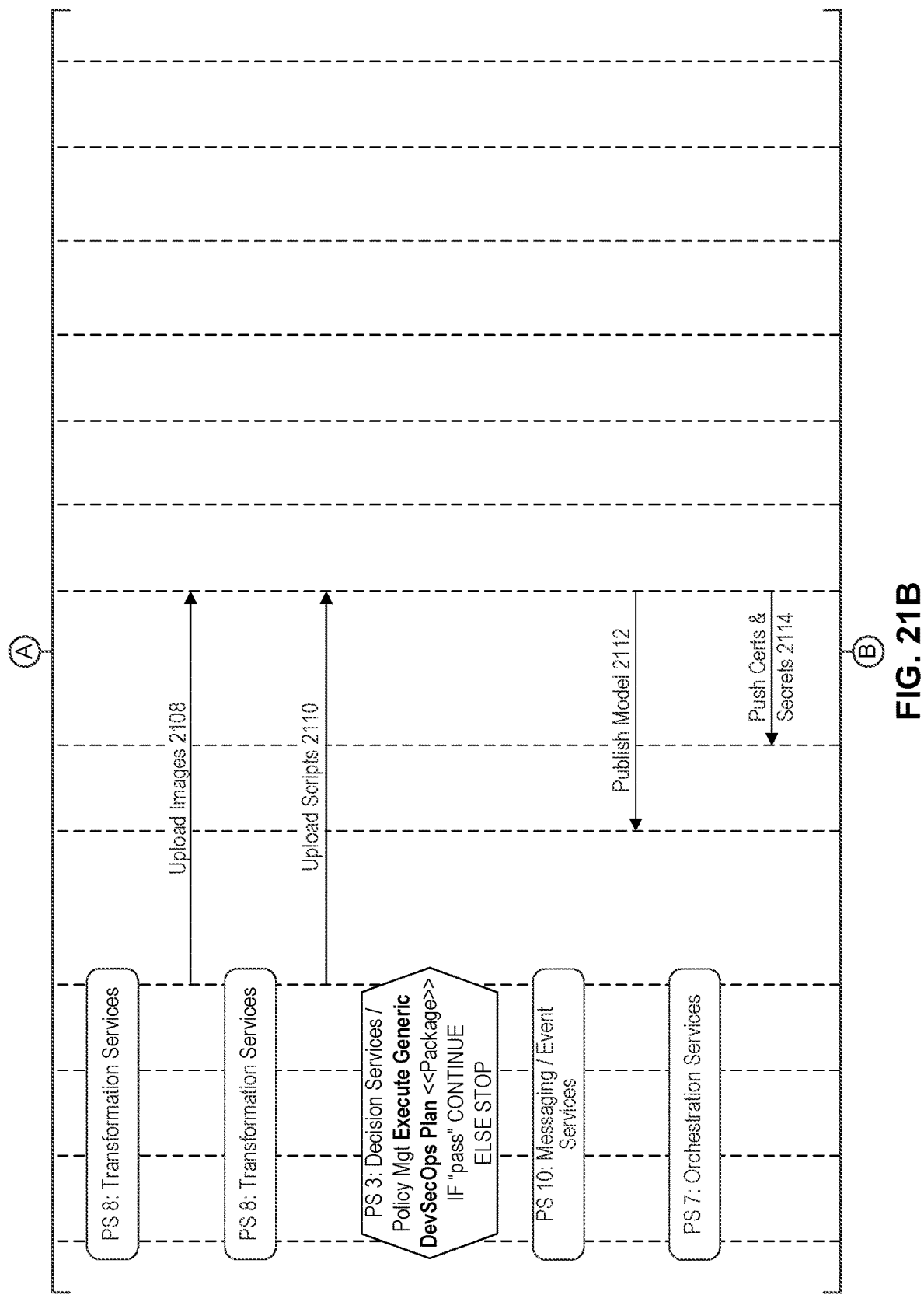
Figure 21C:
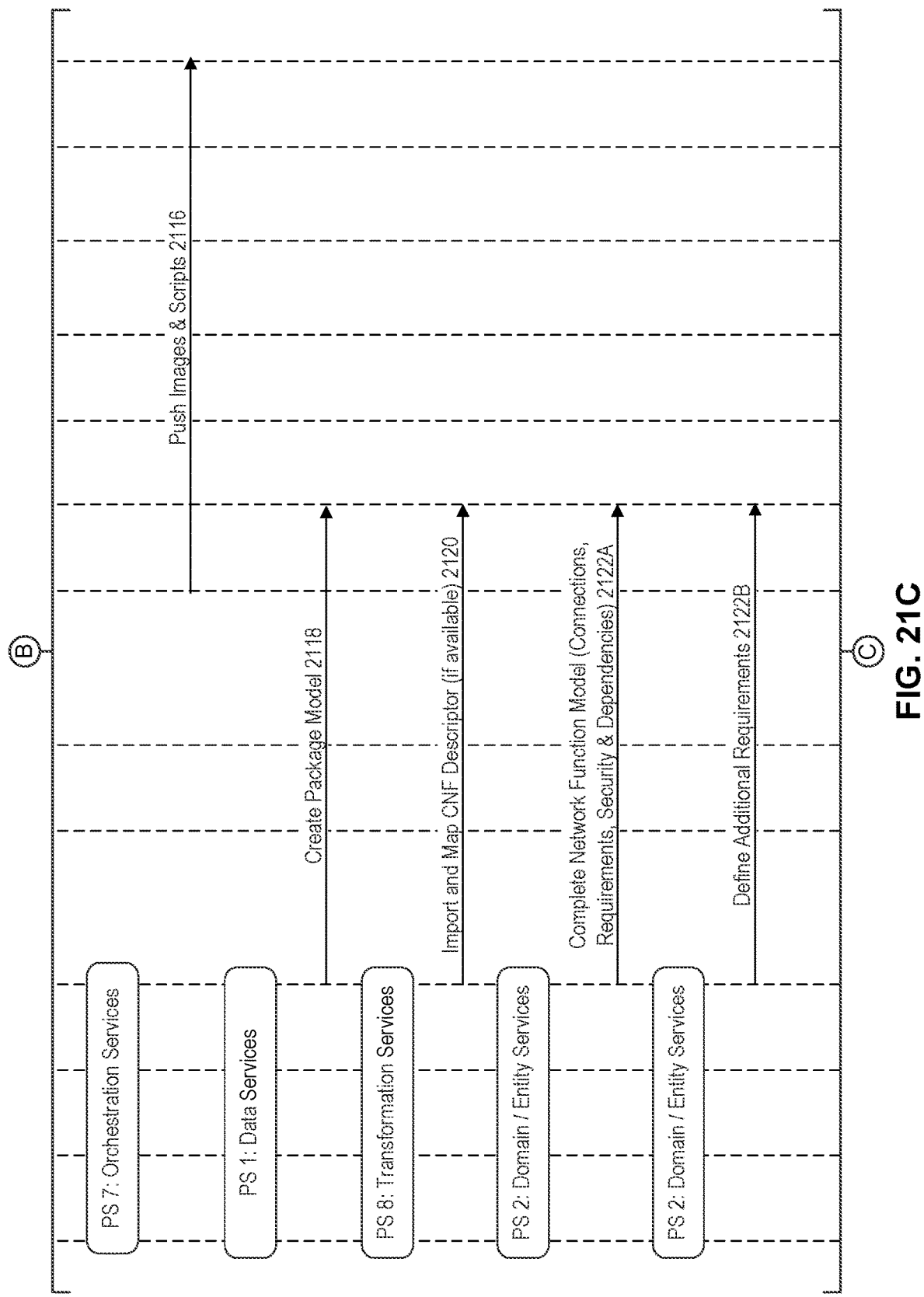
Figure 21D:
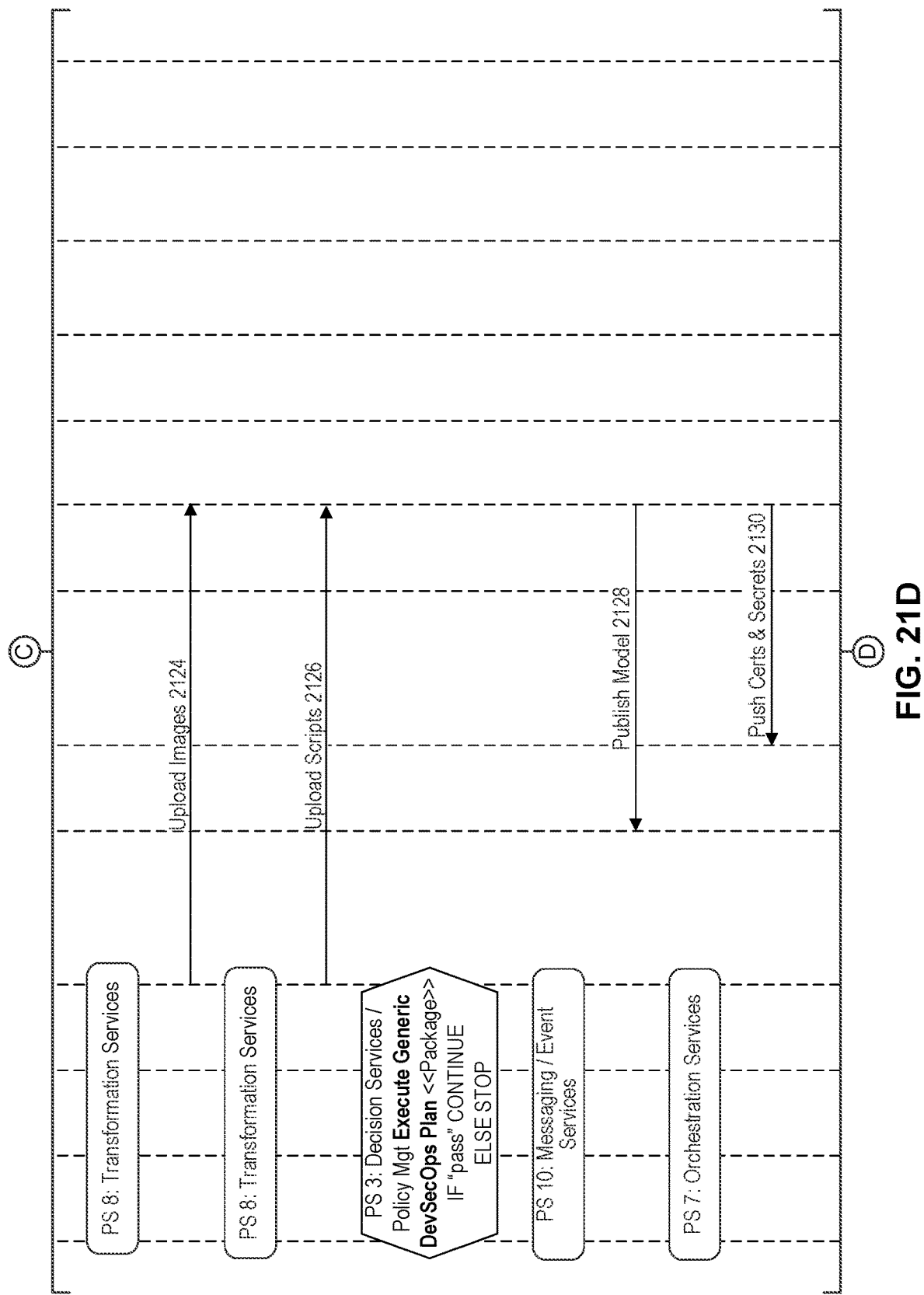
Figure 21E:
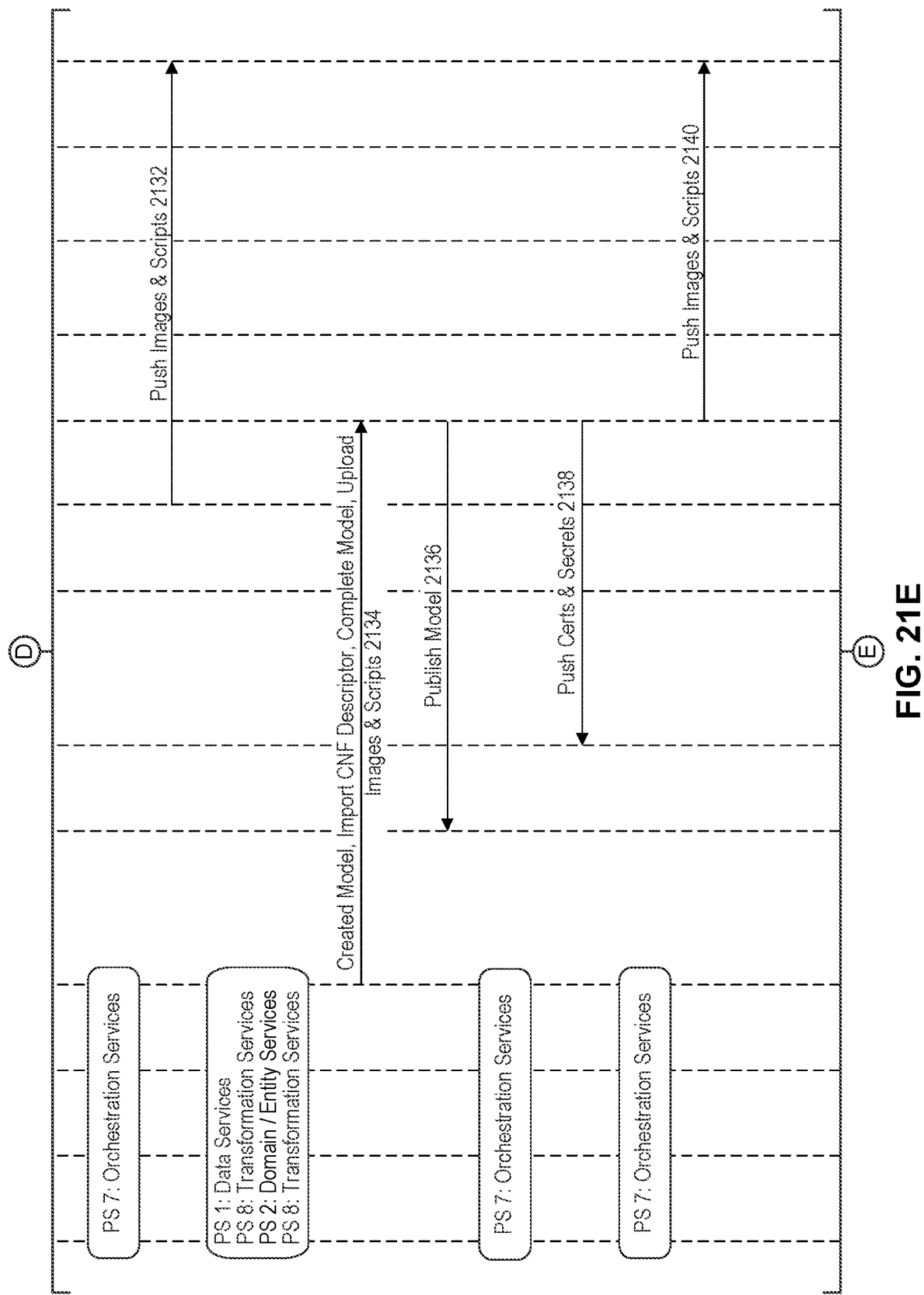
Figure 21F:
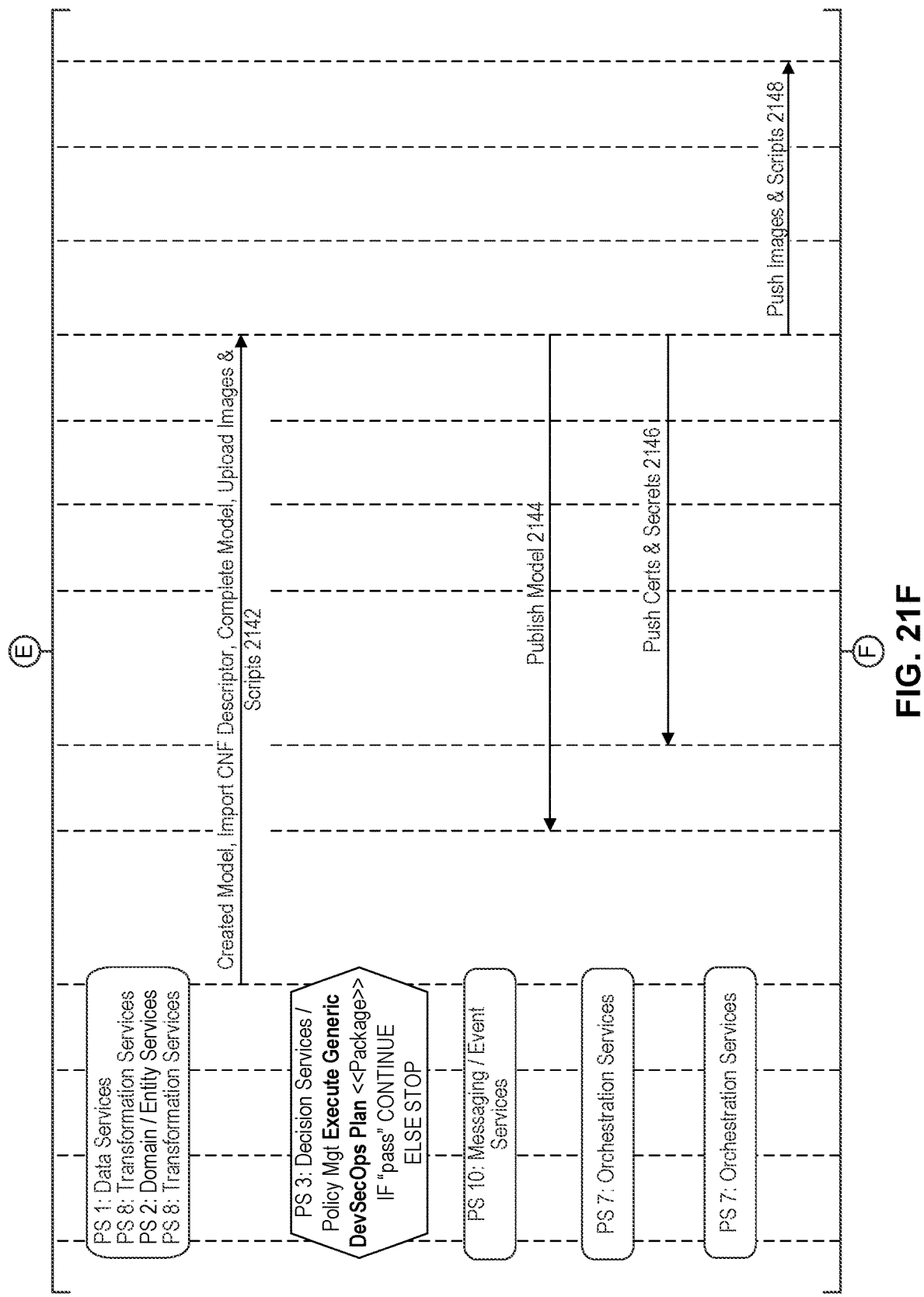
Figure 21G:
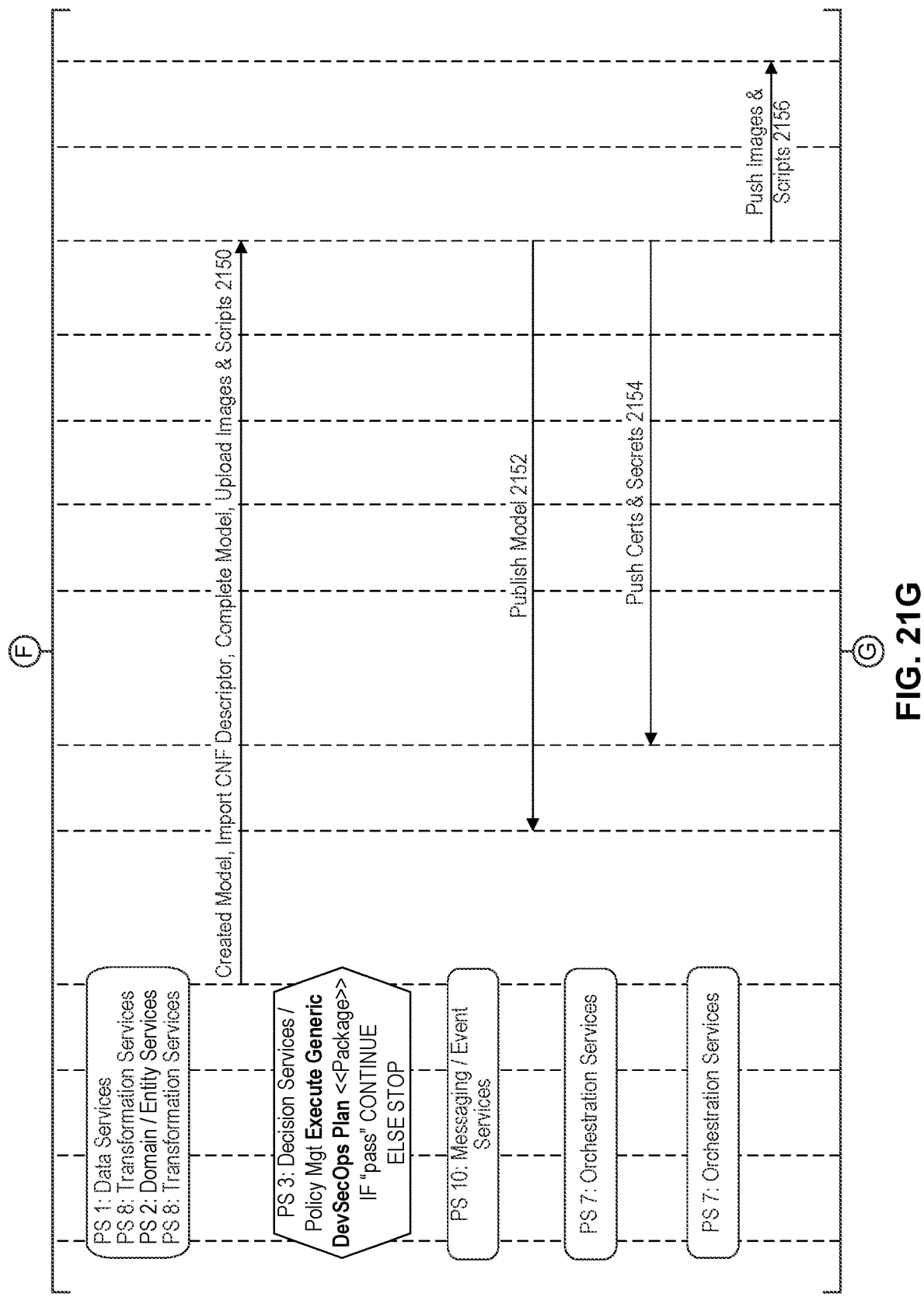
Figure 21H:
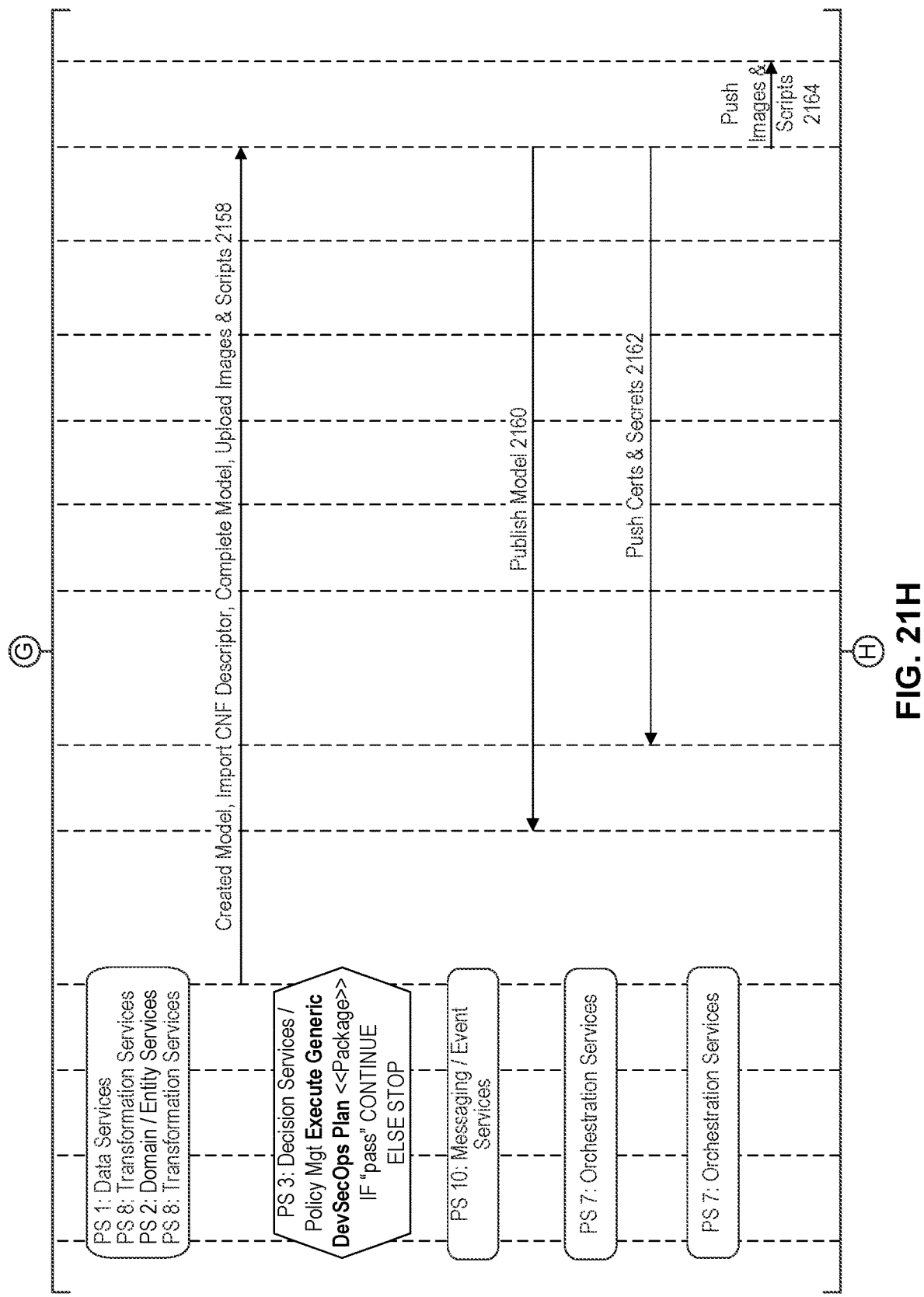
Figure 21I:
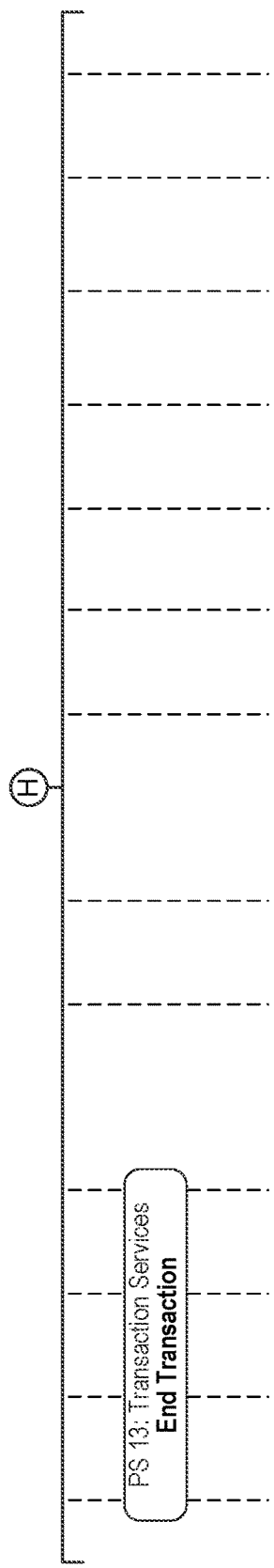

FIG. 20 is a network service diagram of network service 2000 for UC4 for testing an optimized, secure 5G RAN. Network service 2000 may include edge node 2002 and core node 2004.

UC4 is implemented across two nodes (edge node 2002 and core node 2004), connected via a VPC (SD-WAN) network and connected switches. Edge node 2002 is also connected to a RAN, and core node 2004 is also connected to the Internet. The VPC is implemented by a standard set of overlay and underlay protocols.

Edge node 2002 has containers/pods for the 5G core and edge RAN components, a VM over containers for the vFW to deliver shared base functionality across all 5G slices, containers/pods per 5G slice for the Secure Gateway itself, containers/pods for probes that act as resource and security monitors, and containers/pods for system 110 deployed as an application controller to execute UC4. Optionally, other business application could be deployed at the edge.

Core node 2004 has containers/pods for the core RAN components; and containers/pods for probes that act as resource and security monitors. Optionally, other business applications could be deployed at the core.

A traffic generator is connected independently via the VPC for testing purposes.

Each sequence diagram (e.g., FIGS. 21-22) is organized the same. System 110's components for platform services 241-253, service factory 240, and API gateway 230, which together are responsible for execution are shown to the left. Each system interaction includes a note indicating which platform service in platform services 241-253 is rendered (i.e., matched, dispatched, configured) to deliver the task. The right side shows the resulting interaction (i.e., coordination) with the system's actors.

Day 0 Onboarding and Service Composition for UC4

Day 0 onboarding involves a developer modeling application packages for each solution element to be deployed, integrated and configured in the implementation of the overall network service model. This is not development of the application(s), this the creation of models for utilizing developed code compiled into a container/VM image, binary, scripts or some other set of artifacts which carry out the execution, which were developed outside the context of the system.

FIGS. 21A-21I are a sequence diagram illustrating a Day 0 onboarding method 2100 performed in UC4 for testing an optimized, secure 5G RAN. Method 2100 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 21A-21G, as will be understood by a person of ordinary skill in the art(s).

Day 0 onboarding involves provisioning the network, storage and compute resources, and deploying all applications required by a secure, 5G RAN for voice. Onboarding starts with system 110 opening up a transaction, so that all tasks can be rolled back/the infrastructure can be restored if there is a failure. All interactions of the system happen within a transaction. For this, system 110 renders (i.e., matches, dispatches, and configures) platform service 253 (PS 13: Transaction Services, providing orchestration-related middleware capabilities), then upon opening the transaction creates an initial context required to carry out the sequence and creates a process token (or links to one if it already exists), to implement the transaction and allow the tasks in UC4 depicted to execute asynchronously.

In 2102, the developer needs to create a new empty package model for the first solution element, 5G core package 1902, so system 110 renders (i.e., matches, dispatches, and configures) platform service 241 (PS 1: Data Services, providing configuration-related middleware capabilities at the application layer) which creates this template.

In 2104, to populate 5G core package 1902, system 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by 5G core package 1902 for deployment, integration and configuration. In this case, 5G core package 1902 maps standard-based (3GPP) interfaces between the internal components of the core, outgoing/incoming public interfaces via 3GPP, and network level (SDN) rules to model-based policies to control the internal behavior of the underlying networks when instantiated.

In 2106, the remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model.

In 2108, once a model for 5G core package 1902 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system).

In 2110, system 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for 5G core package 1902 is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail." In 2112, if the DevOps plan passes, system 110 may publish 5G core package 1902 to the system catalog, so renders (i.e., matches, dispatches, and configures) platform service 250 (PS 10: Messaging/Event Services, providing orchestration-related middleware capabilities at the infrastructure layer) for this purpose.

In 2114, system 110 may generate and push related security artifacts (certs, secrets, etc.) to any security repository, so renders (i.e., matches, dispatches, and configures) platform service 247 (PS 7: Orchestration Services, providing orchestration-related middleware capabilities at the infrastructure layer) for this purpose.

In 2116, system 110 may push uploaded artifacts (images, scripts, etc.) to remote repository 171 (from which they will be deployed), so renders (i.e., matches, dispatches, and configures) platform service 247 (PS 7: Orchestration Services, providing configuration-related middleware capabilities at the application layer) for this purpose. Otherwise, if EPC package 1104 does not pass, the activity is stopped and can either be revised and the sequence repeated to adjust the EPC package 704 until it passes DevOps verification or abandoned.

In 2118, for onboarding, the developer needs to create a new secure gateway package 1904 so system 110 renders (i.e., matches, dispatches, and configures) platform service 241 (PS 1: Data Services, providing configuration-related middleware capabilities at the application layer) which creates this template.

In 2120, to populate secure gateway package 1904, system 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by secure gateway package 1904 for deployment, integration and configuration. In this case, secure gateway package 1904 maps a configuration API to a public interface and generates model-based mappings of gateway rules (port maps, security protocols, white-lists, block-lists, traffic shapes) to system based policies so the capability can be service-chained in an automated fashion with other service elements and exposed as a gateway for securing the service at large.

In 2122A-B, the remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model.

In 2124, once a model for secure gateway package 1904 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system).

In 2126, system 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for secure gateway package 1904 is complete, system 110 needs to verify it before adding to the catalog, so renders (i.e., matches, dispatches, and configures) platform service 243 (PS 3: Decision Services/Policy Mgt., providing workflow Automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail." In 2128, if the DevOps plan passes, system 110 may publish secure gateway package 1904 to the system catalog, so renders (i.e., matches, dispatches, and configures) platform service 250 (PS 10: Messaging/Event Services, providing orchestration-related middleware capabilities at the infrastructure layer) for this purpose.

In 2130, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 2132, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if secure gateway package 1904 does not pass, the activity is stopped and can either be revised and the sequence repeated to adjust the secure gateway package 1904 until it passes DevOps verification or abandoned.

In 2134, for onboarding, the developer needs to create firewall package 1906 so system 110 renders (i.e., matches, dispatches, and configures) platform service 241 (PS 1: Data Services, providing configuration-related middleware capabilities at the application layer) which creates this template. System 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by firewall package 1906 for deployment, integration and configuration. In this case, firewall package 1906 maps a configuration API to a public interface and generates model-based mappings of Firewall rules (whitelists, block-lists, traffic shapes) to system based policies so the capability can be service-chained in an automated fashion with other service elements. The remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model. Once a model for firewall package 1906 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer)) allowing the upload of any images, which system 110 system 110 maps to an executable type (e.g., a container image is not only uploaded but also wrapped by a YAML configuration so it can be deployed as a pod in a container management system). System 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for firewall package 1906 is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail."

In 2136, if the DevOps plan passes, system 110 may publish firewall package 1906 to the system catalog, so renders (i.e., matches, dispatches, and configures) platform service 250 (PS 10: Messaging/Event Services, providing workflow automation-related middleware capabilities at the application layer) for this purpose.

In 2138, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 2140, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if firewall package 1906 does not pass, the activity is stopped and can either be revised and the sequence repeated to adjust the firewall package 1906 until it passes DevOps verification or abandoned.

In 2142, for onboarding, the developer needs to create RAN RU/DU package 1908 so system 110 renders (i.e., matches, dispatches, and configures) platform service 241 (PS 1: Data Services, providing configuration-related middleware capabilities at the application layer) which creates this template. System 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by RAN RU/DU package 1908 for deployment, integration and configuration. In this case, RAN RU/DU package 1908 maps standard-based (3GPP) interfaces between the internal components, generates outgoing/incoming public interfaces via 3GPP, and maps hardware configuration rules to model-based policies to control connected radio equipment when instantiated. The remainder of the package model including other connections, requirements, security and dependencies must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model. Once a model for RAN RU/DU package 1908 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system). System 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for RAN RU/DU package 1908 is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail."

In 2144, if the DevOps plan passes, system 110 may publish RAN RU/DU package 1908 to the system catalog, so renders (i.e., matches, dispatches, and configures) platform service 250 (PS 10: Messaging/Event Services, providing workflow automation-related middleware capabilities at the application layer) for this purpose.

In 2146, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 2148, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if RAN RU/DU package 1908 does not pass, the activity is stopped and can either be revised and the sequence repeated to adjust the RAN RU/DU package 1908 until it passes DevOps verification or abandoned.

In 2150, for onboarding, the developer needs to create RAN core package 1910 so system 110 renders (i.e., matches, dispatches, and configures) platform service 241 (PS 1: Data Services, providing configuration-related middleware capabilities at the application layer) which creates this template. System 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by RAN core package 1910 for deployment, integration and configuration. In this case, RAN core package 1910 maps standard-based (3GPP) interfaces between the internal components of the core and generates outgoing/incoming public interfaces via 3GPP. The remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model. Once a model for RAN core package 1910 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer) allowing the upload of any images, which system 110 maps to an executable type (e.g., a container image is not only uploaded but also wrapped by a YAML configuration so it can be deployed as a pod in a container management system). System 110 system renders (i.e., matches, dispatches, and configures) platform service 248 (PS 8: Transformation Services, providing configuration-related middleware capabilities at the application layer) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for RAN core package 1910 is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail."

In 2152, if the DevOps plan passes, system 110 may publish RAN core package 1910 to the system catalog, so renders (i.e., matches, dispatches, and configures) platform service 250 (PS 10: Messaging/Event Services, providing workflow automation-related middleware capabilities at the application layer) for this purpose.

In 2154, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 2156, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if RAN core package 1910 does not pass, the activity is stopped and can either be revised and the sequence repeated to adjust the RAN core package 1910 until it passes DevOps verification or abandoned.

In 2158, for onboarding, the developer needs to create virtual probe package 1912 so system 110 renders (i.e., matches, dispatches, and configures) platform service 241 (PS 1: Data Services, providing configuration-related middleware capabilities at the application layer) which creates this template. System 110 presents the developer with the capability to import and map any existing descriptors (third-party artifacts such as CNFDs and YAML configuration files) to accelerate the onboarding process, and so renders (i.e., matches, dispatches, and configures) platform service 248 (PS 8: Transformation Services, providing configuration-related middleware capabilities at the application layer) for this purpose. The developer in this case uploads a CNFD, which system 110 maps to populate approximately 90% of the properties, behaviors, connections, operations and other details required by virtual probe package 1912 for deployment, integration and configuration. In this case, virtual probe package 1912 generates a model-based workflow for registering the probe with a centralized management controller. The remainder of the package model (other connections, requirements, security and dependencies) must be specified explicitly by the developer, so system 110 renders (i.e., matches, dispatches, and configures) platform service 242 (PS 2: Domain/Entity Services, providing configuration-related middleware capabilities at the application layer) for this purpose, providing a UI to guide them through completion of the model. Once a model for virtual probe package 1912 is complete, the developer must upload the artifacts (i.e., executables) required to deliver the application. System 110 renders (i.e., matches, dispatches, and configures) platform service 248 (PS 8: Transformation Services, providing configuration-related middleware capabilities at the application layer)) allowing the upload of any images, which system 110 maps to an executable type (e.g., a container image is not only uploaded but also wrapped by a YAML configuration so it can be deployed as a pod in a container management system). System 110 system renders (i.e., matches, dispatches, and configures) platform service 248 (PS 8: Transformation Services, providing configuration-related middleware capabilities at the application layer)) allowing the upload of any scripts, which system 110 maps to an executable type (e.g., an ANSIBLE playbook required in the deployment of the software may require a specific runtime agent, which system 110 will bind to the model as a dependency and ensure is present/deployed when instantiating the package).

When the model for virtual probe package 1912 is complete, system 110 needs to verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Package>>", which creates an instance of the application in a DMZ/Test environment, creates a test hardness, runs all tests verifying basic connectivity, execution, security and all requirements specified by the model, and finally returns a response of "pass or fail."

In 2160, if the DevOps plan passes, system 110 may publish virtual probe package 1912 to the system catalog, so renders (i.e., matches, dispatches, and configures) platform service 250 (PS 10: Messaging/Event Services, providing workflow automation-related middleware capabilities at the application layer)) for this purpose.

In 2162, system 110 may generate and push related security artifacts (certs, secrets, etc.) to any security repository, so renders (i.e., matches, dispatches, and configures) platform service 247 (PS 7: Orchestration Services, providing integration-related middleware capabilities at the infrastructure layer) for this purpose.

In 2164, system 110 may push uploaded artifacts (images, scripts, etc.) to remote repository 171 (from which they will be deployed), so renders (i.e., matches, dispatches, and configures) platform service 247 (PS 7: Orchestration Services, providing integration-related middleware capabilities at the infrastructure layer) for this purpose. Otherwise, if virtual probe package 1912 does not pass, the activity is stopped and can either be revised and the sequence repeated to adjust the virtual probe package 1912 until it passes DevOps verification or abandoned.

After all packages have been onboarded, onboarding ends with system 110 closing the transaction via rendered (i.e., matched, dispatched and configured) platform service 253 (PS 13: Transaction Services, providing orchestration-related middleware capabilities), and at this point "committing" any/all objects. After successful completion, the solution elements are all present in the catalog, and the network service can be composed.

Figure 22A:
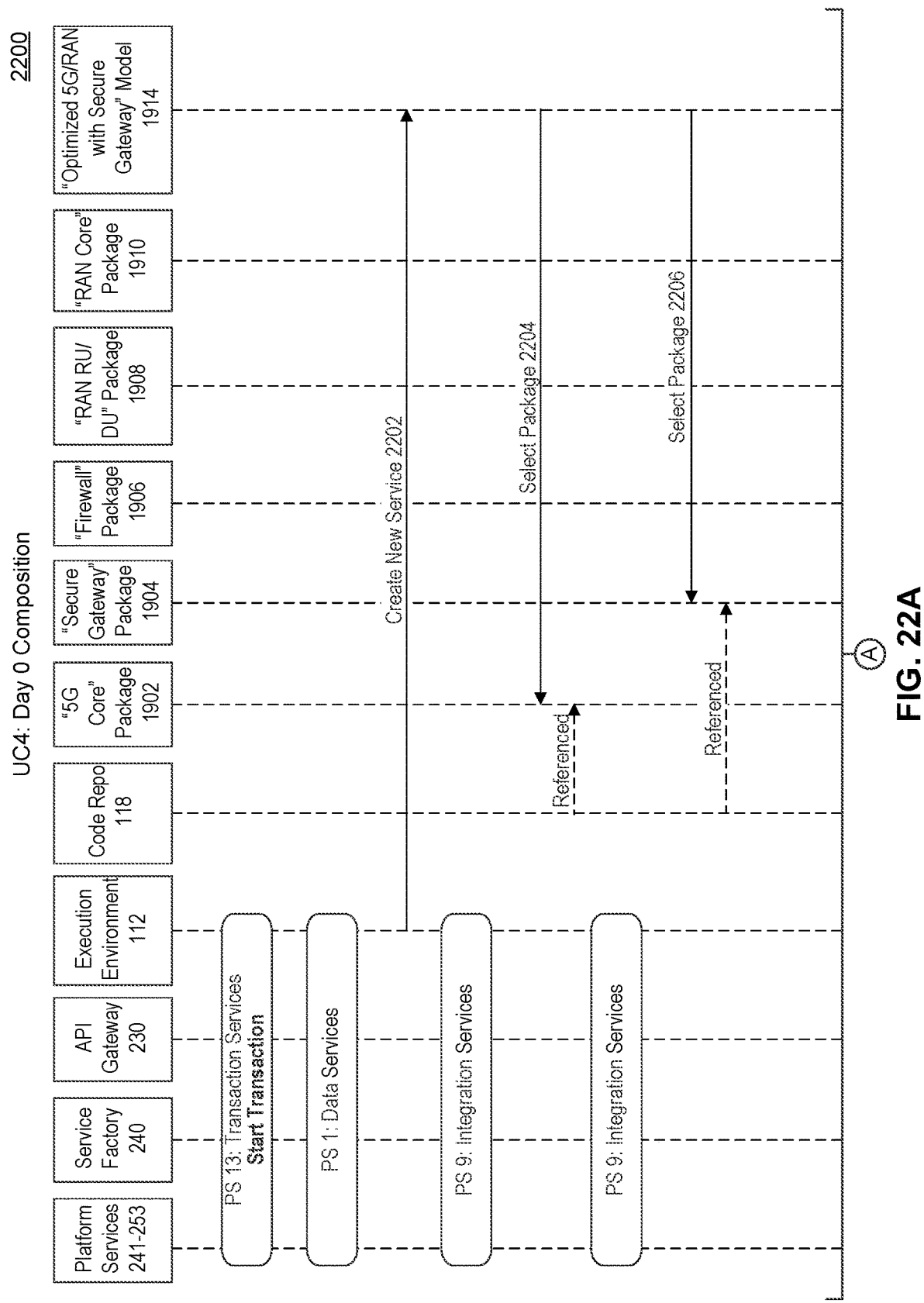
FIGS. 22A-22C are a sequence diagram illustrating a Day 0 composition method performed in the use case for testing an optimized, secure 5G RAN.
Figure 22B:
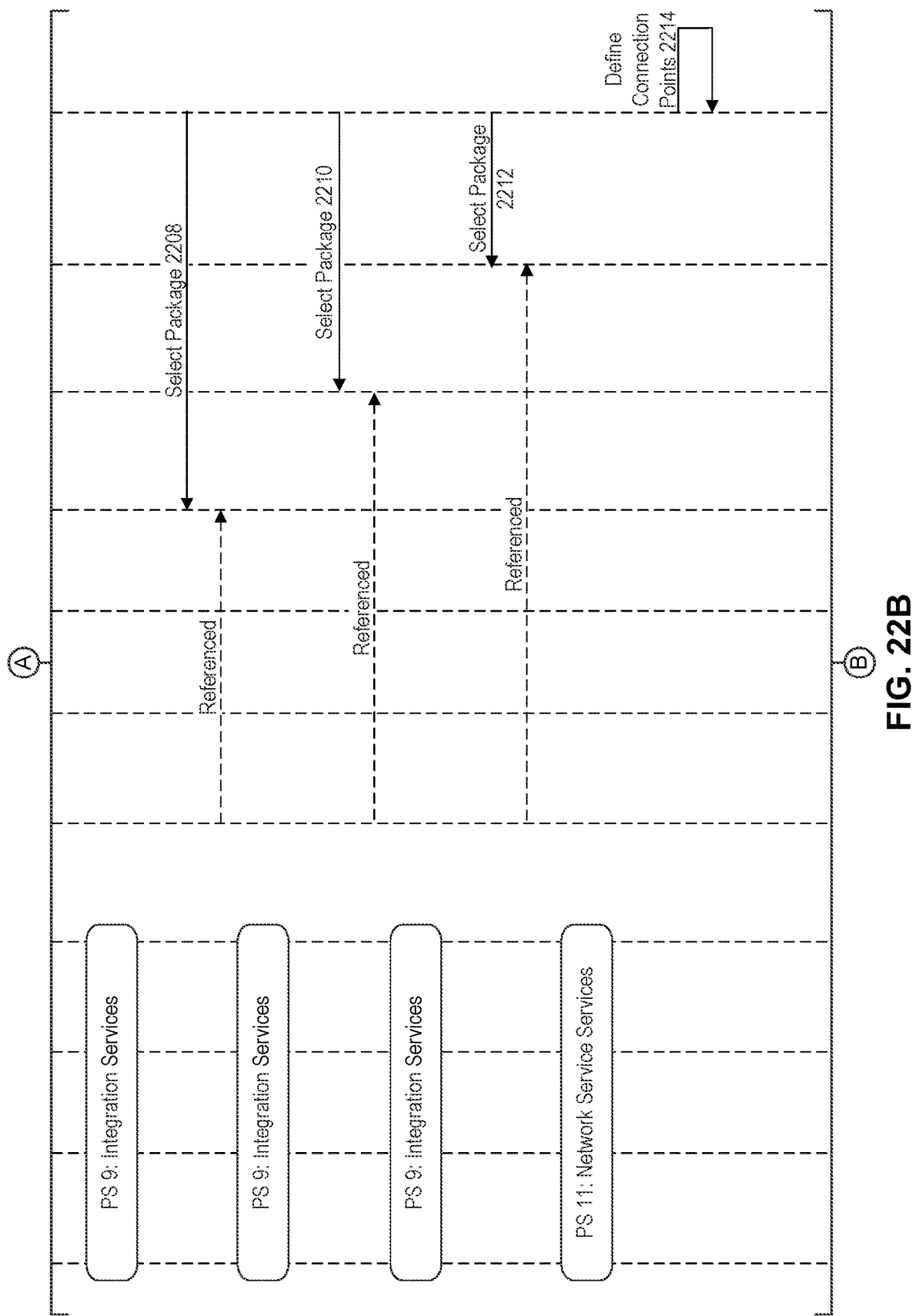
Figure 22C:
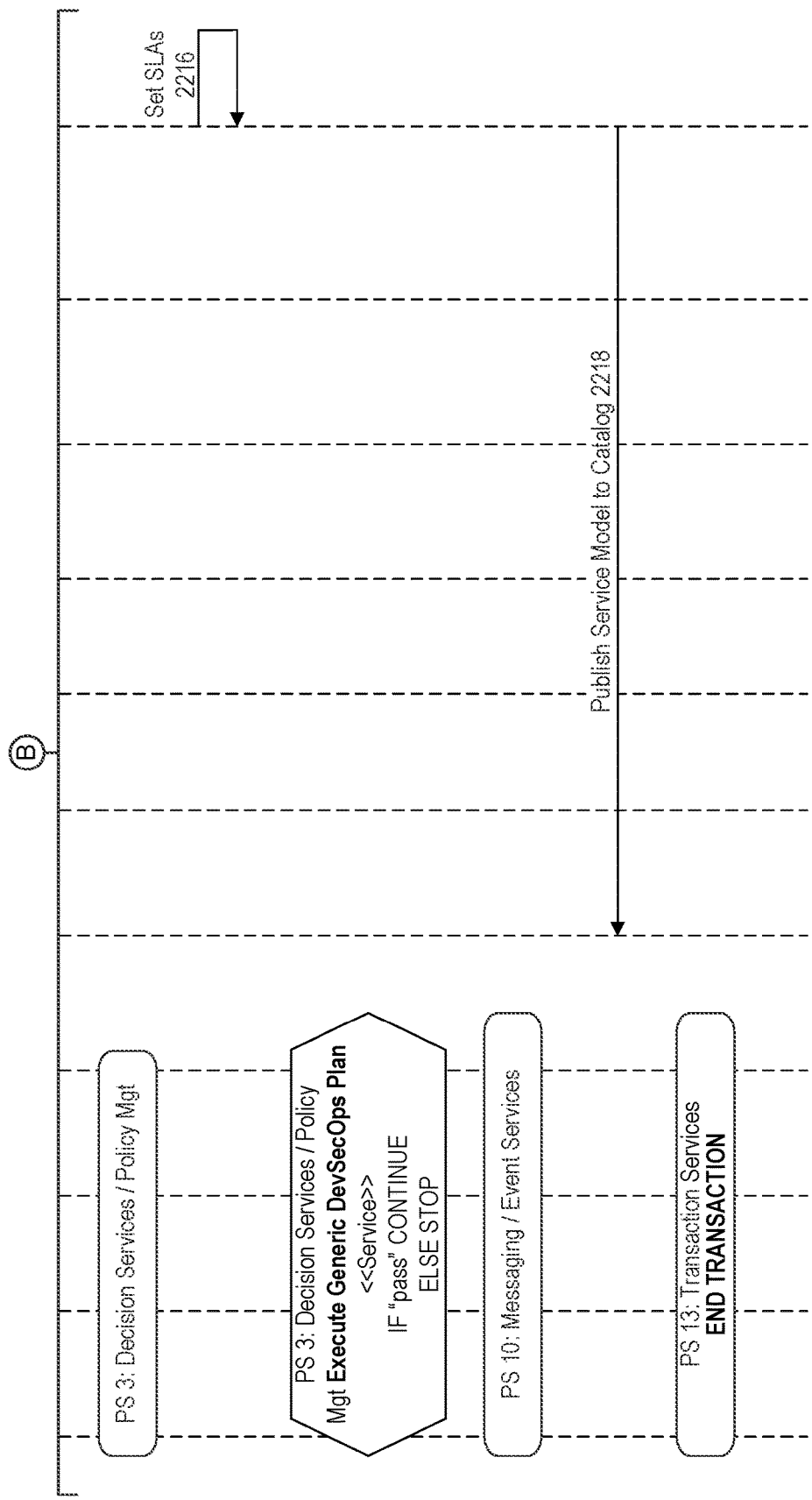

FIGS. 22A-22C are a sequence diagram illustrating a Day 0 composition method performed in UC4 for testing an optimized, secure 5G RAN. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 22A-22c, as will be understood by a person of ordinary skill in the art(s).

Day 0 composition involves connecting the applications and any supporting services required by an optimized, secure 5G RAN. Composition starts with system 110 opening up a transaction, so that all tasks can be rolled back/the infrastructure can be restored if there is a failure. All interactions of the system happen within a transaction. For this, system 110 renders (i.e., matches, dispatches, and configures) platform service 253 (PS 13: Transaction Services, providing orchestration-related middleware capabilities), then upon opening the transaction creates an initial context required to carry out the sequence and creates a process token (or links to one if it already exists), to implement the transaction and allow the tasks in UC4 depicted to execute asynchronously.

In 2202, for composition, the service designer needs to create a new empty service model for optimized 5G/RAN with secure gateway 1914, so system 110 renders (i.e., matches, dispatches, and configures) platform service 241 (PS 1: Data Services, providing configuration-related middleware capabilities at the application layer) which creates this template.

In 2204, optimized 5G/RAN with secure gateway 1914 requires solution elements to be specified by the Service designer, so system 110 renders (i.e., matches, dispatches, and configures) platform service 249 (PS 9: Integration Services, providing configuration-related middleware capabilities at the application layer) which presents them with a catalog of valid application packages to select from. Since the Service model is empty, the catalog initially presents a list of all packages. The user requires 5G core package 1902, so selects it using service factory 240 (via a UI) binding an instance of 5G core package 1902 the secure multi-cloud IMS 712.

In 2206, the user requires secure gateway package 1904, so selects it using service factory 240 (via a UI) binding an instance of secure gateway package 1904 to the secure multi-cloud IMS 712.

In 2208, the user requires firewall package 1906, so selects it using service factory 240 (via a UI) binding an instance of firewall package 1906 to the secure multi-cloud IMS 712.

In 2210, the user requires RAN RU/DU package 1908, so selects it using service factory 240 (via a UI) binding an instance of RAN RU/DU package 1908 to the secure multi-cloud IMS 712.

In 2212, the user requires RAN core package 1910, so selects it using service factory 240 (via a UI) binding an instance of RAN core package 1910 to the secure multi-cloud IMS 712.

In 2214, when all application packages are bound to optimized 5G/RAN with secure gateway 1914, the service designer needs to define connection points (constraints between the application packages, and between the application packages and any supporting services), for this system 110 renders (i.e., matches, dispatches, and configures) platform service 251 (PS 11: Network Services, providing configuration-related middleware capabilities at the application layer) which presents the service designer with: A) a UI which exposes application-to-application configurations (examples: service chaining, port/traffic routing, etc.); and B) a catalog of valid support services which can be connected and configured for the service.

In 2216, when all application packages are bound to the service model and connection points are defined, the service designer may set SLAs (policies and constraints to be enforced during the execution of the service), for this system 110 renders (i.e., matches, dispatches, and configures) platform service 243 (PS 3: Decision Services/Policy Mgt., providing workflow automation-related middleware capabilities at the application layer) which presents the service designer with a UI which for adding and configuring SLAs based on the metrics/telemetry available for the bound package models and any supplementary policies/metrics exposed by supporting services (e.g., QoS metrics captured by a third-party monitoring tool).

When the service model is complete, system 110 may verify it before adding to the catalog, so renders (i.e., matches, dispatches, and configures) platform service 243 (PS 3: Decision Services/Policy Mgt., providing workflow automation-related middleware capabilities at the application layer) which executes "Generic DevOps Plan <<Service>>", which creates an instance of the network service in a DMZ/Test environment, creates a test hardness, runs all tests verifying basic connectivity, execution, security and all SLAs specified by the model, and finally returns a response of "pass or fail."

In 2218, if the DevOps plan passes, system 110 may publish the service model to the system catalog, so renders (i.e., matches, dispatches, and configures) platform service 251 (PS 10: Messaging/Event Services, providing workflow automation-related middleware capabilities at the application layer) for this purpose. Otherwise, if optimized 5G/RAN with secure gateway 1914 does not pass, the activity is stopped and can either be revised and the sequence repeated to adjust optimized 5G/RAN with secure gateway 1914 until it "passes" DevOps verification or abandoned.

Composition ends with system 110 closing the transaction via rendered (i.e., matched, dispatched and configured) platform service 253 (PS 13: Transaction Services, providing orchestration-related middleware capabilities), and at this point "committing" any/all objects.

After successful completion, the network service is in the catalog and ready to be instantiated, for example by performing Day 1 Deployment, Integration, and Configuration.

Figure 23:
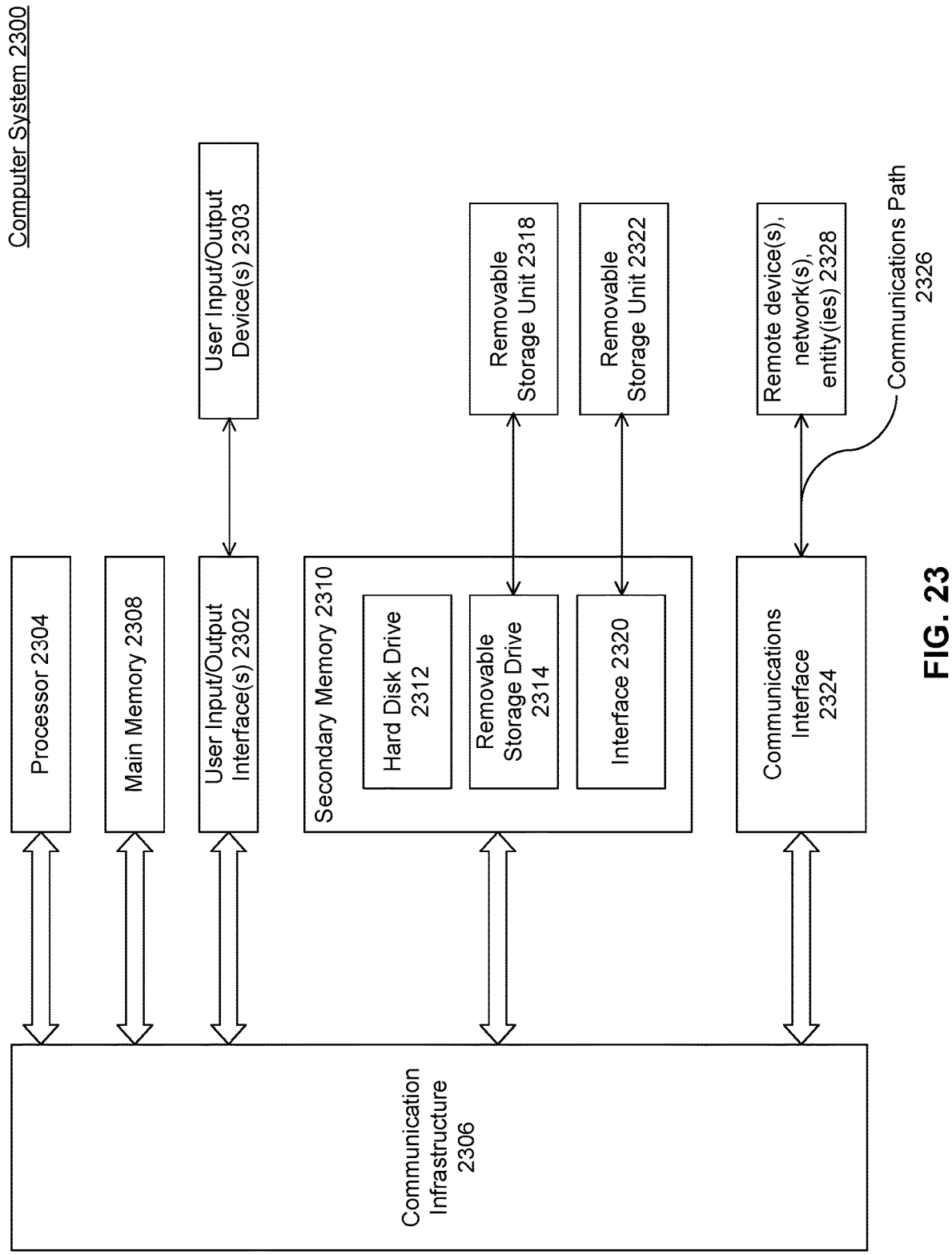
FIG. 23 is an example computer system useful for implementing various embodiments.

Various embodiments may be implemented, for example, using one or more well-known computer systems, such as computer system 2300 shown in FIG. 23. One or more computer systems 2300 may be used, for example, to implement any of the embodiments discussed herein, as well as combinations and sub-combinations thereof.

Computer system 2300 may include one or more processors (also called central processing units, or CPUs), such as a processor 2304. Processor 2304 may be connected to a communication infrastructure or bus 2306.

Computer system 2300 may also include user input/output device(s) 2308, such as monitors, keyboards, pointing devices, etc., which may communicate with communication infrastructure 2306 through user input/output interface(s) 2302.

One or more of processors 2304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 2300 may also include a main or primary memory 2308, such as random access memory (RAM). Main memory 2308 may include one or more levels of cache. Main memory 2308 may have stored therein control logic (e.g., computer software) and/or data.

Computer system 2300 may also include one or more secondary storage devices or memory 2410. Secondary memory 2310 may include, for example, a hard disk drive 2312 and/or a removable storage device or drive 2314. Removable storage drive 2314 may be a floppy disk drive, a magnetic tape drive, a compact disk drive, an optical storage device, tape backup device, and/or any other storage device/drive.

Removable storage drive 2314 may interact with a removable storage unit 2318. Removable storage unit 2318 may include a computer usable or readable storage device having stored thereon computer software (control logic) and/or data. Removable storage unit 2318 may be a floppy disk, magnetic tape, compact disk, DVD, optical storage disk, and/any other computer data storage device. Removable storage drive 2314 may read from and/or write to removable storage unit 2318.

Secondary memory 2310 may include other means, devices, components, instrumentalities or other approaches for allowing computer programs and/or other instructions and/or data to be accessed by computer system 2300. Such means, devices, components, instrumentalities or other approaches may include, for example, a removable storage unit 2322 and an interface 2320. Examples of the removable storage unit 2322 and the interface 2320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 2300 may further include a communication or network interface 2324. Communication interface 2324 may enable computer system 2300 to communicate and interact with any combination of external devices, external networks, external entities, etc. (individually and collectively referenced by reference number 2328). For example, communication interface 2324 may allow computer system 2300 to communicate with external or remote devices 2328 over communications path 2326, which may be wired and/or wireless (or a combination thereof), and which may include any combination of LANs, WANs, the Internet, etc. Control logic and/or data may be transmitted to and from computer system 2300 via communication path 2326.

Computer system 2300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 2300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 2300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 2300, main memory 2308, secondary memory 2310, and removable storage units 2318 and 2322, as well as tangible articles of manufacture embodying any combination of the foregoing. Such control logic, when executed by one or more data processing devices (such as computer system 2300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 23. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for automating testing of a code package prior to making the code package available for production deployment, comprising:

receiving a submission of the code package, the submission including metadata;

in response to the receiving, generating a customized DevOps plan comprising at least one DevOps policy, at least one test, and a plurality of tasks for deployment and testing of the code package;

instantiating a process instance of the customized DevOps plan able to specify the plurality of tasks such that each task models a system event able to be interpreted by a platform based on a context provided by the metadata and the at least one DevOps policy; and executing each task in the plurality of tasks in the process instance using a plurality of platform services dynamically matched, dispatched, configured, and coordinated by the platform based on the metadata and the at least one DevOps policy, the executing comprising:
(i) coordinating elements in at least one of an application layer, an infrastructure layer, and a network layer to process and test the code package in a pre-production test environment; and
(ii) executing the at least one test on the code package, wherein at least one post-condition of the plurality of tasks in the process instance includes a result of the at least one test.

2. The method of claim 1, further comprising:
in response to completing a first task in the plurality of tasks:
updating a process state associated with the process instance with post-conditions associated with the first task; and
advancing the process instance by assigning a next task in the plurality of tasks based on latest metadata and the at least one DevOps policy.

3. The method of claim 1, wherein the coordinating (i) comprises matching, dispatching, and configuring, based on the metadata and the at least one DevOps policy, at least one of the plurality of platform services, that deploy, configure, and network one or more application resources or invoke one or more application services necessary for the processing and testing of the code package in the pre-production test environment.

4. The method of claim 1, wherein the coordinating (i) comprises matching, dispatching, and configuring, based on the metadata and the at least one DevOps policy, at least one of the plurality of platform services, that provision, configure, and network one or more infrastructure resources necessary for the processing and testing of the code package in the pre-production test environment.

5. The method of claim 1, wherein the coordinating (i) comprises matching, dispatching, and configuring, based on the metadata and the at least one DevOps policy, at least one of the plurality of platform services, that deploy, configure, and network one or more network functions or invoke one or more network services necessary for the processing and testing of the code package in the pre-production test environment.

6. The method of claim 4, wherein the pre-production test environment is one of an optimized secure 5G radio access network, a secure multi-cloud 5G network, a secure 5G radio access network for voice, or a secure multi-cloud network for voice.

7. The method of claim 1, wherein the executing (ii) comprises executing the at least one test against the code package within the pre-production test environment, to test a behavior of the code package under simulated conditions.

8. The method of claim 1, wherein the executing the plurality of tasks further comprises, upon a successful completion of the at least one test, registering the code package in a catalog of applications.

9. The method of claim 1, wherein the executing the plurality of tasks occurs asynchronously.

10. The method of claim 1, wherein at least two of the plurality of tasks are executed concurrently.

11. The method of claim 1, wherein the submission comprises a declaratively modeled service definition.

12. A system for automating testing of a code package prior to making the code package available for production deployment, comprising:
a memory; and
at least one processor coupled to the memory and configured to:
receive a submission of the code package, the submission including metadata;
in response to the submission, generate a customized DevOps plan comprising at least one DevOps policy, at least one test, and a plurality of tasks for deployment and testing of the code package;
instantiate a process instance of the customized DevOps plan able to specify the plurality of tasks such that each task models a system event able to be interpreted by a platform based on a context provided by the metadata and the at least one DevOps policy; and
execute each task in the plurality of tasks in the process instance using a plurality of platform services dynamically matched, dispatched, configured, and coordinated by the platform based on the metadata and the at least one DevOps policy, the executing comprising:
(i) coordinating elements in at least one of an application layer, an infrastructure layer, and a network layer to process and test the code package in a pre-production test environment; and
(ii) executing the at least one test on the code package, wherein at least one post-condition of the plurality of tasks in the process instance includes a result of the at least one test.

13. The system of claim 12, the at least one processor further configured to:
in response to completing a first task in the plurality of tasks:
update a process state associated with the process instance with post-conditions associated with the first task; and
advance the process instance by assigning a next task in the plurality of tasks based on latest metadata and the at least one DevOps policy.

14. The system of claim 12, wherein the coordinating (i) comprises matching, dispatching, and configuring, based on the metadata and the at least one DevOps policy, at least one of the plurality of platform services that deploy, configure, and network one or more application resources or one or more application services necessary for the processing and testing of the code package in the pre-production test environment.

15. The system of claim 12, wherein the coordinating (i) comprises matching, dispatching, and configuring, based on the metadata and the at least one DevOps policy, at least one of the plurality of platform services, that provision, configure, and network one or more infrastructure resources necessary for the processing and testing of the code package in the pre-production test environment.

16. The system of claim 12, wherein the coordinating (i) comprises matching, dispatching, and configuring, based on the metadata and the at least one DevOps policy, at least one of the plurality of platform services that deploy, configure and network one or more network functions or invoke one or more network services necessary for the processing and testing of the code package in the pre-production test environment.

17. The system of claim 12, wherein the pre-production test environment is one of an optimized secure 5G radio access network, a secure multi-cloud 5G network, a secure 5G radio access network for voice, or a secure multi-cloud network for voice.

18. The system of claim 12, wherein the executing (ii) comprises executing the at least one test against the code package within the pre-production test environment, to test a behavior of the code package under simulated conditions.

19. The system of claim 12, wherein the executing the plurality of tasks occurs asynchronously.

20. A non-transitory computer-readable device having instructions stored thereon that, when executed by at least one computing device, cause the at least one computing device to perform operations for automating testing of a code package prior to making the code package available for production deployment comprising:
- receiving a submission of the code package, the submission including metadata;
- in response to the receiving, generating a customized DevOps plan comprising at least one DevOps policy, at least one test, and a plurality of tasks for deployment and testing of the code package;
- instantiating a process instance of the customized DevOps plan able to specify the plurality of tasks such that each task models a system event able to be interpreted by a platform based on a context provided by the metadata and the at least one DevOps policy; and
- executing each task in the plurality of tasks in the process instance using a plurality of platform services dynamically matched, dispatched, configured, and coordinated by the platform based on the metadata and the at least one DevOps policy, the executing comprising:
  - (i) coordinating elements in at least one of an application layer, an infrastructure layer, and a network layer to process and test the code package in a pre-production test environment; and
  - (ii) executing the at least one test on the code package, wherein at least one post-condition of the plurality of tasks in the process instance includes a result of the at least one test.

* * * * *